(12) United States Patent
Hazani et al.

(10) Patent No.: US 8,243,918 B2
(45) Date of Patent: *Aug. 14, 2012

(54) OUTLET ADD-ON MODULE

(75) Inventors: Ami Hazani, Ra'anana (IL); Shlomo Butbul, Ra'anana (IL); Rafael Gil Koby, Hod-Hasharon (IL); Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1251 days.

This patent is subject to a terminal disclaimer.

(21) Appl. No.: 10/838,319

(22) Filed: May 5, 2004

(65) Prior Publication Data

US 2005/0180561 A1   Aug. 18, 2005

(30) Foreign Application Priority Data

Feb. 16, 2004 (IL) .......................................... 160417

(51) Int. Cl.
*H04M 1/00* (2006.01)
*H04M 9/00* (2006.01)
(52) U.S. Cl. .......... 379/413.02; 379/413.03; 379/413.04
(58) Field of Classification Search . 379/413.02–413.04
See application file for complete search history.

(56) References Cited

U.S. PATENT DOCUMENTS

| 2,320,400 | A | 6/1943 | Bedell |
| 3,699,523 | A | 10/1972 | Percher |
| 3,730,980 | A | 5/1973 | Kirk, Jr. |
| 3,739,226 | A | 6/1973 | Seiter et al. |
| 3,805,265 | A | 4/1974 | Lester |
| 3,836,888 | A | 9/1974 | Boenke et al. |
| 3,840,711 | A | 10/1974 | Tucker |
| 3,846,703 | A | 11/1974 | Stewart et al. |
| 3,886,454 | A | 5/1975 | Oakley et al. |
| 4,031,543 | A | 6/1977 | Holz |
| 4,063,220 | A | 12/1977 | Metcalfe et al. |
| 4,079,415 | A | 3/1978 | Will |
| 4,303,993 | A | 12/1981 | Panepinto, Jr. et al. |
| 4,343,042 | A | 8/1982 | Schrock et al. |
| 4,349,706 | A | 9/1982 | Thompson et al. |
| 4,362,905 | A | 12/1982 | Ismail |
| 4,367,548 | A | 1/1983 | Cotton, Jr. et al. |
| 4,413,229 | A | 11/1983 | Grant |

(Continued)

FOREIGN PATENT DOCUMENTS

CA          2420515 A1     9/2003

(Continued)

OTHER PUBLICATIONS

Grayson Evans, The CEBUs Standard User's Guide, 1st edition, May 1996, 317 pages.

(Continued)

*Primary Examiner* — Alexander Jamal
(74) *Attorney, Agent, or Firm* — Browdy and Neimark, PLLC

(57) ABSTRACT

A method and an apparatus for upgrading an existing service outlet (e.g. LAN, telephone, power or CATV outlet) in a house by adding functionality thereto. The functionality is added by an add-on module, connected electrically and secured mechanically to the existing outlet. Several attachment devices are exampled, including surface attachment, side clamping, snap locking, strap securing and fastening screws. The add-on module may include a service connector for retaining the basic existing outlet function. The module may be attached in a permanent way or by using a detachable solution.

19 Claims, 75 Drawing Sheets

U.S. PATENT DOCUMENTS

| | | |
|---|---|---|
| 4,484,185 A | 11/1984 | Graves |
| 4,484,218 A | 11/1984 | Boland et al. |
| 4,509,211 A | 4/1985 | Robbins |
| 4,512,025 A | 4/1985 | Frankel et al. |
| 4,512,033 A | 4/1985 | Schrock |
| 4,521,881 A | 6/1985 | Stapleford et al. |
| 4,538,174 A | 8/1985 | Gargini et al. |
| 4,551,721 A | 11/1985 | Kozlik |
| 4,623,920 A | 11/1986 | Dufresne et al. |
| 4,636,914 A | 1/1987 | Belli |
| 4,644,526 A | 2/1987 | Wu |
| 4,646,296 A | 2/1987 | Bartholet et al. |
| 4,647,725 A | 3/1987 | Dellinger et al. |
| 4,655,529 A | 4/1987 | Yokoyama |
| 4,750,094 A | 6/1988 | Krasik |
| 4,755,792 A | 7/1988 | Pezzolo et al. |
| 4,761,646 A | 8/1988 | Choquet et al. |
| 4,785,448 A | 11/1988 | Reichert et al. |
| 4,787,082 A | 11/1988 | Delaney et al. |
| 4,814,941 A | 3/1989 | Speet et al. |
| 4,835,343 A | 5/1989 | Graef et al. |
| 4,863,398 A | 9/1989 | Steenton et al. |
| 4,866,733 A | 9/1989 | Morishita |
| 4,875,881 A | 10/1989 | Caveny et al. |
| 4,885,803 A | 12/1989 | Hermann et al. |
| 4,891,694 A | 1/1990 | Way |
| 4,893,326 A | 1/1990 | Duran et al. |
| 4,896,349 A | 1/1990 | Kubp et al. |
| 4,901,218 A | 2/1990 | Cornwell |
| 4,912,721 A | 3/1990 | Pidgeon, Jr. et al. |
| 4,921,446 A | 5/1990 | DePatie et al. |
| 4,924,349 A | 5/1990 | Buehler et al. |
| 4,937,819 A | 6/1990 | King |
| 4,984,267 A | 1/1991 | Martinez |
| 4,989,081 A | 1/1991 | Miyagawa et al. |
| 4,994,908 A | 2/1991 | Kuban et al. |
| 5,007,860 A | 4/1991 | Robinson et al. |
| 5,008,931 A | 4/1991 | Siemon et al. |
| 5,027,426 A | 6/1991 | Chiocca, Jr. |
| 5,033,062 A | 7/1991 | Morrow et al. |
| 5,036,168 A | 7/1991 | Kikuchi et al. |
| 5,064,386 A | 11/1991 | Dale et al. |
| 5,068,890 A | 11/1991 | Nilssen |
| 5,114,365 A | 5/1992 | Thompson et al. |
| 5,125,852 A | 6/1992 | Archer |
| 5,150,365 A | 9/1992 | Hirata et al. |
| 5,189,259 A | 2/1993 | Carson et al. |
| 5,221,814 A | 6/1993 | Colbaugh et al. |
| 5,239,540 A | 8/1993 | Rovira et al. |
| 5,243,627 A | 9/1993 | Betts et al. |
| 5,255,267 A | 10/1993 | Hansen et al. |
| 5,261,825 A | 11/1993 | Chaves |
| 5,274,631 A | 12/1993 | Bhardwaj |
| 5,278,889 A | 1/1994 | Papanicolaou et al. |
| 5,321,736 A | 6/1994 | Beasley |
| 5,321,846 A | 6/1994 | Yokota et al. |
| 5,326,931 A | 7/1994 | Cain et al. |
| 5,334,975 A | 8/1994 | Wachob et al. |
| 5,343,240 A | 8/1994 | Yu |
| 5,356,311 A | 10/1994 | Liu |
| 5,384,428 A | 1/1995 | Luu |
| 5,402,902 A | 4/1995 | Bouley |
| 5,408,260 A | 4/1995 | Arnon |
| 5,414,708 A | 5/1995 | Webber et al. |
| 5,418,328 A | 5/1995 | Nadeau |
| 5,418,559 A | 5/1995 | Blahut |
| 5,419,716 A | 5/1995 | Sciammarella et al. |
| 5,421,030 A | 5/1995 | Baran |
| 5,432,838 A | 7/1995 | Purchase et al. |
| 5,440,335 A | 8/1995 | Beveridge |
| 5,458,503 A | 10/1995 | Below |
| 5,473,517 A | 12/1995 | Blackman |
| 5,489,894 A | 2/1996 | Murray |
| 5,521,631 A | 5/1996 | Budow et al. |
| 5,535,336 A | 7/1996 | Smith et al. |
| 5,539,449 A | 7/1996 | Blahut et al. |
| 5,539,821 A | 7/1996 | Blonder |
| 5,539,880 A | 7/1996 | Lakhani |
| 5,546,385 A | 8/1996 | Caspi et al. |
| 5,563,782 A | 10/1996 | Chen et al. |
| 5,570,355 A | 10/1996 | Dail et al. |
| 5,574,256 A | 11/1996 | Cottone |
| 5,574,964 A | 11/1996 | Hamlin |
| 5,581,555 A | 12/1996 | Dubberly et al. |
| 5,585,837 A | 12/1996 | Nixon |
| 5,586,121 A | 12/1996 | Moura et al. |
| 5,592,540 A | 1/1997 | Beveridge |
| 5,599,190 A | 2/1997 | Willette |
| 5,613,874 A | 3/1997 | Orlando et al. |
| 5,619,251 A | 4/1997 | Kuroiwa et al. |
| 5,634,191 A | 5/1997 | Beasley |
| 5,642,155 A | 6/1997 | Cheng |
| 5,647,045 A | 7/1997 | Robinson et al. |
| 5,658,166 A | 8/1997 | Freeman et al. |
| 5,666,293 A | 9/1997 | Metz et al. |
| 5,671,220 A | 9/1997 | Tonomura |
| 5,695,361 A | 12/1997 | Elisei |
| 5,700,978 A | 12/1997 | Huff |
| 5,708,705 A | 1/1998 | Yamashita et al. |
| 5,712,614 A | 1/1998 | Patel et al. |
| 5,719,858 A | 2/1998 | Moore |
| 5,719,872 A | 2/1998 | Dubberly et al. |
| 5,722,076 A | 2/1998 | Sakabe et al. |
| 5,729,824 A | 3/1998 | O'Neil et al. |
| RE35,774 E | 4/1998 | Moura et al. |
| 5,736,965 A | 4/1998 | Mosebrook et al. |
| 5,744,750 A | 4/1998 | Almond |
| 5,745,837 A | 4/1998 | Fuhrmann |
| 5,748,634 A | 5/1998 | Sokol et al. |
| 5,754,539 A | 5/1998 | Metz et al. |
| 5,760,822 A | 6/1998 | Coutinho |
| 5,767,895 A | 6/1998 | Yashiro et al. |
| 5,774,526 A | 6/1998 | Propp et al. |
| 5,777,769 A | 7/1998 | Coutinho |
| 5,793,265 A | 8/1998 | Spielman |
| 5,796,739 A | 8/1998 | Kim et al. |
| 5,801,635 A | 9/1998 | Price |
| 5,802,173 A | 9/1998 | Hamilton-Piercy et al. |
| 5,805,591 A | 9/1998 | Naboulsi et al. |
| 5,805,806 A | 9/1998 | McArthur |
| 5,812,184 A | 9/1998 | Martinez |
| 5,815,681 A | 9/1998 | Kikinis |
| 5,818,845 A | 10/1998 | Moura et al. |
| 5,822,677 A | 10/1998 | Peyrovian |
| 5,822,678 A | 10/1998 | Evanyk |
| 5,833,350 A | 11/1998 | Moreland |
| 5,841,360 A | 11/1998 | Binder |
| 5,845,190 A | 12/1998 | Bushue et al. |
| 5,847,751 A | 12/1998 | Safadi |
| 5,848,054 A | 12/1998 | Mosebrook et al. |
| 5,852,631 A | 12/1998 | Scott |
| 5,870,513 A | 2/1999 | Williams |
| 5,886,732 A | 3/1999 | Humpleman |
| 5,889,765 A | 3/1999 | Gibbs |
| 5,895,888 A | 4/1999 | Arenas et al. |
| 5,896,556 A | 4/1999 | Moreland et al. |
| 5,900,584 A | 5/1999 | Cady et al. |
| 5,917,624 A | 6/1999 | Wagner |
| 5,919,060 A | 7/1999 | Lee |
| 5,923,361 A | 7/1999 | Sutton, Jr. |
| 5,929,896 A * | 7/1999 | Goodman et al. ......... 348/14.12 |
| 5,936,660 A | 8/1999 | Gurantz |
| 5,939,672 A | 8/1999 | Tang |
| 5,946,047 A | 8/1999 | Levan |
| 5,946,048 A | 8/1999 | Levan |
| 5,953,344 A | 9/1999 | Dail et al. |
| 5,953,670 A | 9/1999 | Newson |
| 5,961,345 A | 10/1999 | Finn et al. |
| 5,963,844 A | 10/1999 | Dail |
| 5,968,118 A | 10/1999 | Suton, Jr. |
| 5,982,363 A | 11/1999 | Naiff |
| 5,987,303 A | 11/1999 | Dutta et al. |
| 6,005,189 A | 12/1999 | Anker |
| 6,009,465 A | 12/1999 | Decker et al. |
| 6,010,228 A | 1/2000 | Blackman et al. |
| 6,014,386 A | 1/2000 | Abraham |
| 6,028,860 A | 2/2000 | Laubach et al. |

| | | | |
|---|---|---|---|
| 6,029,047 A | 2/2000 | Ishida et al. | |
| 6,032,057 A | 2/2000 | Kiiski | |
| 6,052,380 A | 4/2000 | Bell | |
| 6,055,242 A | 4/2000 | Doshi et al. | |
| 6,061,261 A | 5/2000 | Chen et al. | |
| 6,069,588 A | 5/2000 | O'Neill, Jr. | |
| 6,075,787 A | 6/2000 | Bobeck et al. | |
| 6,081,519 A | 6/2000 | Petler | |
| 6,081,533 A | 6/2000 | Laubach et al. | |
| 6,088,569 A | 7/2000 | Bach et al. | |
| 6,101,228 A | 8/2000 | Hebron et al. | |
| 6,104,727 A | 8/2000 | Moura et al. | |
| 6,108,331 A | 8/2000 | Thompson | |
| 6,109,959 A | 8/2000 | Burlinson et al. | |
| 6,115,755 A | 9/2000 | Krishan | |
| 6,120,320 A | 9/2000 | Veiga et al. | |
| 6,123,577 A | 9/2000 | Contois et al. | |
| 6,137,793 A | 10/2000 | Gorman et al. | |
| 6,137,866 A | 10/2000 | Staber et al. | |
| 6,144,399 A | 11/2000 | Manchester et al. | |
| 6,147,304 A | 11/2000 | Doherty | |
| 6,157,645 A | 12/2000 | Shobatake | |
| 6,166,730 A | 12/2000 | Goode et al. | |
| 6,167,120 A | 12/2000 | Kikinis | |
| 6,172,301 B1 | 1/2001 | Goodsell | |
| 6,188,557 B1 | 2/2001 | Chaudhry | |
| 6,188,871 B1 | 2/2001 | Kitamura et al. | |
| 6,192,399 B1 | 2/2001 | Goodman | |
| 6,207,895 B1 | 3/2001 | Engel | |
| 6,207,899 B1 | 3/2001 | Gillespie | |
| 6,216,160 B1 | 4/2001 | Dichter | |
| 6,216,171 B1 | 4/2001 | Isono et al. | |
| 6,219,409 B1 | 4/2001 | Smith et al. | |
| 6,222,124 B1 | 4/2001 | Pritchard et al. | |
| 6,222,853 B1 | 4/2001 | Marttinen et al. | |
| 6,236,653 B1 | 5/2001 | Dalton et al. | |
| 6,243,413 B1 | 6/2001 | Beukema | |
| 6,243,571 B1 | 6/2001 | Bullock et al. | |
| 6,252,754 B1 | 6/2001 | Chaudhry | |
| 6,281,439 B1 | 8/2001 | Reiker | |
| 6,282,075 B1 | 8/2001 | Chaudhry | |
| 6,297,450 B1 | 10/2001 | Yu | |
| 6,298,037 B1 * | 10/2001 | Sharifi | 370/210 |
| 6,307,862 B1 | 10/2001 | Silverman | |
| 6,317,884 B1 | 11/2001 | Eames et al. | |
| 6,349,133 B1 | 2/2002 | Matthews et al. | |
| 6,362,987 B1 | 3/2002 | Yurek et al. | |
| 6,364,535 B1 | 4/2002 | Coffey | |
| 6,366,671 B1 | 4/2002 | Beacers | |
| 6,373,944 B1 | 4/2002 | Beavers | |
| 6,380,852 B1 | 4/2002 | Hartman et al. | |
| 6,381,745 B1 | 4/2002 | Paul | |
| 6,396,391 B1 | 5/2002 | Binder | |
| 6,397,288 B1 | 5/2002 | Rye et al. | |
| 6,400,815 B1 | 6/2002 | Gilboy et al. | |
| 6,418,149 B1 | 7/2002 | Swisher et al. | |
| 6,420,964 B1 | 7/2002 | Nishikawa et al. | |
| 6,433,672 B1 | 8/2002 | Shirmard | |
| 6,438,109 B1 | 8/2002 | Karaoguz et al. | |
| 6,441,304 B1 | 8/2002 | Currier et al. | |
| 6,441,723 B1 | 8/2002 | Mansfield, Jr. et al. | |
| 6,448,899 B1 | 9/2002 | Thompson | |
| 6,449,291 B1 | 9/2002 | Burns et al. | |
| 6,452,923 B1 | 9/2002 | Gerszberg et al. | |
| 6,453,473 B1 | 9/2002 | Watson, Jr. | |
| 6,463,588 B1 | 10/2002 | Jenkins et al. | |
| 6,473,609 B1 | 10/2002 | Schwartz et al. | |
| 6,474,829 B2 | 11/2002 | Clodfelter | |
| 6,480,510 B1 | 11/2002 | Binder | |
| 6,481,013 B1 | 11/2002 | Dinwiddie et al. | |
| 6,492,897 B1 | 12/2002 | Mowery, Jr. | |
| 6,493,874 B2 | 12/2002 | Humpleman | |
| 6,493,875 B1 | 12/2002 | Eames et al. | |
| 6,513,163 B1 | 1/2003 | Silvia et al. | |
| 6,518,724 B2 | 2/2003 | Janik | |
| 6,526,581 B1 | 2/2003 | Edson | |
| 6,535,480 B1 | 3/2003 | Bhagavath et al. | |
| 6,546,017 B1 | 4/2003 | Khaunte | |
| 6,549,616 B1 | 4/2003 | Binder | |
| 6,553,568 B1 | 4/2003 | Fijolek et al. | |
| 6,560,319 B1 | 5/2003 | Binder | |
| 6,577,642 B1 | 6/2003 | Fijolek et al. | |
| 6,581,208 B1 | 6/2003 | Inaguma | |
| 6,583,353 B2 | 6/2003 | Murakoshi et al. | |
| 6,587,479 B1 | 7/2003 | Bianchi et al. | |
| 6,601,097 B1 | 7/2003 | Cheston et al. | |
| 6,609,927 B2 | 8/2003 | Kidman | |
| 6,615,407 B1 | 9/2003 | Inaguma | |
| 6,616,005 B1 | 9/2003 | Pereira et al. | |
| 6,618,353 B2 | 9/2003 | Merrill et al. | |
| 6,618,387 B1 | 9/2003 | Liu et al. | |
| 6,622,304 B1 | 9/2003 | Carhart | |
| 6,637,030 B1 | 10/2003 | Klein | |
| 6,653,932 B1 | 11/2003 | Beamish et al. | |
| 6,658,010 B1 | 12/2003 | Enns et al. | |
| 6,690,677 B1 | 2/2004 | Binder | |
| 6,697,864 B1 | 2/2004 | Demirtjis et al. | |
| 6,708,444 B2 | 3/2004 | Aesch et al. | |
| 6,721,298 B1 | 4/2004 | Vella-Coleiro | |
| 6,723,921 B2 | 4/2004 | Vagedes | |
| 6,732,368 B1 | 5/2004 | Michael et al. | |
| 6,745,392 B1 | 6/2004 | Basawapatna et al. | |
| 6,747,859 B2 | 6/2004 | Walbeck et al. | |
| 6,748,080 B2 | 6/2004 | Russ et al. | |
| 6,750,398 B1 | 6/2004 | Richardson | |
| 6,751,441 B1 | 6/2004 | Murray et al. | |
| 6,765,149 B1 | 7/2004 | Ku | |
| 6,765,931 B1 | 7/2004 | Rabenko et al. | |
| 6,774,307 B2 | 8/2004 | Kruse et al. | |
| 6,778,817 B1 | 8/2004 | Bullock et al. | |
| 6,779,423 B2 | 8/2004 | Hammons et al. | |
| 6,781,530 B2 | 8/2004 | Moore | |
| 6,806,425 B1 | 10/2004 | O'Neill | |
| 6,819,682 B1 | 11/2004 | Rabenko et al. | |
| 6,822,946 B1 | 11/2004 | Wallace | |
| 6,834,057 B1 | 12/2004 | Rabenko et al. | |
| 6,838,997 B1 | 1/2005 | Davidson | |
| 6,848,116 B1 | 1/2005 | Land | |
| 6,854,895 B2 | 2/2005 | Coffey et al. | |
| 6,856,799 B1 | 2/2005 | Ritter | |
| 6,857,132 B1 | 2/2005 | Rakib et al. | |
| 6,864,798 B2 | 3/2005 | Janik | |
| 6,868,058 B2 | 3/2005 | Cooper et al. | |
| 6,868,265 B2 | 3/2005 | Zodnik | |
| 6,880,020 B1 | 4/2005 | Rubinstein et al. | |
| 6,901,439 B1 | 5/2005 | Bonasia et al. | |
| 6,912,209 B1 | 6/2005 | Thi et al. | |
| 6,927,340 B1 | 8/2005 | Binder et al. | |
| 6,931,659 B1 | 8/2005 | Kinemura | |
| 6,932,624 B1 | 8/2005 | Hoopes et al. | |
| 6,933,686 B1 | 8/2005 | Bischel | |
| 6,937,056 B2 | 8/2005 | Binder | |
| 6,940,956 B1 | 9/2005 | Leach | |
| 6,941,576 B2 | 9/2005 | Amit | |
| 6,943,296 B2 | 9/2005 | Perrella et al. | |
| 6,943,297 B2 | 9/2005 | Capella | |
| 6,943,683 B2 | 9/2005 | Perret | |
| 6,946,988 B2 | 9/2005 | Edwards et al. | |
| 6,955,560 B1 | 10/2005 | Biggs | |
| 6,956,169 B1 | 10/2005 | Shotey et al. | |
| 6,956,826 B1 | 10/2005 | Binder | |
| 6,963,931 B2 | 11/2005 | Bunn et al. | |
| 6,981,892 B1 | 1/2006 | Kostelnik | |
| 6,993,289 B2 | 1/2006 | Janik | |
| 6,996,837 B1 | 2/2006 | Miura et al. | |
| 7,002,898 B1 | 2/2006 | Lou | |
| 7,003,102 B2 * | 2/2006 | Kiko | 379/413 |
| 7,023,868 B2 | 4/2006 | Rabenko et al. | |
| 7,030,319 B2 | 4/2006 | Johnsen et al. | |
| 7,034,225 B2 | 4/2006 | Thompson et al. | |
| 7,035,270 B2 | 4/2006 | Moore, Jr. et al. | |
| 7,036,140 B2 | 4/2006 | Terry et al. | |
| 7,047,555 B1 | 5/2006 | Inaguma et al. | |
| 7,088,238 B2 | 8/2006 | Karaoguz et al. | |
| 7,099,368 B2 | 8/2006 | Santhoff et al. | |
| 7,106,388 B2 | 9/2006 | Vorenkamp et al. | |
| 7,106,721 B1 | 9/2006 | Binder | |
| 7,116,685 B2 | 10/2006 | Brown et al. | |

| | | | |
|---|---|---|---|
| 7,117,520 B2 | 10/2006 | Stewart | |
| 7,138,886 B2 | 11/2006 | Strull et al. | |
| 7,142,560 B2 | 11/2006 | Mansfield | |
| 7,149,474 B1 | 12/2006 | Mikhak | |
| 7,151,575 B1 | 12/2006 | Landry et al. | |
| 7,164,690 B2 | 1/2007 | Limb et al. | |
| 7,209,497 B2 | 4/2007 | Weinstein et al. | |
| 7,295,518 B1 | 11/2007 | Monk et al. | |
| 7,317,793 B2 | 1/2008 | Binder et al. | |
| 7,324,824 B2 * | 1/2008 | Smith et al. | 455/456.1 |
| 2001/0036199 A1 | 11/2001 | Terry | |
| 2001/0039660 A1 | 11/2001 | Vasilevsky et al. | |
| 2002/0003873 A1 | 1/2002 | Rabenko et al. | |
| 2002/0019875 A1 | 2/2002 | Garrett et al. | |
| 2002/0021716 A1 | 2/2002 | Terk | |
| 2002/0031114 A1 | 3/2002 | Terry et al. | |
| 2002/0035624 A1 | 3/2002 | Kim | |
| 2002/0038153 A1 | 3/2002 | Amodeo et al. | |
| 2002/0039388 A1 | 4/2002 | Smart et al. | |
| 2002/0060617 A1 | 5/2002 | Walbeck et al. | |
| 2002/0061012 A1 | 5/2002 | Thi et al. | |
| 2002/0064039 A1 | 5/2002 | Clodfelter | |
| 2002/0069417 A1 | 6/2002 | Kliger et al. | |
| 2002/0075806 A1 | 6/2002 | Shalvi et al. | |
| 2002/0104009 A1 | 8/2002 | Zodnik | |
| 2002/0116720 A1 | 8/2002 | Terry et al. | |
| 2002/0146207 A1 | 10/2002 | Chu et al. | |
| 2002/0150155 A1 | 10/2002 | Florentin et al. | |
| 2002/0166124 A1 | 11/2002 | Gurantz et al. | |
| 2002/0166125 A1 | 11/2002 | Fulmer, II | |
| 2002/0174423 A1 | 11/2002 | Fifield et al. | |
| 2002/0194383 A1 | 12/2002 | Cohen et al. | |
| 2002/0194605 A1 | 12/2002 | Cohen et al. | |
| 2003/0005450 A1 | 1/2003 | Smith | |
| 2003/0018975 A1 | 1/2003 | Stone | |
| 2003/0062990 A1 | 4/2003 | Schaeffer et al. | |
| 2003/0066082 A1 | 4/2003 | Kliger et al. | |
| 2003/0099228 A1 | 5/2003 | Alcock et al. | |
| 2003/0106067 A1 | 6/2003 | Hoskins et al. | |
| 2003/0112965 A1 | 6/2003 | McNamara et al. | |
| 2003/0133476 A1 | 7/2003 | Stone et al. | |
| 2003/0151695 A1 | 8/2003 | Sahlin et al. | |
| 2003/0154273 A1 | 8/2003 | Caveney | |
| 2003/0154276 A1 | 8/2003 | Caveney | |
| 2003/0224728 A1 | 12/2003 | Heinonen et al. | |
| 2004/0013098 A1 | 1/2004 | Tseng et al. | |
| 2004/0073597 A1 | 4/2004 | Caveney et al. | |
| 2004/0077310 A1 | 4/2004 | Levy | |
| 2004/0083262 A1 | 4/2004 | Trantow | |
| 2004/0085976 A1 | 5/2004 | Dale et al. | |
| 2004/0087214 A1 | 5/2004 | Cho | |
| 2004/0121648 A1 | 6/2004 | Voros | |
| 2004/0123322 A1 | 6/2004 | Erkocevic et al. | |
| 2004/0136384 A1 | 7/2004 | Cho | |
| 2004/0147232 A1 | 7/2004 | Zodnik | |
| 2004/0158649 A1 | 8/2004 | Ophir et al. | |
| 2004/0162117 A1 | 8/2004 | Liebenow | |
| 2004/0177381 A1 | 9/2004 | Kliger et al. | |
| 2004/0178888 A1 | 9/2004 | Hales et al. | |
| 2004/0187156 A1 | 9/2004 | Palm et al. | |
| 2004/0192285 A1 | 9/2004 | Capobianco et al. | |
| 2004/0198236 A1 | 10/2004 | Paine et al. | |
| 2004/0203387 A1 | 10/2004 | Grannan | |
| 2004/0204017 A1 | 10/2004 | Eckel et al. | |
| 2004/0255332 A1 | 12/2004 | Bertonis et al. | |
| 2004/0259538 A1 | 12/2004 | Agbegnenow | |
| 2004/0268160 A1 | 12/2004 | Atkinson et al. | |
| 2005/0010954 A1 | 1/2005 | Binder | |
| 2005/0018648 A1 | 1/2005 | Scheelke | |
| 2005/0018857 A1 | 1/2005 | McCarty et al. | |
| 2005/0025162 A1 | 2/2005 | Binder | |
| 2005/0034159 A1 | 2/2005 | Ophir et al. | |
| 2005/0038875 A1 | 2/2005 | Park | |
| 2005/0047379 A1 | 3/2005 | Boyden et al. | |
| 2005/0053087 A1 | 3/2005 | Pulyk | |
| 2005/0073968 A1 | 4/2005 | Perlman | |
| 2005/0076148 A1 | 4/2005 | Chan et al. | |
| 2005/0076149 A1 | 4/2005 | McKown et al. | |
| 2005/0076151 A1 | 4/2005 | Tapperson et al. | |
| 2005/0076375 A1 | 4/2005 | Nakamura | |
| 2005/0084004 A1 | 4/2005 | Bione | |
| 2005/0086389 A1 | 4/2005 | Chang | |
| 2005/0086694 A1 | 4/2005 | Hicks et al. | |
| 2005/0125083 A1 | 6/2005 | Kiko | |
| 2005/0129069 A1 | 6/2005 | Binder | |
| 2005/0136972 A1 | 6/2005 | Smith et al. | |
| 2005/0144647 A1 | 6/2005 | Zussman et al. | |
| 2005/0152306 A1 | 7/2005 | Bonnassieux et al. | |
| 2005/0152337 A1 | 7/2005 | Wurtzel et al. | |
| 2005/0177640 A1 | 8/2005 | Rubinstein et al. | |
| 2005/0184915 A1 | 8/2005 | Nagel et al. | |
| 2005/0194176 A1 | 9/2005 | Johnsen et al. | |
| 2005/0208825 A1 | 9/2005 | Chan | |
| 2005/0228889 A1 | 10/2005 | Cohen et al. | |
| 2005/0235333 A1 | 10/2005 | Bertonis et al. | |
| 2005/0281326 A1 | 12/2005 | Yu | |
| 2005/0289638 A1 | 12/2005 | Steading | |
| 2006/0092967 A1 | 5/2006 | Bergeron et al. | |
| 2006/0193336 A1 | 8/2006 | Landry et al. | |
| 2006/0222086 A1 | 10/2006 | Frye, Jr. | |
| 2006/0235333 A1 | 10/2006 | Couvillon, Jr. | |
| 2006/0251094 A1 | 11/2006 | Van Vleck et al. | |
| 2006/0280197 A1 | 12/2006 | Stone | |
| 2006/0291575 A1 | 12/2006 | Berkman et al. | |
| 2007/036171 A1 | 2/2007 | Magin | |
| 2009/0217325 A1 | 8/2009 | Kliger et al. | |

FOREIGN PATENT DOCUMENTS

| | | |
|---|---|---|
| EP | 0 241 152 A2 | 10/1987 |
| EP | 0 385 695 B1 | 1/1996 |
| EP | 0 961 466 A1 | 12/1999 |
| EP | 1 343 253 A1 | 9/2003 |
| GB | 2289381 | 11/1995 |
| GB | 2 368 979 A | 5/2002 |
| JP | 5594514 A | 7/1980 |
| JP | 5594515 A | 7/1980 |
| JP | 55-132197 A | 10/1980 |
| JP | 59041883 | 3/1984 |
| JP | 61126724 U | 8/1986 |
| JP | 02210782 A | 8/1990 |
| JP | 3012378 | 2/1991 |
| JP | 06501132 A | 2/1994 |
| JP | 7297892 | 11/1995 |
| JP | 07320827 | 12/1995 |
| JP | 10056717 A | 2/1998 |
| JP | 10210626 A | 8/1998 |
| JP | 11313426 A | 11/1999 |
| JP | 2000050474 | 2/2000 |
| JP | 2000504899 | 4/2000 |
| JP | 2002260768 | 9/2002 |
| JP | 2002367710 | 12/2002 |
| JP | 200361070 A | 2/2003 |
| JP | 2003061146 | 2/2003 |
| JP | 200369494 A | 7/2003 |
| JP | 02210782 A | 8/2009 |
| WO | 9208262 A1 | 5/1992 |
| WO | 9623377 A1 | 8/1996 |
| WO | 9729556 | 8/1997 |
| WO | WO 97/50193 A1 | 12/1997 |
| WO | WO-98/27748 A2 | 6/1998 |
| WO | WO-98/31133 A3 | 7/1998 |
| WO | WO-99/35753 A2 | 7/1999 |
| WO | WO-00/28689 A2 | 5/2000 |
| WO | WO 01/43238 | 6/2001 |
| WO | WO-01/80030 A1 | 10/2001 |
| WO | WO-01/80543 A2 | 10/2001 |
| WO | WO-02/19623 A3 | 3/2002 |
| WO | WO-02/25920 A1 | 3/2002 |
| WO | WO-02/065229 A2 | 8/2002 |
| WO | WO 02/091652 A2 | 11/2002 |
| WO | WO 02/102019 A2 | 12/2002 |
| WO | WO-03/005691 A1 | 1/2003 |
| WO | WO-03/039150 A1 | 5/2003 |
| WO | WO 2004/068827 A1 | 8/2004 |
| WO | WO 2005/022692 A2 | 3/2005 |
| WO | WO-2006/052216 A1 | 5/2006 |

OTHER PUBLICATIONS

Mark Nachman, Compaq to Ride the CEBus, EBN, Jan. 22, 1996, 1 page.

Home Automation Buses: Protocols Really Hit Home, EDN, Apr. 13, 1995, 9 pages.

Brian E. Markwalter, et al; CEBus Router Testing, IEEE Transactions on Consumer Electronics, Nov. 1991, vol. 37, No. 4, 8 pages.

J. Hofmann, Cable, Television, and the Consumer Electronic Bus, 9 pages.

Draft IS-60.04 Node Communications Protocol Part 6: Application Layer Specification, Rev. Apr. 18, 1996, 129 pages.

Gershon, E.; "FDDI on Copper with AMD PHY Components"; Advanced Micro Devices, Inc.; 1991, pp. 1-7.

Lavoisard, J.L. et al; "ISDN Customer Equipments"; Commutation and Transmission, No. 3, 1987, pp. 35-50.

Keller et al; "Performance Bottlenecks in Digital Movie Systems"; Proceedings of the 4$^{th}$ International Workshop on Network and Operating System Support for Digital Audio and Video, 1993, pp. 161-172.

Stallings, W.; "Local Networks—An Introduction" pp. ii, xii-xvi, 373-381, 1984.

Stallings, W.; "Local Networks—Second Edition" pp. l-v, viii-xiv, 427-434, 1987.

Stallings, W.; "Local Networks—Third Edition" pp. I-v, x-xvi, 499-510, 1990.

Strole, N.; "The IBM Token-Ring Network—A functional Overview"; ; IEEE Network Magazine, vol. 1, No. 1, 1987, pp. 23-30.

Willett, M.; "Token-ring Local Area Networks—An Introduction"; IEEE Network Magazine, vol. 1, No. 1, 1987, pp. 8 and 9.

"Integrated Services Digital Network (ISDN)", International Telecommunications Union, vol. III, Fascicle III.8, pp. 175-176 and 204-209, 1988.

An Interoperable Solution for FDDI Signaling Over Shielded Twisted Pair; Advanced Micro Devices, Inc.; May 1991, pp. 1-16.

SuperStack II Baseline Switch, 14-Port TP (3C16460) User Guide; 3Com; 1996 pp. 1-8.

SuperStack II Entry Hub User Guide; 3Com; 1996 pp. 1-8.

SuperStack II Baseline Switch 610 User Guide; 3Com; 1999, pp. 1-48.

SuperStack II Baseline 10/100 Switch User Guide; 3Com; 1998, pp. 1-8.

Cisco Catalyst 5000 Switching System; http://web/19961220170336/www.cisco.com; pp. 1-4, 1996.

Cisco Catalyst 5000 Series Documentation; http://web.archive.org/web/19961220192608/www.cisco.com; pp. 1-11, 1996.

Cisco Catalyst 5000 Group Switching Ethernet Modules; http://web.archive.org/web/19961220192604/www.cisco.com; pp. 1-5, 1996.

Cisco Catalyst 5000: Industry's First Modular, Multilayer-Capable Switching System for the Wiring Closet; http://web.archive.org/web/19961220192714/www.cisco.com; pp. 1-22, 1996.

Cisco Catalyst 5000 ATM Dual PHY LAN Emulation Module; http://web.archive.org/web/19961220191454/www.cisco.com; pp. 1-4, 1996.

Cisco LAN Emulation; http://web.archive.org/web/19961220192930/www.cisco.com; pp. 1-16, 1996.

Cisco Fast Ethernet 100-Mbps Solutions; http://web.archive.org/web/19961220192938/www.cisco.com; pp. 1-10, 1996.

Cisco Catalyst 5000: Industry's First Modular, Multilayer-Capable Switching System for the Wiring Closet; Cisco Systems, 1996, pp. 1-22.

3Com NBX 2101PE Basic Phone Product Details; http://www.3com.com/products/enUS/printsafe.jsp?sku=3C10248PE&pathtype=support; pp. 1-3.

Cisco Catalyst 5002 Switching System Data Sheet; Cisco Systems, 4 pages.

Cisco Catalyst 5000 Series; Cisco Systems, pp. 589-600.

Cisco Catalyst 5000 Group Switching Ethernet Modules Data Sheet; Cisco Systems, 9 pages.

Network Based Exchange—The Complete Communications Solution, NBX Corporation, 1997; 16 pages.

The Mac Reborn; Macworld, vol. 13, Issue 9, Sep. 1996, pp. 1-10.

SuperStack II Desktop Switch; 3Com, 1996, 2 pages.

CiscoPro Ether Switch CPW2115; Cisco Systems; 1995, 4 pages.

Hart Field Communication Protocol—an introduction for users and manufacturers; Hart Communication Foundation, 1995, 12 pages.

3ComImpactIQ External ISDN Modem; 3COM, 1996, 4 pages.

The Macintosh Reborn, Macworld—The Essential Macintosh Resource; 1996, 16 pages.

Cisco 2610 Router Cabling and Setup—Quick Start Guide; Cisco Systems, 1998, 18 pages.

Network Based Exchange—The Complete Communication Solution; NBX Corporation, 1997, 16 pages.

-48-Volt DC Power Supply Connection Guide, For the SuperStack II Switch 3900; Mar. 2000, pp. 1-9.

Donnan, et al; "Token Ring Access Method and Physical Layer Specifications"; ANSI/IEEE Standard for Local Area Networks; ANSI/IEEE 802.5; 89 pages, 1985.

Gibson et al; Fibre Data Distributed Interface (FDDI)—Token Ring Physical Layer Medium Dependent (PMD); American National Standard for Information Systems; ANSI X3.166-1990; 58 pages, 1990.

Gibson et al; Fiber Distributed Data Interface (FDDI)—Token Ring Physical Layer Protocol (PHY); American National Standard for Information Systems; ANSI X3.148-1988; 34 pages, 1988.

Lohse, et al; Fiber Distributed Data Interface (FDDI)—Token Ring Media Access Control (MAC); American National Standard for Information Systems; ANSI X3.139-1987; 62 pages; 1987.

IEEE Standard for a High Performance Serial Bus; IEEE Std. 1394-1995; 1996; 392 pages.

SuperStack II PS. Hub User Guide; 3com; Jul. 1997; 188 pages.

SuperStack II Desktop Switch User Guide; 3Com; Jun. 1997; 148 pages.

Universal Serial Bus Specification Revision 1.0: Jan. 1996; 268 pages.

ComImpact IQ External ISDN Modem User Guide; Jul. 1997; 158 pages.

Stallings, W., Local Networks, An Introduction; p. 1-97, 1984.

M. Ise, et al., "Sharp Home Bus System," Sharp Technical Journal, No. 29, 1984, pp. 49-55.

S. Tsuruta, "Home Media Bus: An Integrated Network for Home Information Systems," 1984 IEEE International Conference on Consumer Electronics. Digest of Technical Papers, Jun. 6-8, 1984, Rosemont, Illinois, 2 pp.

C. Dougligeris, et al., "Communications and Control for a Home Automation System," Conference: IEEE Proceedings of the Southeastcon '91, vol. 1, pp. 171-175.

D.G.J. Fanshawe, "Architures for Home Systems," Conference: IEEE Colloquium on Home Systems—Information, Entertainment and Control, Oct. 1, 1990, London, United Kingdom, pp. 3/1-3/3.

M. Inoue, et al., "A Home Automation System," IEEE Transactions on Consumer Electronics, vol. CE-31, No. 3, Aug. 1985, pp. 516-527.

"CEBus: US Households are Being Networked," Funkschau, No. 9, Apr. 1989, pp. 45-47.

Coaxial Feeder Cables [Engineering Notes], PYE Telecommunications Limited Publication Ref No. TSP507/1, Jun. 1975, Cambridge, England, 15 pages.

Freeman, "Telecommunication Transmission Handbook," 2.sup.nd Ed., Cover, pp. xi-xxvii, Chapter 3 (pp. 79-127), Chapter 5 (pp. 172-252), Chapter 6 (pp. 253-288), 1981.

Hoe-Young Noh, "Home Automation," Korea Information Science Society Review, Apr. 1989, vol. 7 No. 2, pp. 40-44, Republic of Korea. (Translation Provided).

Coax Cable Physical Layer & Medium Specification; Revision: IS-60, Sep. 25, 1995 (50 pages).

Motorola Announces Key New Features to CyberSURFR Cable Modem System; Motorola, Mar. 17, 1997 (3 pages).

CyberSURFR Cable Modem Specifications; Motorola, Mon. Apr. 13, 1998 (4 pages).

High Speed Cable Modems, Including IEEE 802.14 Standards; Albert A. Azzam; ISBN 0-07-006417-2, 1997.

Mark Sumner: "DOCSIS 1.1 Overview" Cablemodem.Com-Documents, Online! May 3-7, 1999, pp. 1-16, XP-002165493, http://www.cablemodem.com/Euroll.sub.-Overview.pdf, retrieved on Apr. 18, 2001.

Sdralia et al, "Performance Characterisation of the MCNS DOCSIS 1.0 CATV Protocol with Prioritised First come First Served Scheduling", IEEE Transactions on Broadcasting, US, vol. 45, No. 2, Jun. 1999, pp. 196-205.

Tzerefos et al, "Delivery of Low Bit Rate Isochronous Streams Over the DOCSIS 1.0 Cable Television Protocol", IEEE Transactions on Broadcasting, US, vol. 45, No. 2, Jun. 1999, pp. 206-214.

A.D. Little, S. Lipoff: "Cable Modem Termination System—Network Side Interface Specification" Data Over Cable Interface Specification, Online 1996, pp. 1-17, XP002165494, http://www.cablemodem.com/SP.sub.--CMTS.sub.--NSII01-960702.pdf, retrieved on Apr. 18, 2001.

M. Laubach, "To foster residential area broadband internet techology: IP datagrams keep going, and going, and going . . . ", Computer Communications, NL, Elsevier Science Publishers BV, Amsterdam, vol. 19, No. 11, Sep. 1, 1996, pp. 867-875.

Goldberg, "MCNS/DOCSIS MAC Clears a Path for the Cable-Modem Invasion", Electronic Design, US, Penton Publishing, vol. 45, No. 27, Dec. 1, 1997, pp. 69-70, 74, 78, 80.

Quigley, "Cablemodem Standards for Advanced Quality of Service Deployments", Digest of Technical Papers, International Conference on Consumer Electronics, Jun. 22-24, 1999, pp. 282-283.

Cable Television Laboratories, Inc., "Data-Over-Cable Service Interface Specifications: Baseline Privacy Plus Interface Specification", SP-BPI+-I09-020830, Aug. 30, 2002.

Cable Television Laboratories, Inc., "Data-Over-Cable Service Interface Specifications: Radio Frequency Interface Specification", SP-RFIv1.1-I09-020830, Aug. 30, 2002.

Cable Television Laboratories, Inc., "Data-Over-Cable Service Interface Specifications: Radio Frequency Interface Specification", SP-RFIv2.0-I03-021218, Dec. 18, 2002.

Cisco, "Internal DOCSIS Configurator File Generator for the Cisco Cable Modem Termination System", Cisco Cable Modem Termination System Feature Guide, Chapter 6.

Communications Technology, "Cable Modem Security: Insulating Your Network While Keeping Your Subscribers Safe from Each Other", Oct. 2001.

Croft et al, "Bootstrap Protocol (BOOTP)", Sep. 1985.

Droms, "Dynamic Host Configuration Protocol", Mar. 1997.

Jacobs, et al, "Bandwidth Burglary in Broad Daylight: How to Prevent a Simple Hack", Jan. 2003.

Pfendtner, "DOCSIS Network Security at WH-Netz", Nov. 20, 2002.

Society of Cable Telecommunications Engineers, Inc., "Data-Over-Cable Service Interface Specification: DOCSIS 1.0 Radio Frequency Interface (RFI)", ANSI/SCTE 22-1 2002 (formerly DSS 02-05).

"MCNS Data-Over-Cable Service Interface Specifications: Baseline Privacy Interface Specification SP-BPI-I02990319", Mar. 1999.

Cable Television Laboratories, Inc.; Data-Over-Cable Service Interface Specifications—Radio Frequency Interface Specification—SP-RFI-I04-980724; 1997; pp. 1-196.

MCNS Data-Over-Cable Service Interface Specifications: Cable Modem to Customer Premise Equipment Interface Specification SP-CMCI-I04-000714, Jul. 2000.

"Data-Over-Cable Service Interface Specifications: Cable Modem Termination System—Network Side Interface Specification, SP-CMTS-NSII01-960702", Jul. 1996.

Data-Over Cable Service Interface Specifications; Radio Frequency Interface Specification; SPRFIv1.1-I01-990311; 1999; Cable Television Laboratories, Inc.; pp. 1-310.

Ciciora, W., et al., "Protocol Issues," Modern Cable Television Technology: Video, Voice, and Data Communications, Section 4.4, pp. 194-205, Copyright 1999 by Morgan Kaufmann Publishers, Inc.

Ciciora, W., et al, "Chapter 4.5: the DOCSIS Protocol for Cable Modems," Modern Cable Television Technology: Video, Voice, and Data Communications, Section 4.5, pp. 205-213, Copyright 1999 by Morgan Kaufmann Publishers, Inc.

Data-Over Cable Technical Reports; Operations Support System Framework for Data Over Cable Services; TR-DOCS-OSSIW08-961016; MCNS Holdings, LP; pp. 1-20.

Data-Over Cable Service Interface Specifications; Operations Support System Interface Specification; SP-OSSI-I02-990113; Cable Television Laboratories, Inc.; pp. 1-26.

Data-Over Cable Service Interface Specifications; Operations Support System Interface Specification Radio Frequency Interface; SP-OSSI-RFI-I03-990113; Cable Television Laboratories, Inc.; pp. 1-29.

Data-Over Cable Service Interface Specifications; Operations Support System Interface Specification Baseline Privacy Interface MIB; SP-OSSI-BPI-I01-980331; 1997 & 1998; MCNS Holdings, LP; pp. 1-33.

Extended DQRAP (EXQRAP) A Cable TV Protocol Functioning as a Distributed Switch; Chien-Ting Wu & Graham Campbell; Illinois Institute of Technology (Comp. Science Dept.); pp. 1-7.

A Review of Contention Resolution Algorithms for IEEE 802.14 Networks; Nada Glomie; Yves Saintillan, & David H. Su; National Institute of Standards and Technology; pp. 1-11.

A Review of Contention Resolution Algorithms for IEEE 802.14 Networks; Nada Glomie; Yves Saintillan, & David H. Su; National Institute of Standards and Technology; pp. 1-12.

On IEEE 802.14 Medium Access Control Protocol; Ying-Dar Lin; 1998.

On IEEE 802.14 Medium Access Control Protocol; Ying-Dar Lin; 1998; IEEE Communications Survey Fourth Quarter pp. 2-10.

Hybrid-Fiber Coax; Hung Nguyen and Felix Yao; Apr. 22, 1996; pp. 1-11.

Cable Data Modem Performance Evaluation, A Primer for Non-Technical Readers; Cable Television Laboratories, Inc.Nov. 15, 1996; pp. 1-8.

Data-Over Cable Service Interface Specifications: Cable Modem to Customer Premise Equipment Interface Specification; SP-CMCI-12-980317; 1988; Cable Television Laboratories, Inc.; pp. 1-40.

Cable Device Management Information Base for DOCSIS Complaint Cable Modems and Cable Modem Termination Systems; Michael St. Johns; Mar. 30, 1999; pp. 1-54.

Data-Over Cable Service Interface Specifications; Cable Modem Telephony Return Interface Specification; SP-CMTRI-101-970804; 1997; Cable Television Laboratories, Inc.; pp. 1-74.

Radio Frequency (RF) Interface Management Information Base for MCNS Complaint RF Interfaces Draft-ietf-Jipcdn-rf-interface-mib-04.txt; May 22, 1009; Guenter Roeck (editor); pp. 1-55. 540) Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.

Baseline Privacy Interface Management Information Base for MCNS Complaint Cable Modems and Cable Modem Termination Systems; R. Woundy; Jan. 17, 1999; pp. 1-35.

Logical IP Subnetworks over IEE 802.14 Services; Mark Laubach; Mar. 13, 1998; pp. 1-13.

MAC Protocols for Multimedia Data over HFC Architecture; Dolors Sala Batlle; Nov. 27, 1995; pp. 1-28.

An Access Protocol to Support Multimedia Traffic Over Hybrid Fiber/Coax Systems; John O. Limb, Dolors Sala; pp. 1-6.

Radio Frequency (RF) Interfaces Management Information Base for MCNS/DOCSIS Compliant RF Interfaces; Mike St. Johns, (Editor); Feb. 17, 1999; pp. 1-67.

Telephony-Return Interface (TRI) Management Information Base for DOCSIS complaint Telephony-Return Cable Modems and Cable Modem Termination systems; S. Adiraju, J. Fijolek; Apr. 2, 1999; pp. 1-27.

Data Over Cable System Quality of Service Management Information Base (DOCSIS-QOS MIB); M. Patrick, J. Harvey, Motorola ING; Jun. 25, 1999, pp. 1-43.

Docsis 1.1 IGMP MIB; H. Abramson, Motorola; Jun. 1999; pp. 1-13.

Scheduling Disciplines for HFC Systems: What can we learn from ATM scheduling; Dolors Sala, John O. Limb; GA Tech; pp. 1-6.

A Protocol for Efficient Transfer of Data over Fiber/Cable Systems; Dolors Sala, John O. Limb; GA Tech; pp. 1-8.

'High-Speed Cable Modems', pp. 1-246 By Albert A. Azzam, 1997, ISBN: 0-07-006417-2 (276 pages).

'High-Speed Cable Modems', pp. 247-570 By Albert A. Azzam, 1997, ISBN: 0-07-006417-2 (321 pages).

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

"Outlet Add-On Mobile", Nov. 2, 2011 Japanese Office Action, Application No. 2006-553760.

Radio Frequency (RF) Interface Management Information Base for MCNS Complaint RF Interfaces Draft-ietf-Jipcdn-rf-interface-mib-04.txt; May 22, 1009; Guenter Roeck (editor); pp. 1-55.

Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.

* cited by examiner

Figure 1 (Prior-Art)

OUTLET ADD-ON MODULE

FIELD OF THE INVENTION

The present invention relates to the field of wiring using outlets, and, more specifically, to an add-on module for adding functionality to such outlets.

BACKGROUND OF THE INVENTION

Outlets

The term "outlet" herein denotes an electromechanical device, which facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall or similar surface. Non-limiting examples of common outlets include: telephone outlets for connecting telephones and related devices; CATV outlets for connecting television sets, VCR's, and the like; outlets used as part of LAN wiring (a.k.a. structured wiring) and electrical outlets for connecting power to electrical appliances. The term "wall" herein denotes any interior or exterior surface of a building, including, but not limited to, ceilings and floors, in addition to vertical walls.

Rear part of an outlet (or module) refers herein to the side facing the wall after installation, and commonly also comprises the connector to the in-wall utility wiring. Front part refers to the opposing side commonly facing the room, and commonly comprising connectors for coupling to the utility wiring.

The terms "data unit", "computer" and "personal computer" ("PC") are used herein interchangeably to include workstations, Personal Digital Assistants (PDA) and other data terminal equipment (DTE) with interfaces for connection to a local area network, as well as any other functional unit of a data station that serves as a data source or a data sink (or both).

LAN Environment.

FIG. 1 shows a typical prior art LAN environment 10. Such a network commonly uses 10BaseT or 100BaseTX Ethernet IEEE802.3 interfaces and topology, and features a hub 11 as a concentrating device, into which all devices are connected. Devices are connected to the hub 11 by data connectors 14a, 14b, and 14c, which are housed within network outlets 15a, 15b, and 15c respectively. Connections to the hub 11 are via cables 13a, 13b, and 13c respectively. Data connectors 14a, 14b, and 14c may be, for example, type RJ-45 connectors; and cables 13a, 13b, and 13c may be, for example, Category 5 cabling. Such configuration is described, for example, in EIT/TIA-568 and ELA/TIA-570. The data portion of network 10 uses data units (which may be computers) 7a, 7b, and 7c, which connect to network connectors 14a, 14b, and 14c via cables 16a, 16b, and 16c, respectively. A server 12 may also be connected to the hub 11, and can perform the external connection functionality, as well as other server functions as applied in the art.

Although FIG. 1 refers to the hub 11 as a concentrating device, it is to be understood that any type of device having multiple network interfaces and supporting a suitable connectivity can be used, non-limiting examples of which include shared hubs, switches (switched hubs), routers, and gateways. Hence, the term "hub" herein denotes any such device without limitation. Furthermore, network 10 can be a packet-based network, either in-building or distributed, such as a LAN or the Internet.

Home Networking.

Most existing offices and some of the newly built buildings facilitate the network structure of network 10. However, implementing such a network in existing buildings typically requires installation of new wiring infrastructure. Such installation of new wiring may be impractical, expensive and problematic. As a result, many technologies (referred to as "no new wires" technologies) have been proposed in order to facilitate a LAN in a building without adding new wiring. Some of these techniques use existing utility wiring installed primarily for other purposes such as telephone, electricity, cable television (CATV), and so forth. Such approach offers the advantage of being able to install such systems and networks without the additional and often substantial cost of installing separate wiring within the building.

The technical aspect for allowing the wiring to carry both the service (such as telephony, electricity and CATV) and the data communication signal commonly involves using FDM technique (Frequency Division Multiplexing). In such configuration, the service signal and the data communication signals are carried across the respective utility wiring each using a distinct frequency spectrum band. The concept of FDM is known in the art, and provides means of splitting the bandwidth carried by a medium such as wiring. In the case of a telephone wiring carrying both telephony and data communication signals, the frequency spectrum is split into a low-frequency band capable of carrying an analog telephony signal and a high-frequency band capable of carrying data communication or other signals. Such a mechanism is described, for example, in U.S. Pat. No. 4,785,448 to Reichert et al., and is also widely used in xDSL systems, primarily Asymmetric Digital Subscriber Loop (ADSL) systems.

Either in the case of FDM or any other technique, the wiring system is commonly required to support connection of a data unit to the data communication signal carried over the medium. Furthermore, it is commonly required that such a connection will make use of a standard interface having standard data communication connector. One approach is to use dedicated stand-alone, desktop style adapter device, connected between existing outlet and the data unit. Other approaches are described herein.

Functional Outlet Approach.

This approach involves substituting the existing service outlets with 'network' active outlets. Outlets in general (to include LAN structured wiring, electrical power outlets, telephone outlets, and cable television outlets) have evolved as passive devices being part of the wiring system house infrastructure and solely serving the purpose of providing access to the in-wall wiring. However, there is a trend towards embedding active circuitry in the outlet in order to use them as part of the home/office network, and typically to provide a standard data communication interface. In most cases, the circuits added serve the purpose of adding data interface connectivity to the outlet, added to its basic passive connectivity function.

An outlet supporting both telephony and data interfaces for use with telephone wiring is disclosed in U.S. Pat. No. 6,549,616 entitled 'Telephone outlet for implementing a local area network over telephone lines and a local area network using such outlets' to Binder. Such outlets are available as part of NetHome™ system from SercoNet Inc. of Southborough, Mass. USA.

Another telephone outlet is described in U.S. Pat. No. 6,216,160 to Dichter, entitled 'Automatically configurable computer network'. An example of home networking over CATV coaxial cables using outlets is described in WO 02/065229 published 22 Aug. 2002 entitled: 'Cableran Networking over Coaxial Cables' to Cohen et al. Such outlets are available as part of HomeRAN™ system from TMT Ltd. of Jerusalem, Israel. Outlets for use in conjunction with wiring carrying telephony, data and entertainment signals are disclosed in US Patent Application Publication US2003/0099228 to Alcock entitled 'Local area and multimedia network using radio frequency and coaxial cable'. Outlets for use with combined data and power using powerlines are described in US Patent Application Publication US2003/0062990 to Schaeffer et al. entitled 'Powerline bridge apparatus'. Such power outlets are available as part of PlugLAN™ by Asoka USA Corporation of San Carlos, Calif. USA.

While the active outlets have been described above with regard to networks formed over wiring used for basic services (e.g. telephone, CATV and power), it will be appreciated that the invention can be equally applied to outlets used in networks using dedicated wiring. In such a case, the outlet circuitry is used to provide additional interfaces to an outlet, beyond the basic service of single data connectivity interface. For example, it may be used to provide multiple data interfaces wherein the wiring supports single such data connection. An example of such outlet is the Network Jack™ product family manufactured by 3Com™ of Santa-Clara, Calif., U.S.A. In addition, such outlets are described in U.S. Pat. No. 6,108,331 to Thompson entitled 'Single Medium Wiring Scheme for Multiple Signal Distribution in Building and Access Port Therefor' as well as U.S. patent application US 2003/0112965 Published Jun. 19, 2003 to McNamara et al. entitled 'Active Wall Outlet'.

While the active outlets have been described with regard to outlets and networks based on conductive media such as wires and cables, it will be appreciated that such outlets are equally applicable in the case wherein the network medium is non-conductive, such as fiber-optical cabling. Active outlets supporting data interfaces and based on fiber optic cabling are described in U.S. patent application US 2002/0146207 Published Oct. 10 2002 to Chu, entitled 'Fiber Converter Faceplate Outlet', as well as in U.S. Pat. No. 6,108,331 to Thompson entitled 'Single Medium Wiring Scheme for Multiple Signal Distribution in Building and Access Port Therefor'. As such, the term 'wiring' as used in this application as well as in the appended claims should be interpreted to include networks based on non-conductive medium such as fiber-optics cabling.

While the outlets described above use active circuitry for splitting the data and service signals, passive implementations are also available. An example of such passive outlet is disclosed in PCT Publication WO 02/25920 to Binder entitled 'Telephone communication system and method over local area network wiring'. Such outlets are available as part of the etherSPLIT™ system from QLynk Communication Inc. of College Station, Tex. USA.

The described above outlets are complete and self-contained devices. As such, they can be easily installed in new houses instead of regular passive simple outlets. However, such solutions are not appropriate in the case of retrofitting existing wiring systems. In most cases, any such modification will require dismantling the existing outlets and installing the new ones having the improved features. Such activity is cumbersome, expensive and will often require professional skill. Furthermore, owing to safety aspects involved while handling hazardous voltages (such as in the powerlines and telephone lines), local regulations may require only certified personnel to handle the wiring, making it expensive and militating against a do-it-yourself approach.

Furthermore, as the technology and environment change in time, a need to upgrade, modify or change the outlet functionalities, features and characteristics may arise. For example, the data interface may need to be upgraded to interconnect with new standards. In another example, the circuitry may need to be upgraded to support higher bandwidth. Similarly, management and Quality of Service (QoS) functionalities may need to be either introduced or upgraded. In yet another examples, additional functionalities and interfaces may need to be added. Using complete self-contained outlets as a substitute to the existing ones also introduces the disadvantages described above.

Plug-in Device.

One approach to adding functionality to existing outlets is by using a plug-in module. A pictorial view of such a module 20 suitable for powerlines connection is shown in FIG. 2. The module plugs into a regular power outlet using prongs 22a and 22b, and provide access to a data unit via data connector 21 (shown as RJ-45 used for 10/100 Base-T IEEE802.3 interface). Optional visual indicators 23a, 23b and 23c may also be employed. The prongs 22a, 22b are used for both the electrical connection and for the mechanical attachment of the unit 20 to the power outlet. Such plug-in modules are described in US Patent Application Publication US 2002/0039388 to Smart et al. entitled 'High data-rate powerline network system and method', US Patent Application Publication US 2002/0060617 to Walbeck et al. entitled 'Modular power line network adapter' and also in US Patent Application Publication US 2003/0062990 to Schaeffer, JR et al. entitled 'Powerline bridge apparatus'. Such a module using HomePlug™ technology are available from multiple sources such as part of PlugLink™ products by Asoka USA Corporation of San Carlos, Calif., USA. HomePlug is a trademark of HomePlug Powerline Alliance, Inc. of San Ramon, Calif., USA.

However, such plug-in modules are known only with regards to power outlets, and are not available for telephone or CATV outlets. Furthermore, since the outlets in general, including power outlets, were not designed to offer any mechanical support beyond a plug connection, such plug-in modules are not mechanically secured to the wall/outlet, hence such attachment is not considered sustainable and reliable. Furthermore, such plug-in modules are bulky in appearance and not aesthetic.

There is thus a widely recognized need for, and it would be highly advantageous to have, a method and system for allowing reliable, easy and simple upgrading of outlets, preferably without requiring professional installation.

SUMMARY OF THE INVENTION

It is therefore an object of the invention to provide a method and system for allowing easy and simple upgrading of outlets, preferably without requiring professional installation. An add-on module is used for providing additional functionality to the existing outlet.

The invention describes an add on module for adding functionality to outlets serving existing wiring such as telephone, power and CATV and dedicated wiring such as LAN wiring (collectively 'service wiring', 'service outlet'). Non-conductive infrastructure such as fiber optics based is also included.

The add-on module (or 'module' herein) is both electrically connected and mechanically attached to the existing outlet. The mechanical attachment may be permanent or detachable, wherein the latter may be by hand or with specific tools. The electrical connection may use a mechanically fixed connector or tethered connector ('dongle'). In one aspect of the present invention, the module is mounted on the existing outlet by means of attaching to the outlet surface. Such attachment may use suction force, adhesive materials (e.g. glue) or VELCRO. VELCRO is a registered trademark of Velcro Industries B.V. In another aspect of the present invention, the module is attached to the sides of the outlets. Such attachment may use pressure or eccentric levers or securing strap. In another aspect of the present invention, the module is attached by inserting tabs between the outlet and the wall. In another aspect of the present invention, the module is attached by fastening screws, wherein the screws are inserted via the module and the holes in the outlets.

In another aspect of the present invention, the module is attached to the outlet by using a mechanical adapter. The adapter is attached to the outlet, and the module is independently attached to the adapter. The attachment of the adapter to the outlet may use any of the above described mechanical attachment methods. Similarly, the attachment of the module to the adapter may also use any of the described above methods, as well as latching, using magnetic forces and locking.

In another aspect of the present invention, the module is used in conjunction with a data network carried over wiring simultaneously serving basic service is described. The basic service may be telephony carried over telephone wiring, power carried over powerlines and CATV carried over coaxial cable television infrastructure, as well as data networking using dedicated LAN wiring. In such a case, the outlet comprises a data/service splitter/combiner for separating the basic service signal carried over the wiring, and allowing access thereto by a respective connector (telephone, power or CATV connector). The data signal is separated by a respective medium modem, and coupled to a data unit via a connector coupled to an adapter. A hub and management may be optionally employed as explained above.

In another aspect of the present invention, the module further comprises an adapter providing an analog interface such as analog video, analog voice and telephone.

In another aspect of the present invention, a non-wired interface, such as light (e.g. infrared), audio or radio frequency (wireless) based, is used for coupling to a data unit. In such a case, the data unit connector is substituted by an appropriate non-wired transceiver.

In conjunction with a wired Local area Network (LAN), a multi-port active network outlet is described. Such outlet comprises a transceiver to allow data communication over the network wiring. The outlet supports one or more connectors, each allowing for data unit coupling to the data communication signal by a respective transceiver. Furthermore, the outlet comprises an adapter and connected respective connector allowing for coupling a data unit to the data communication signal via a distinct interface. The outlet further optionally comprises a hub for the multiple data streams to be coupled. An optional management/processing functionality may also be embedded in the outlet.

In another aspect of the present invention, the module comprises passive components for the networking functionality. In another aspect of the present invention, the module comprises active components for the provided functionality (e.g. networking). In the latter case, the active circuitry within the module needs to be power fed in order to work properly. The module may be locally powered by a dedicated connection to a local power source (e.g. AC power, directly or via AC/DC converter). Alternatively, the module is power fed from a power signal carried over the wiring. In another aspect of the present invention, the module is powered by an appliance connected thereto.

In another aspect of the present invention, the module is used to provide non-networking functionalities. In such a case, part or all of the functionalities of a device which normally connects to the outlet, are integrated into the module. In another aspect of the present invention, the module is used to provide both electrical coupling to the service outlet as well as mechanical support. Such mechanical support can be used to hold and attach (and detach) appliances and devices to the module. The electrical connection may include only connection to the service signal (such as AC power in the case of power module). In other embodiments, the electrical connection may include coupling to the data signal carried over the service wiring (such as telephone module providing coupling to a data signal carried over telephone wiring). Other embodiments may include coupling the mechanically attached appliances to both the service and data signals carried over the wiring. For example, mobile and handheld appliances such as PDA and cellular telephones are described. In one aspect of the invention, such a module is used to add service connections to an outlet.

In one aspect of the present invention, a power module is described comprising power related functionalities such as multiple AC power sockets, power switch, lighting dimmer, safety means (e.g. fuse), lightning protection, visual or audible indicators, load control (such as fan speed control), timer switching, filters (e.g. noise filters) and sensors (such as security, heat and flood sensors). In one aspect of the present invention, a power module is described comprising power converter appliances such as AC/DC converters and chargers, such as PDA and cellular telephone chargers. In the case of chargers (such as for PDAs and cellular telephones), the module may include the cradle functionality (e.g. mechanical housing) for providing a mechanical support during charging. In one aspect of the present invention, a power module is described for providing a coupling to the data signal carried over the power wiring.

In one aspect of the present invention, a telephone module is described comprising telephone related functionalities such as multiple telephone jacks, filters (such as ADSL/HomePNA micro filters and noise filters), safety means (e.g. fuse), lightning protection, visual or audible indicators and sensors (such as security, heat and flood sensors). In one aspect of the present invention, a telephone module is described comprising power converter appliances and chargers, such as PDA and cellular telephone chargers. In the case of chargers (such as for PDAs and cellular telephones), the module may include the cradle functionality (e.g. mechanical housing) for providing a mechanical support during charging. In one aspect of the present invention, a telephone module is described for providing a coupling to the data signal carried over the telephone wiring. Other telephone appliances which may be integrated (in part or in full) or mechanically supported by a telephone module are described such as answering machines, modems (such as dial up or xDSL), telephone set (either landline or cordless) and caller-ID.

In one aspect of the present invention, a CATV module is described comprising telephone related functionalities such as RF splitter, filters, safety means (e.g. fuse), lightning protection, visual or audible indicators and sensors (such as security, heat and flood sensors). CATV Related appliances which may be integrated (in part or in full) or mechanically supported by a CATV module are described such as cable modem, set top box, VCR. DVD, DVR, television set, DRM devices.

In another aspect of the present invention, the module comprises visual (or audible or both) indicators for monitoring the module status. Such indicators may indicate power availability, proper operation of part or all of the circuitry included in the module, communication status (of either the wiring communication or the module connected device or both) and the status of the service signal.

In another aspect of the present invention, the module provides intangible added functionality to an outlet such as improved aesthetics or any other way of pleasing the eye. Non-limiting examples are color, texture and artistic shaping of the module.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

The invention is herein described, by way of non-limiting example only, with reference to the accompanying drawings, wherein.

DETAILED DESCRIPTION OF VARIOUS EMBODIMENTS

Figure 1:
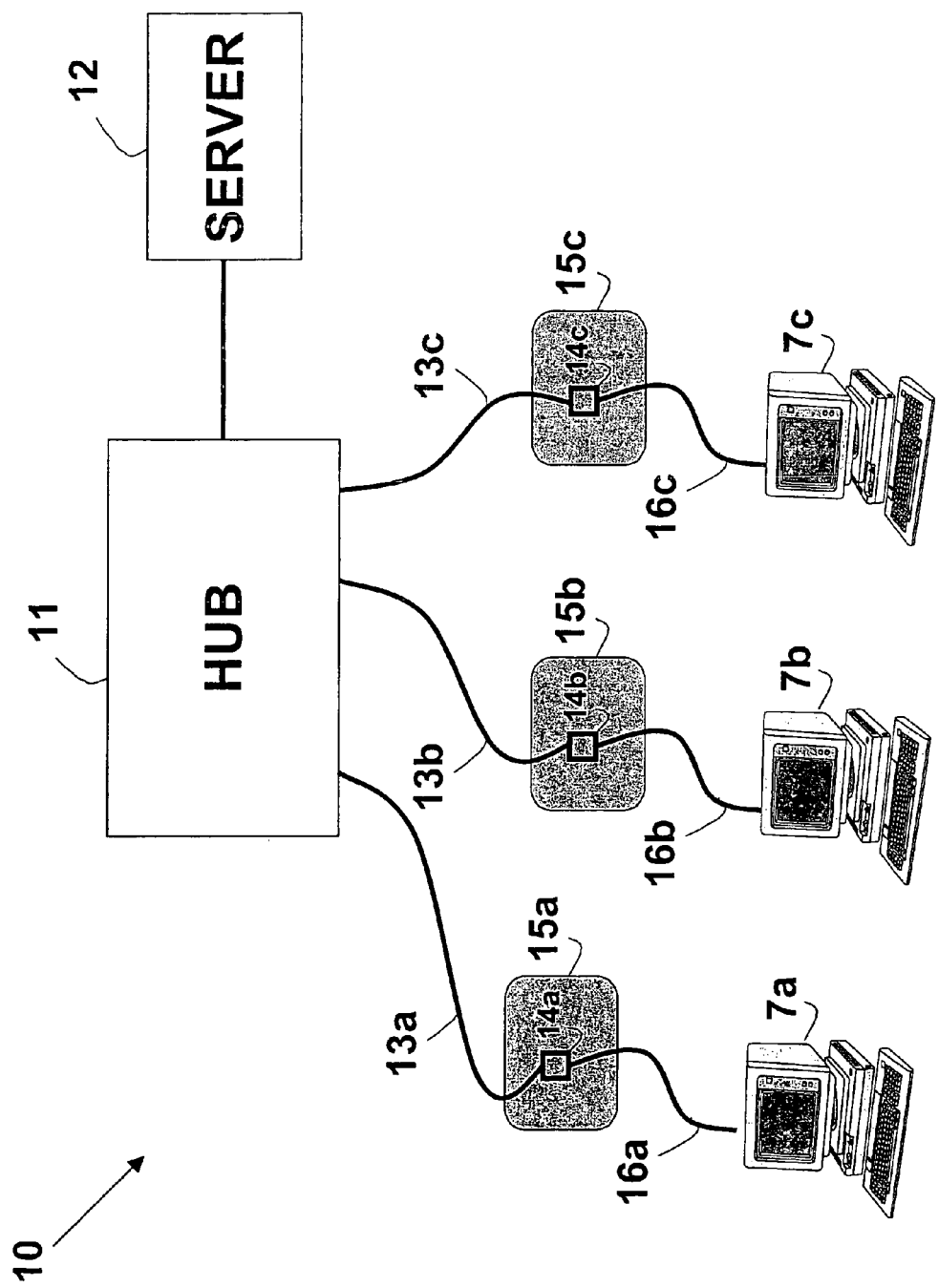
FIG. 1 shows an exemplary prior art local area network.
Figure 2:
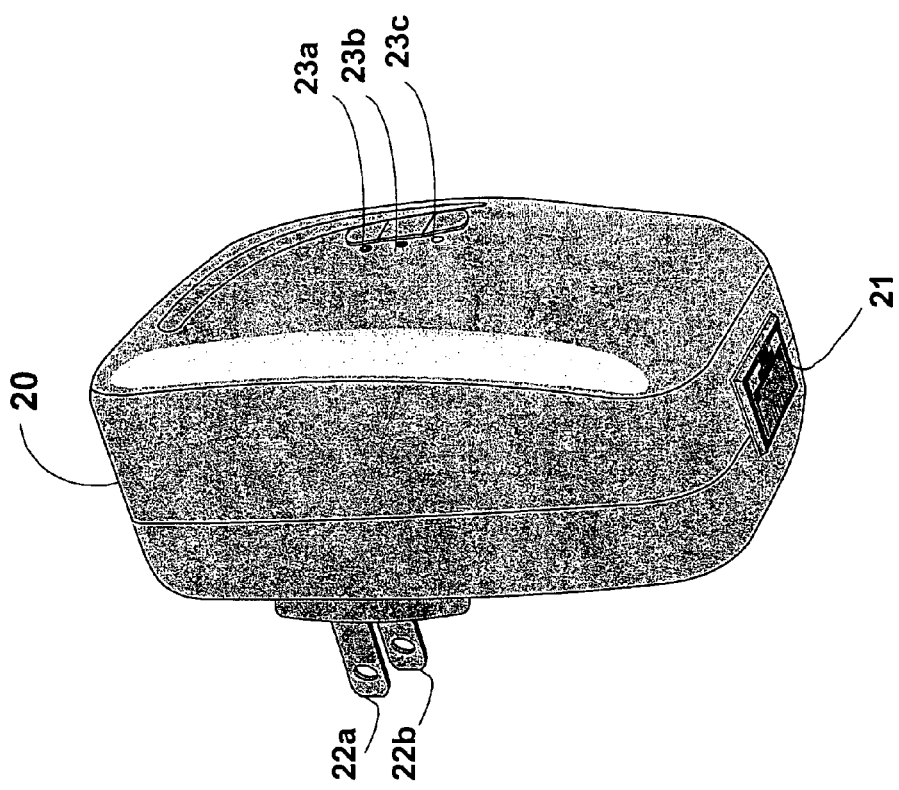
FIG. 2 shows a pictorial view of an exemplary prior art power module.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Module.

Figure 3B:
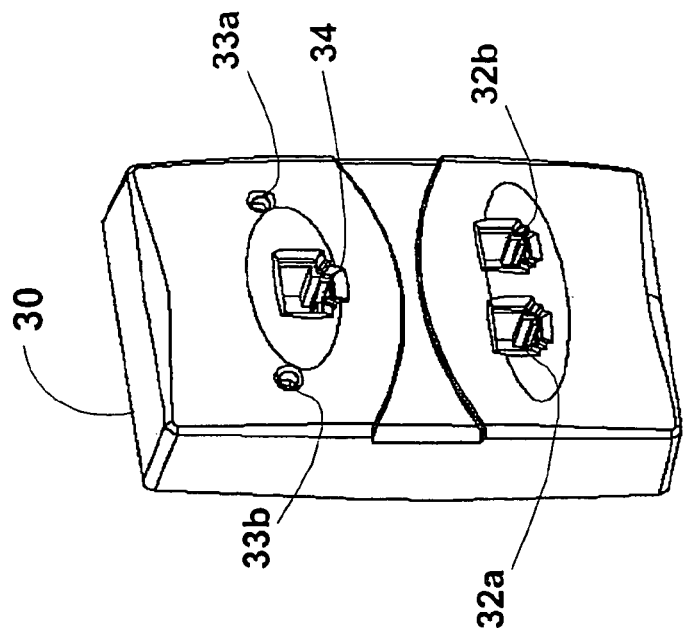
FIGS. 3a and 3b show respective rear and front schematic view of an exemplary prior art telephone outlet.
Figure 3A:
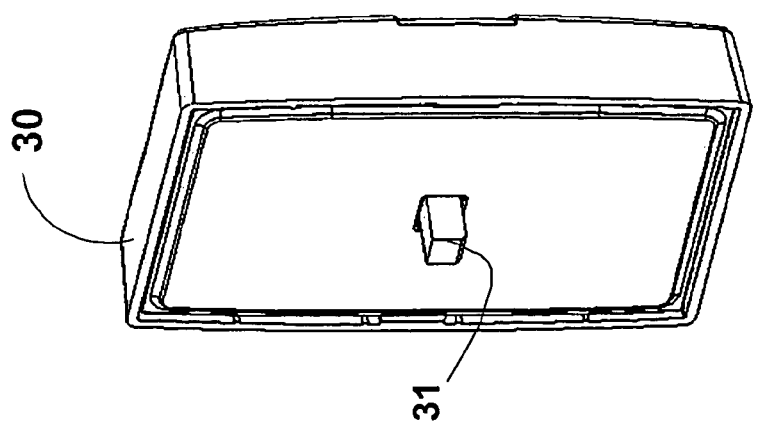

The present invention relates to a module that both connects electrically to an existing outlet and is also mechanically attached thereto. For the sake of simplicity, the invention will be herein first described with respect to a module for use in conjunction with a telephone outlet, in order to provide the electrical connection thereto. Front and rear views of a basic exemplary telephone module 30 are respectively shown in FIG. 3b and 3a. An RJ-11 telephone plug 31 is mounted on a rear surface of the module 30 so as to protrude outwardly therefrom for connecting to the outlet RJ-11 telephone socket. On the front surface of the module there are provided two RJ-11 sockets 32a and 32b, commonly in order to retain the telephone connectivity, and a RJ-45 connector 34 for data communication connection (such as common 10/100Base-T Ethernet interface). The module may also employ visual indicators such as 33a and 33b.

Surface Attachment.

In one or more embodiments of the present invention, the module is mechanically attached to the front surface of an existing outlet. This may be done using suction, for example.

Figure 4A:
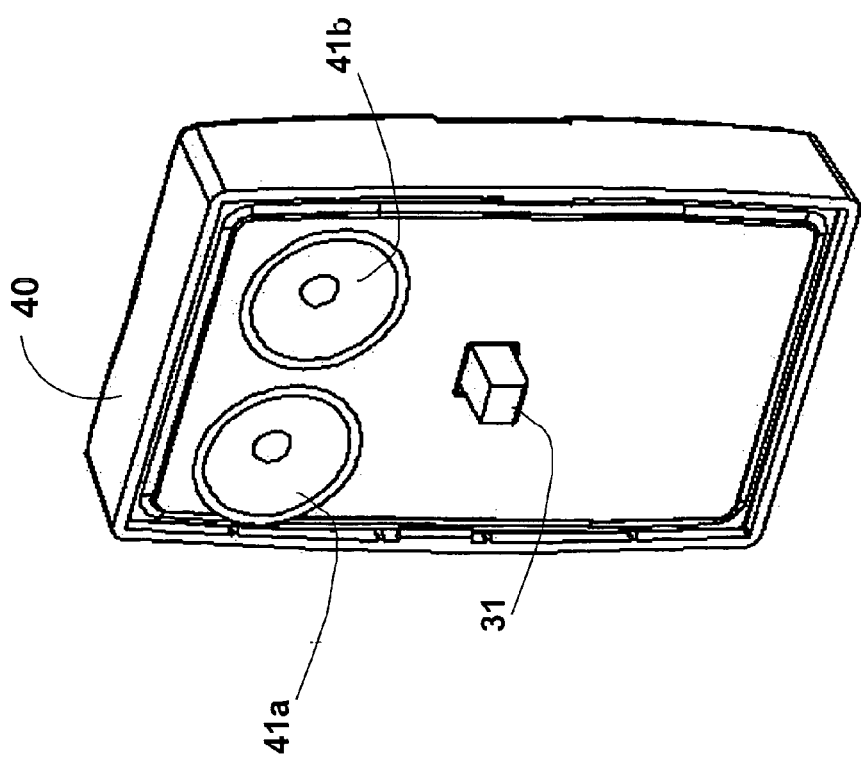
FIG. 4a shows schematically a rear view of an exemplary telephone module according to the present invention.
Figure 4B:
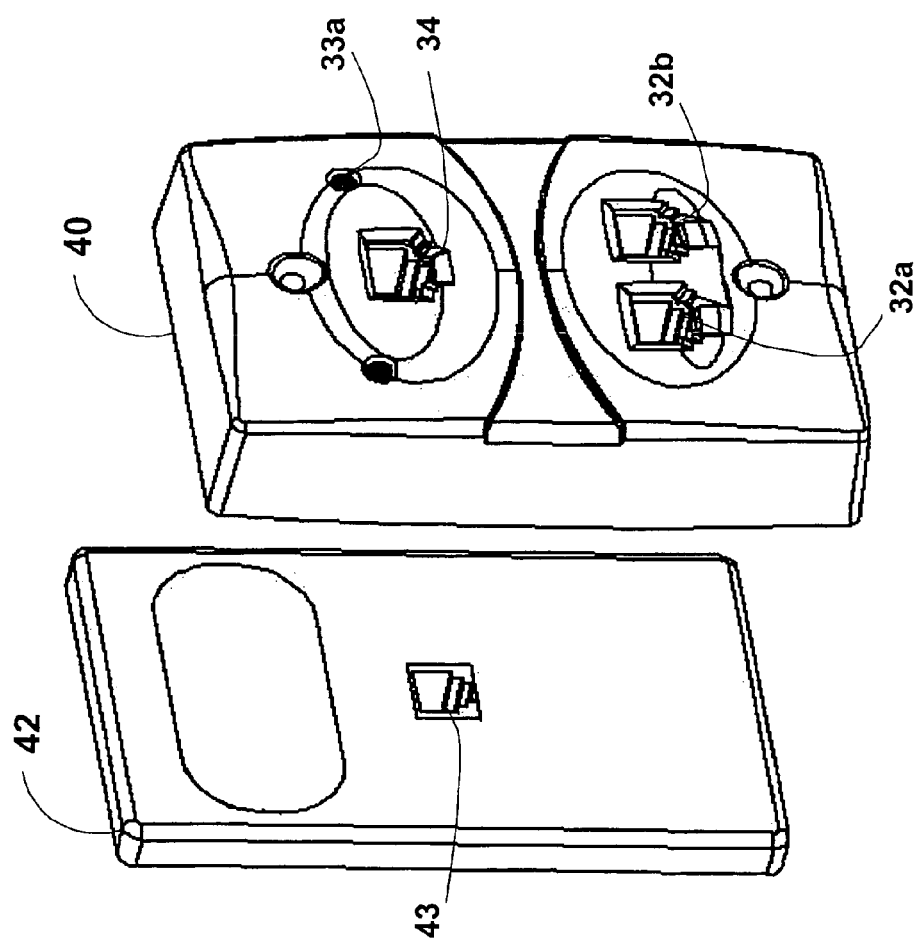
FIG. 4b shows schematically a front view of an exemplary telephone module according to the present invention.
Figure 4C:
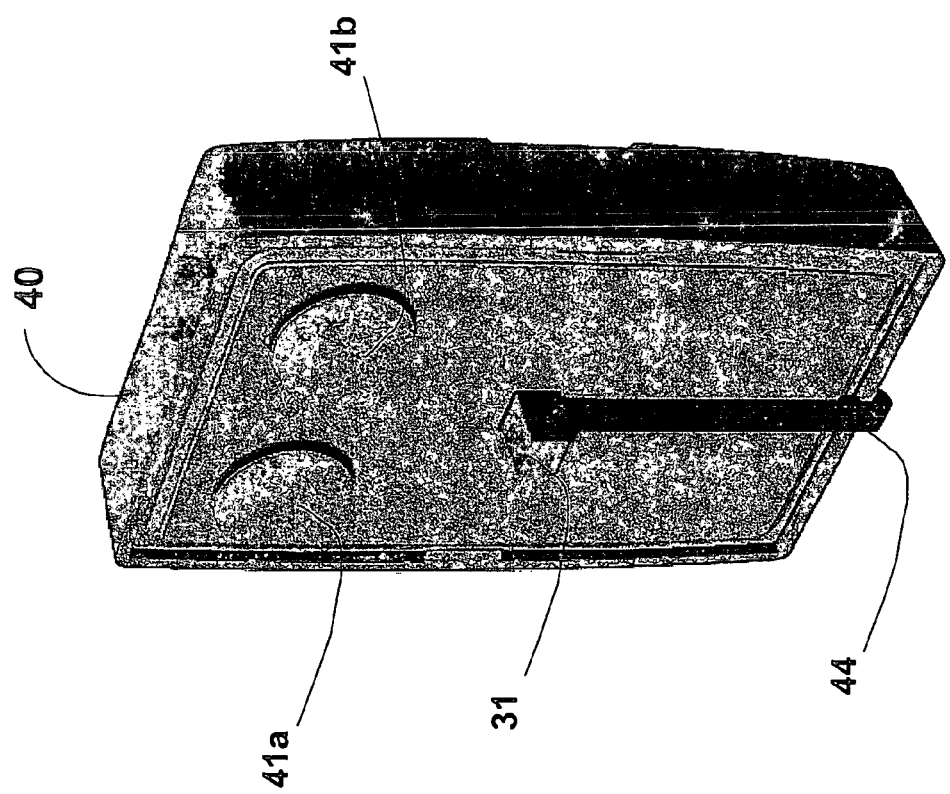
FIG. 4c shows pictorially a rear view of an exemplary telephone module according to the present invention.

In one or more embodiments of the present invention, the mechanical attachment uses suction for the mechanical attachment. FIG. 4a shows such a module where suction is used to attach the module to the front surface of an existing outlet. Added to the basic module 30, the module 40 comprises two suction pads 41a and 41b, which upon being pressed against the existing outlet 42 surface as shown in FIG. 4b, become attached thereto. Simultaneously, the connector 31 is mated with connector 43. While two suction units 41a and 41b are illustrated, any number of such units may be used providing that sufficient suction is created to support the weight of the module. A pictorial view of such a module 40 is shown in FIG. 4c, further showing a release lever 44 so that depressing the release lever 44 releases the connector 31 in order to detach the module 40 from the outlet 42.

Figure 5A:
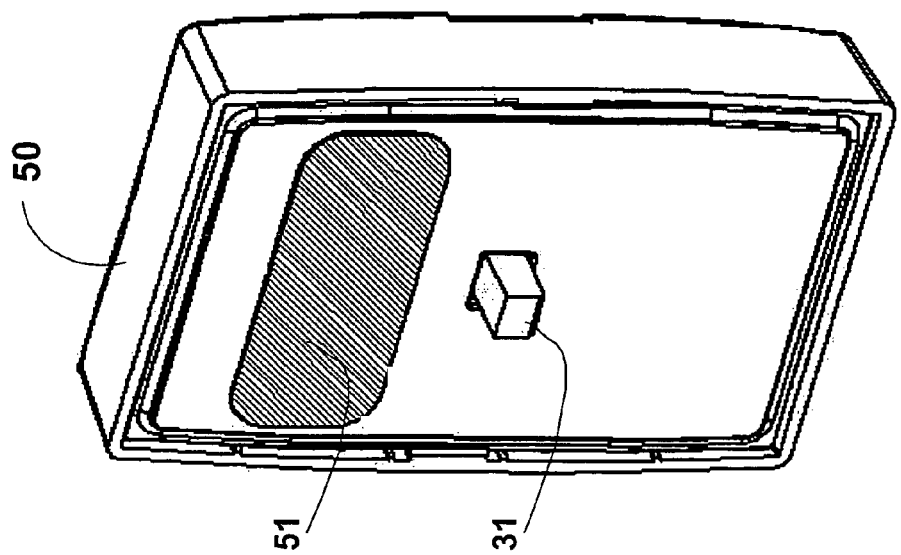
FIG. 5a shows schematically a rear view of an exemplary telephone module according to the present invention.
Figure 5B:
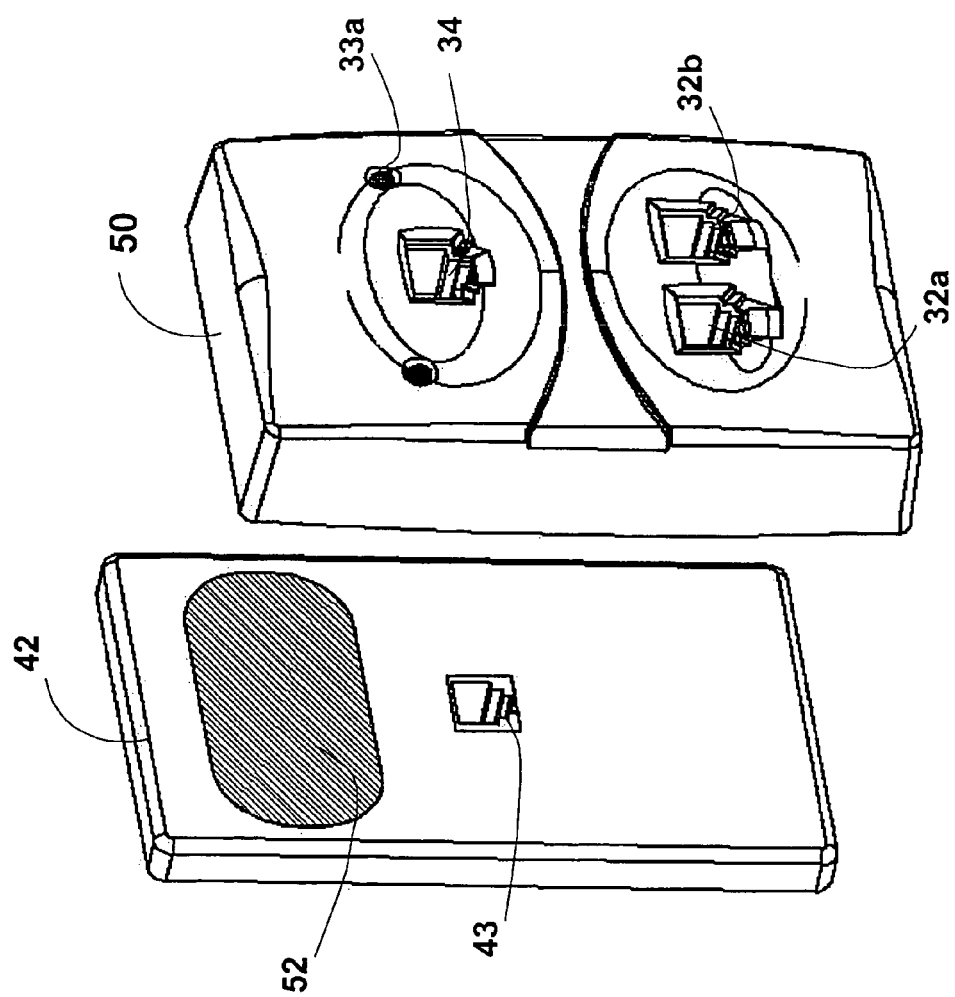
FIG. 5b shows schematically a front view of an exemplary telephone module according to the present invention.

According to another embodiment of the invention, the module is mechanically attached to the front surface of an existing outlet using adhesive material such as glue or adhesive stickers. The adhesive material may be applied to all or part of the surface area of the existing outlet, wherein contact with the module is required. FIGS. 5a and 5b show such an attachment of a module 50 to an outlet 42, wherein glue is applied to a specific area 51 (marked as shaded) of the module 50 and/or to the opposing surface 52 of outlet 42. In most cases, such attachment is permanent.

Alternatively, releasable mechanical attachment can be achieved by using so called "hook and loop" fasteners, such as VELCRO, or any other releasably joined surfaces. In this approach mating Velcro strips are attached to both the existing outlet and the module (e.g. by means of adhesives) on opposing and contacting surfaces, such that mechanical attachment is formed by juxtaposing the mating strips. The module can be separated from the outlet by applying enough force to release the VELCRO fastener.

As described above, the present invention uses two approaches for mechanical attachment, namely permanent and detachable. In the permanent solution, such as the gluing described above, the module is attached to the existing outlet and cannot be easily detached therefrom, thus creating a joined outlet/module unit. In the detachable approach, where, for example, suction or VELCRO are used, the module may be detached and separated from the outlet, allowing for returning to the pre-attachment state. The separation of the module from the outlet may be easy and bare handed (such as in the case of Velcro, for example), or use standard or specific tools (e.g. screwdriver).

Figure 6:
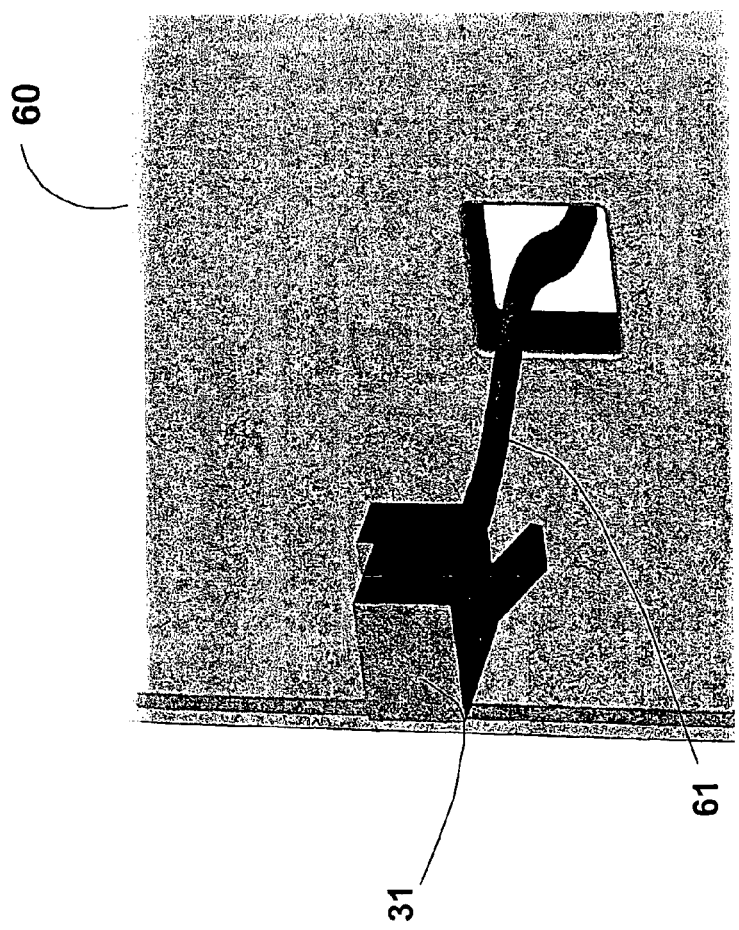
FIG. 6 shows pictorially a part of a rear view of an exemplary telephone module according to the present invention.

The electrical connection between the existing outlet and the module is made via utility connectors, such as RJ-11 jacks for telephony as described above. In one more embodiments of the present invention, the connector also aids and enhances the mechanical attachment. As described above, the RJ-11 plug is fixed and attached to the module, thus providing the additional mechanical support. However, some connectors are not designed for such mechanical stress and may be harmed in such usage or affect the reliability of the electrical connection. In one or more embodiments of the present invention, the connector is used solely for the electrical connection. In such a case, the mating connector in the module is not fixed to the enclosure but rather connects via a cable ('dongle' approach). An exemplary configuration is shown in FIG. 6 illustrating a RJ-11 plug 31 connected to the module 60 (a portion of whose rear part is shown) via a short cable 61. Mounting of a module on an existing outlet typically requires connecting the connector in the module to the mating connector in the outlet, followed by the mechanical attachment. In the case wherein the attachment is not permanent, the module connector should be unplugged as part of the separation process.

Side Clamping.

Figure 7A:
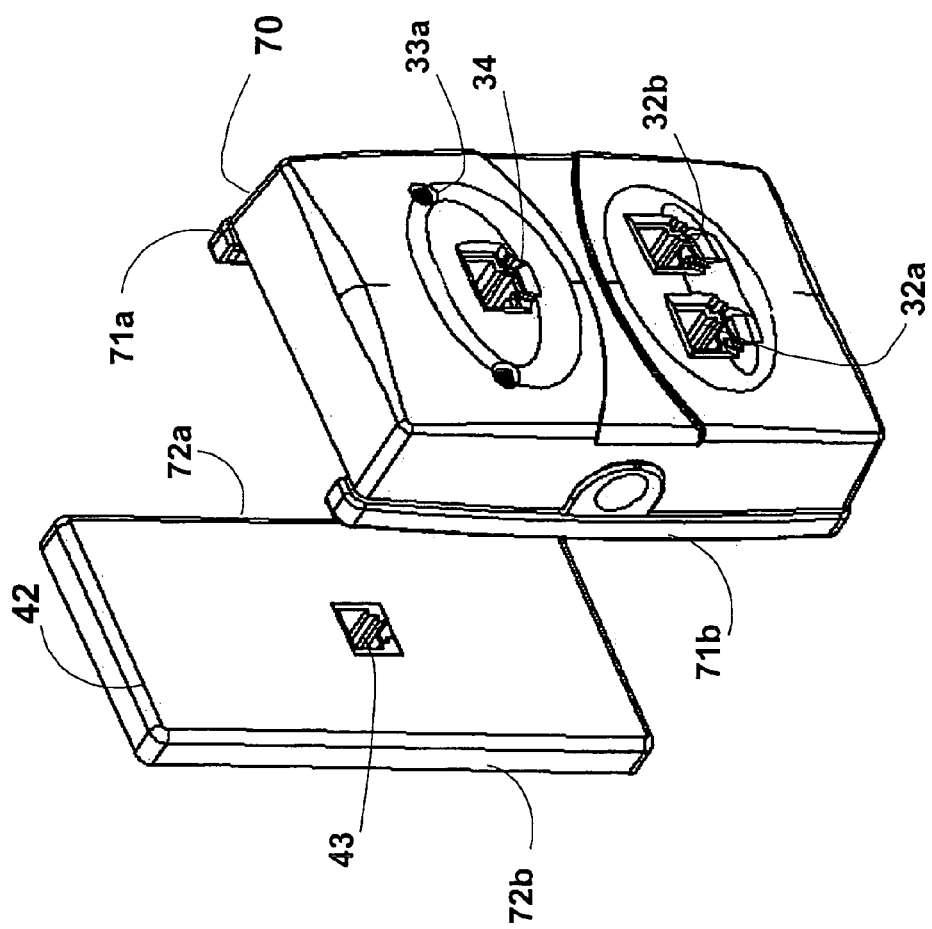
FIGS. 7a and 7b shows schematically a front view of an exemplary telephone module according to the present invention.
Figure 7B:
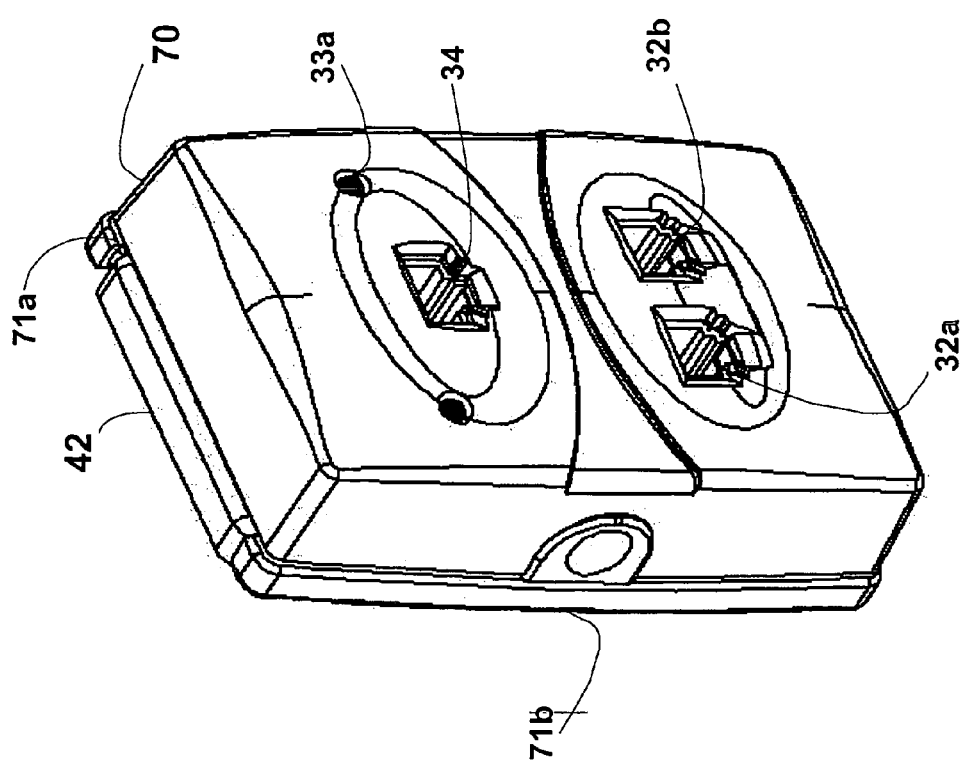

In accordance with other embodiments of the invention, side clamping is employed whereby the module is attached by means of modules parts pressed against the sides of the existing outlets. Such a configuration is illustrated in FIGS. 7a and 7b. A module 70 shown is based on basic module 30 described above, further having movable side bars 71a and 71b that may be splayed apart and released so as to engage respective edges 72a and 72b of the outlet 42. Side bars 71a and 71b may be resiliently mounted on the outer surface of the outlet so as to be capable of mutual outward separation. Alternatively, the edges 72a and 72b of the outlet 42 may be provided with an outwardly protruding ridge that engages the respective side bars 71a and 71b, in which case it is sufficient to rely on the elasticity of the outlet casing to ensure a snap fit between the recesses and the respective ridges. Springs may be used to provide the pressing forces. The module 70 attached to outlet 42 is shown in FIG. 7b. Although in the figures, the peripheral side bars 71a and 71b are mounted on side edges of the outlet, they can equal well be mounted on upper and lower edges thereof.

Figure 8A:
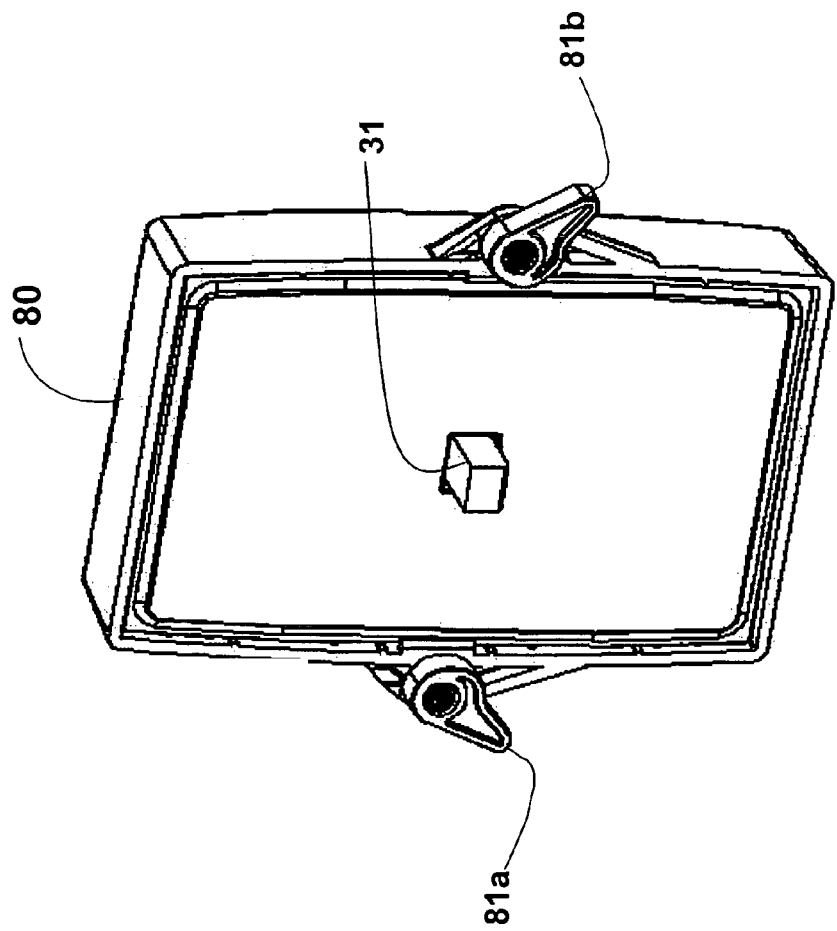
FIG. 8a shows schematically a rear view of an exemplary telephone module according to the present invention.
Figure 8B:
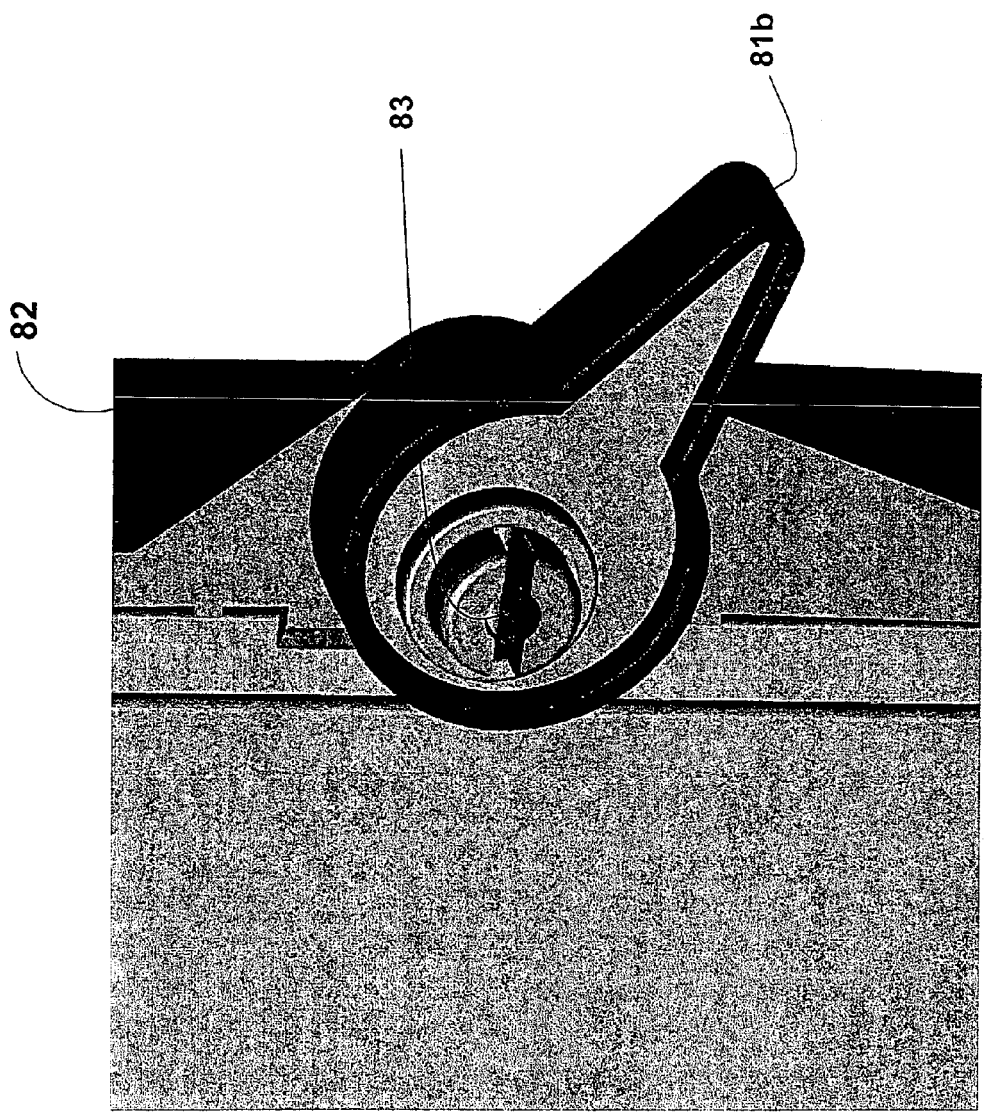
FIG. 8b shows pictorially a part of a rear view of an exemplary telephone module according to the present invention.
Figure 8C:
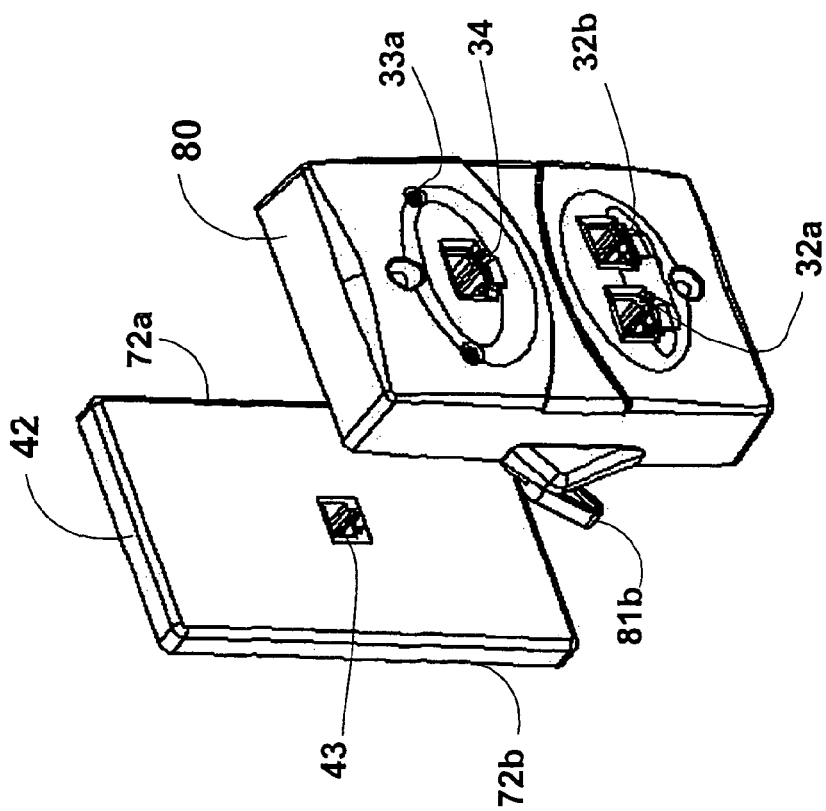
FIG. 8c shows schematically a front view of an exemplary telephone module according to the present invention.

FIG. 8a shows a module 80 having a pair of eccentric levers 81a and 81b, constituting an eccentric lever mechanism. As shown in the detailed view 82 in FIG. 8b, the lever 81b may swivel about axis 83. Upon attaching the module 80 to the outlet 42 as shown in FIG. 8c and pushing the levers in a first direction (e.g. upward), the levers 81a and 81b are pressed against respective side surfaces 72a and 72b of the outlet 42 thus 'locking' the module 80 to the outlet 42. Rotating the levers 81 in a second, opposite direction (e.g. downward), unlocks the module 80 from the outlet 42.

Figure 9A:
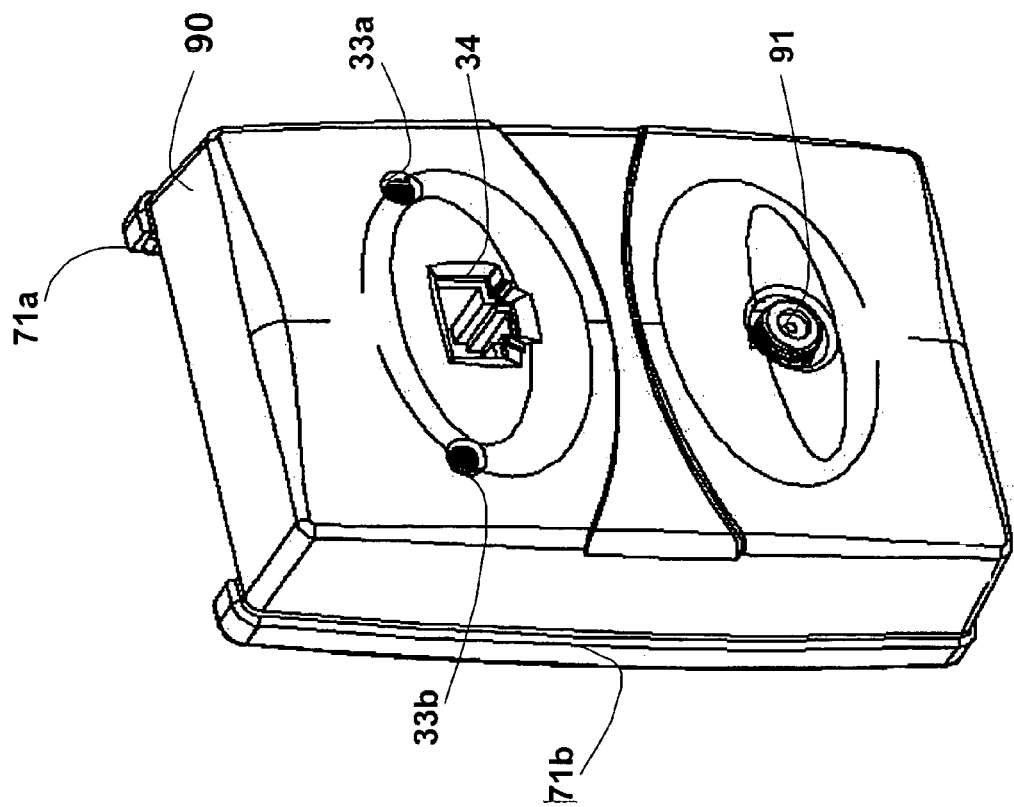
FIGS. 9a and 9b show schematically a front view of an exemplary CATV module according to the present invention.
Figure 9B:
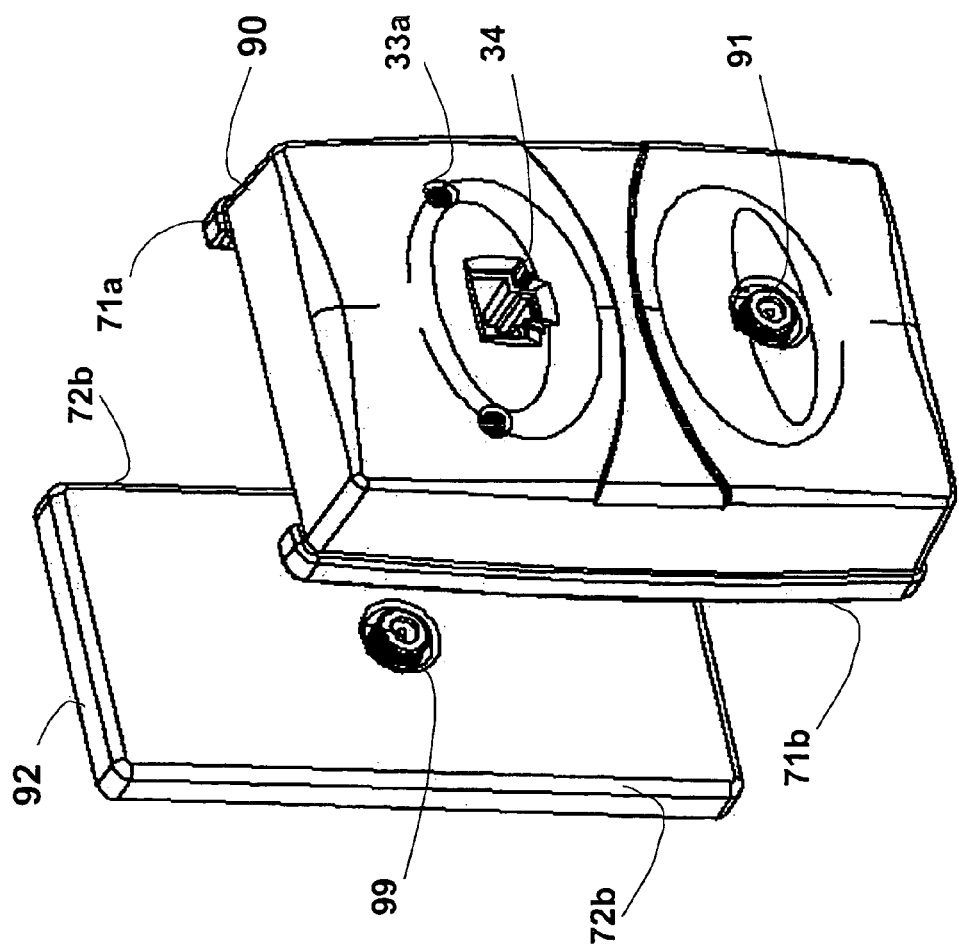

While the invention has been described with regard to a module for installing onto a telephone outlet, it will be appreciated that the invention equally applies to other outlets, such as power and CATV outlets. An example of a module 90 using side clamping as described above is shown in FIG. 9a. Similar to module 70 described above, the module 90 comprises a data connector 34, indicators 33a and 33b, as well as movable side bars 71a and 71b. Instead of the telephone jacks 32a and 32b of module 70, an RF connector 91 is employed. The connector 91 may be F-Type connector common in CATV system in North America, BNC type or any other. As shown in FIG. 9b, the module 90 is attached to a CATV outlet 92 having RF connector 99, which may be F-Type jack common in CATV system in North-America, BNC type or any other coaxial cable connector. In a similar manner as described above, the module 90 is attached and secured to the outlet 92 via peripheral side bars 71a and 71b that engage respective side edges 72a and 72b of the outlet 92.

Figure 9C:
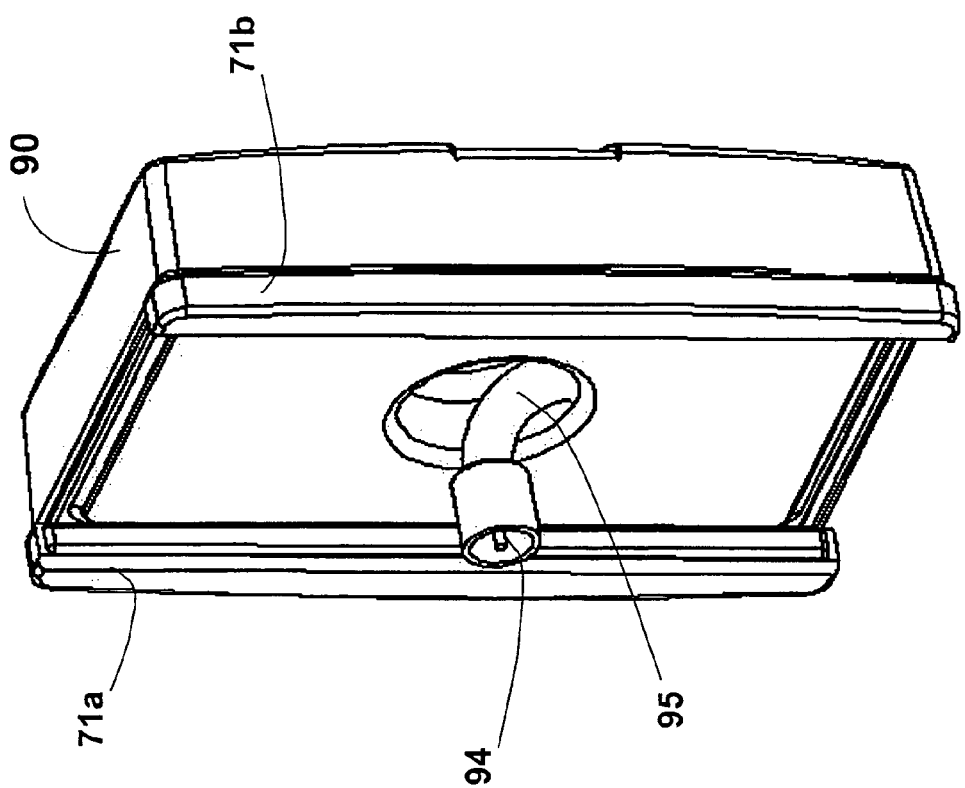
FIG. 9c shows schematically a rear view of an exemplary CATV module according to the present invention.

FIG. 9c shows a snap-on module 90 having an RF plug 94 that is flexibly mounted via a short cable 95. However, the plug may equally well be rigidly mounted to the outlet.

Figure 10A:
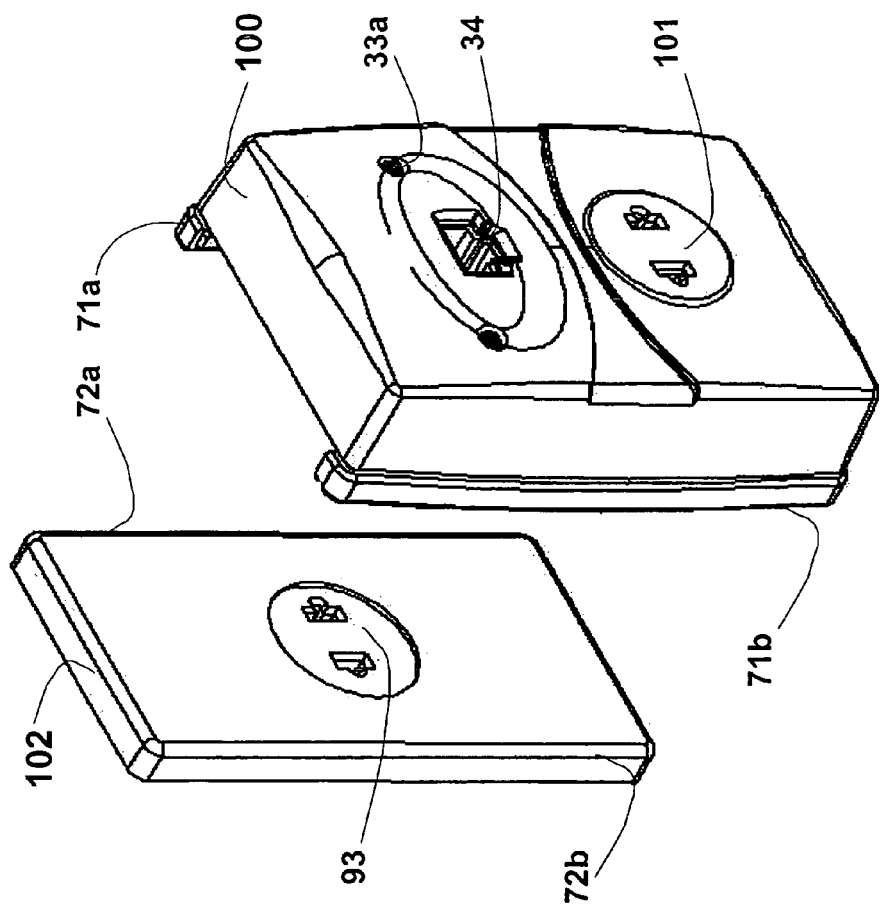
FIGS. 10a and 10b show schematically a front view of an exemplary power module according to the present invention.
Figure 10B:
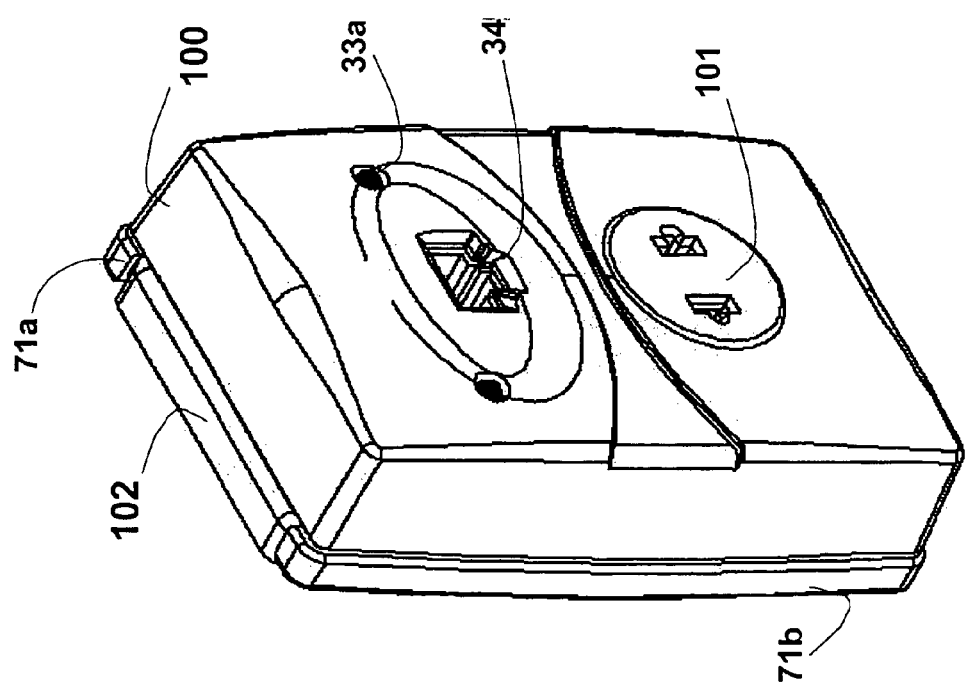

An example of a module for use with power outlets is shown as module 100 in FIG. 10a. Serving in conjunction with power delivery wiring the module comprises a power receptacle 101 shown to support two prong appliances common in North America. Other features are similar to modules described above. The module 100 can snap onto the power outlet 102, as shown in FIG. 10b, connecting to an outlet power receptacle 93 and mechanically attached to its side surfaces 72a and 72b as explained above. While a 2-prong outlet and plug are described, it will be appreciated that the same applies for 3-prong outlets and plugs.

Snap Locking.

Figure 11A:
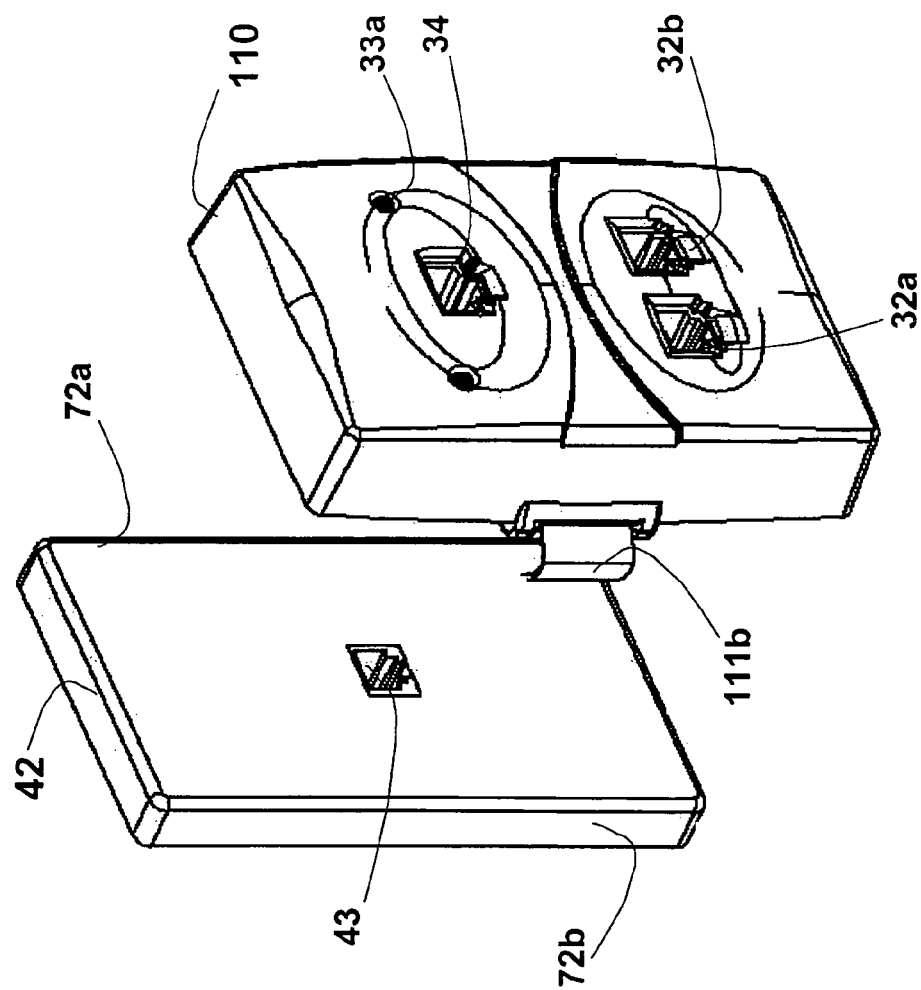
FIGS. 11a and 11c show schematically a front view of an exemplary telephone module according to the present invention.
Figure 11B:
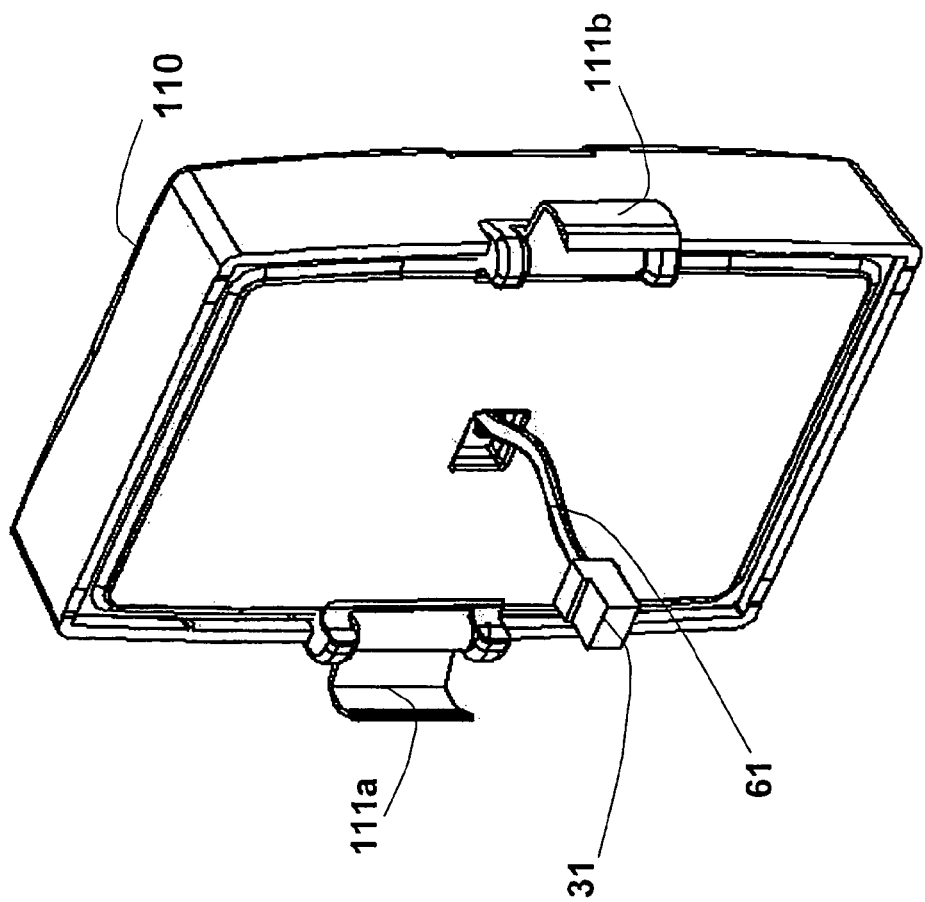
FIG. 11b shows schematically a rear view of an exemplary telephone module according to the present invention.
Figure 11C:
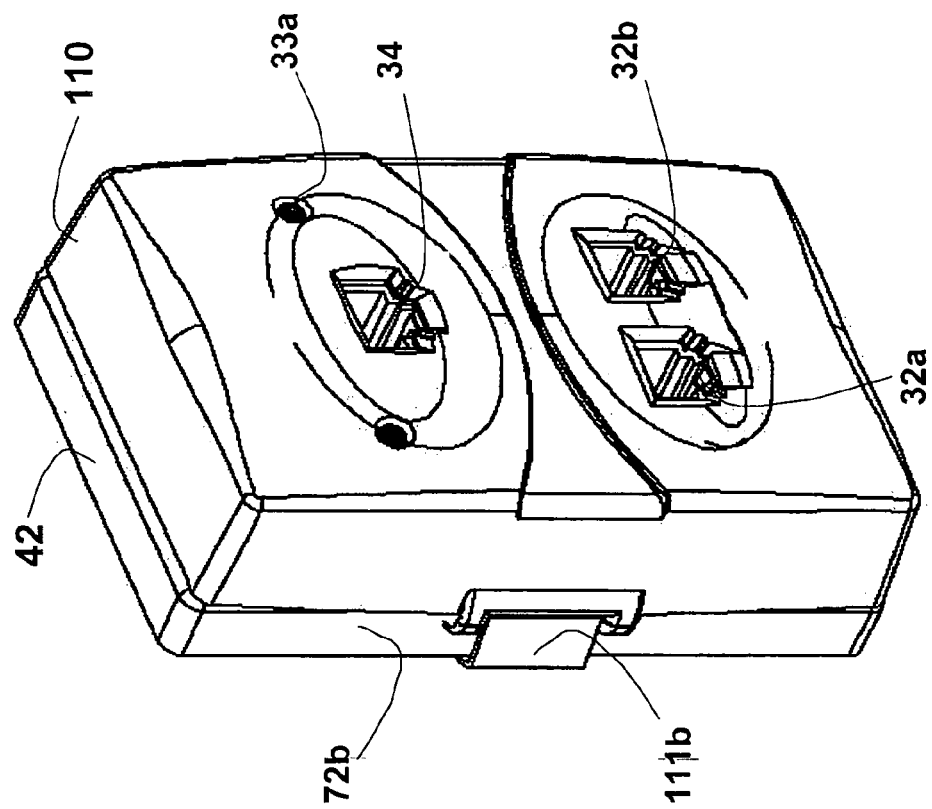
Figure 11D:
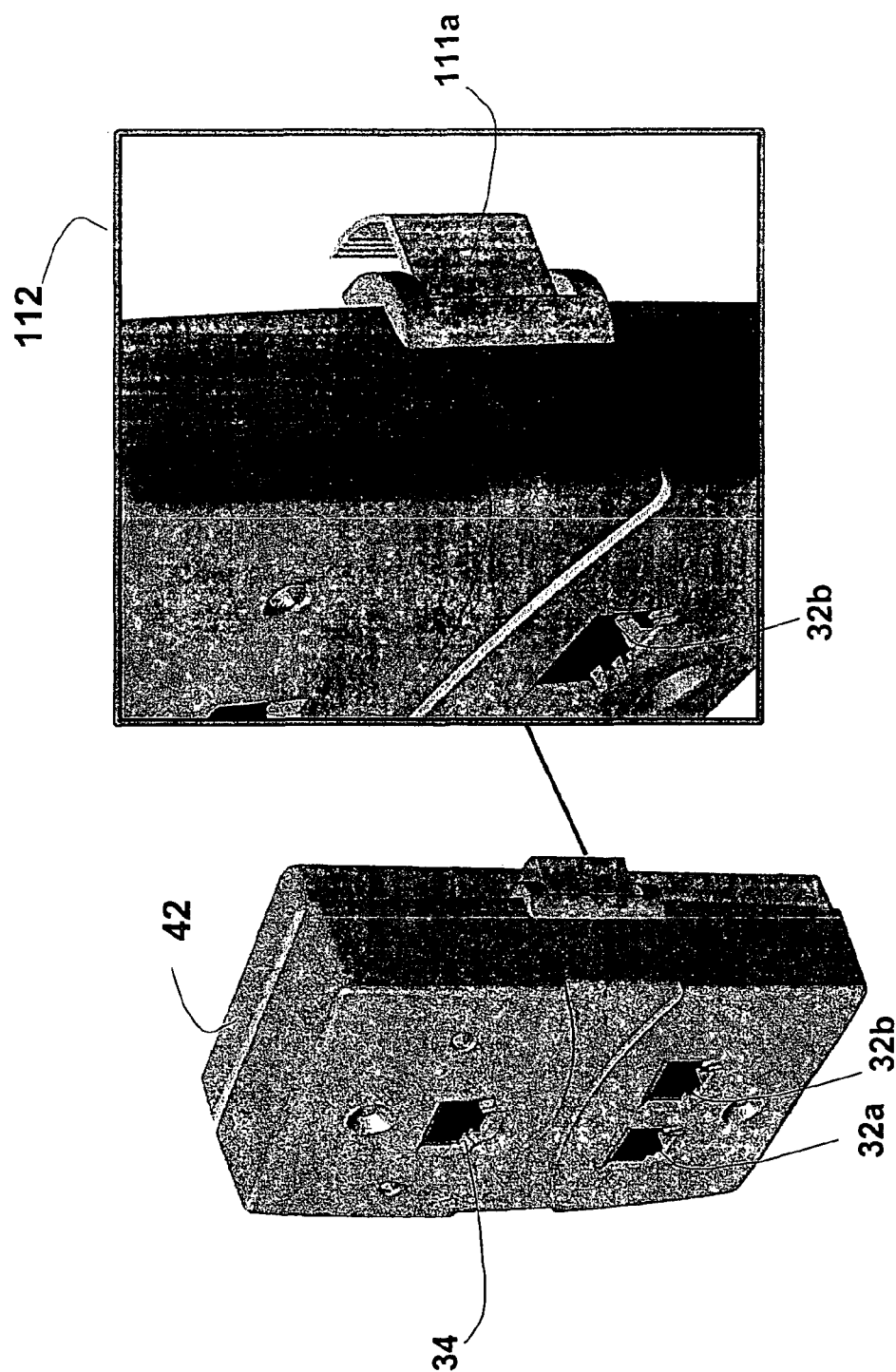
FIG. 11d shows pictorially a front view and part thereof of an exemplary telephone module according to the present invention.

In one or more embodiments according to present invention the module is attached to the existing outlet by inserting a tab between the outlet faceplate and the wall. Such a module 110 is shown in FIG. 11a. The module 110 is based on the module 30, wherein two swing latches 111a (shown in FIG. 11d) and 111b are added, as shown in FIG. 11b. Upon attachment of the module 110 to outlet 42, a snap lock action is achieved by swinging the latches 111a and 111b, such that the latches are forced between the outlet 42 and a wall on which the outlet 42 is mounted. Such action attaches the module 110 to the outlet 42 as shown in FIG. 11c. FIG. 11d shows a detailed view 112 of the latch 111a. In this example, no simple releasing mechanism of latches 111 is described.

Band/Strap Securing.

While the invention has been described with regard to the attachment means being an integral part of the module, it will be appreciated that the invention equally applies to the cases wherein the mechanical attachment means are decoupled from both the existing outlet and the module. Such an approach is now demonstrated herein by way of non-limiting example with regard to the use of a securing strap or band.

Figure 12A:
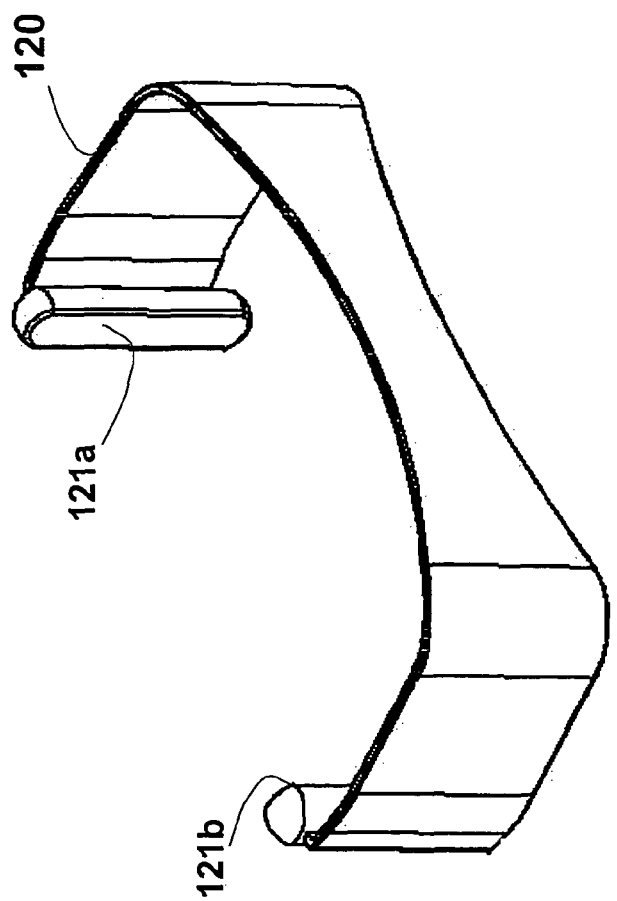
FIG. 12a shows schematically a strap for use with a module according to the resent invention.
Figure 12B:
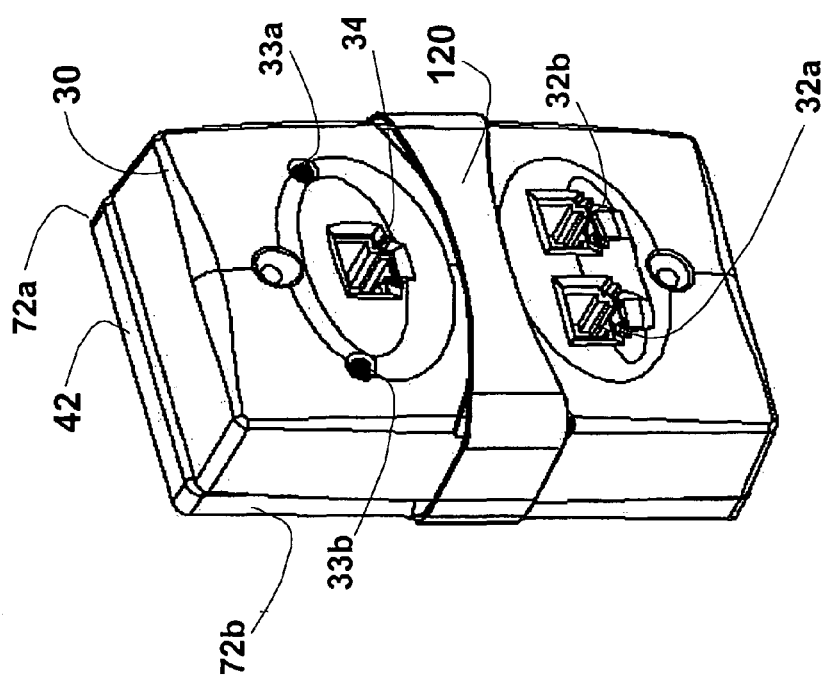
FIG. 12b show schematically a front view of an exemplary telephone module according to the present invention.

A U-shaped securing band or strap 120 is illustrated in FIGS. 12a and 12b. The band 120 is stiff yet provides some degree of elasticity, and comprises two rigid abutments 121a and 121b. The band 120 is used to urge the module 30 against the outlet 42, wherein the abutments 121a and 121b abut a rear surface of the outlet 42, thus securing the mechanical attachment.

Figure 13A:
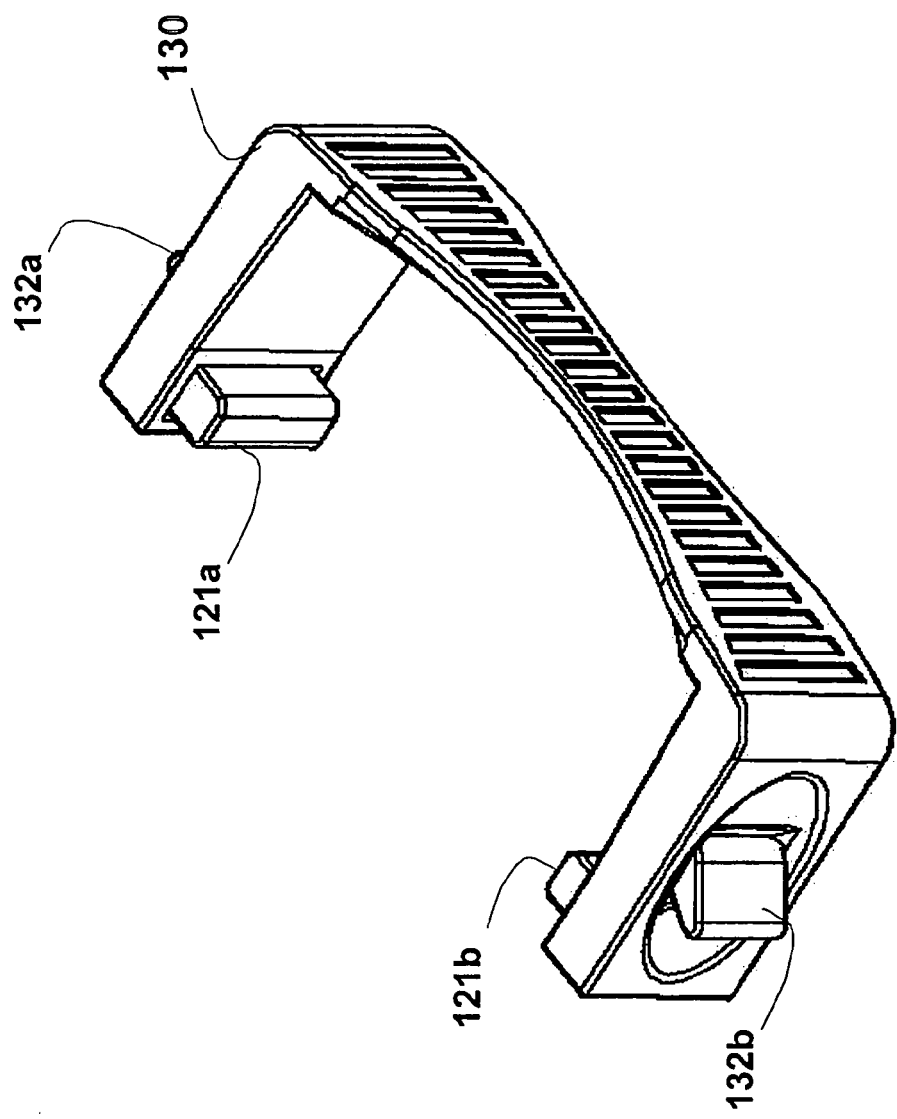
FIG. 13a shows schematically a strap for use with a module according to the present invention.
Figure 13B:
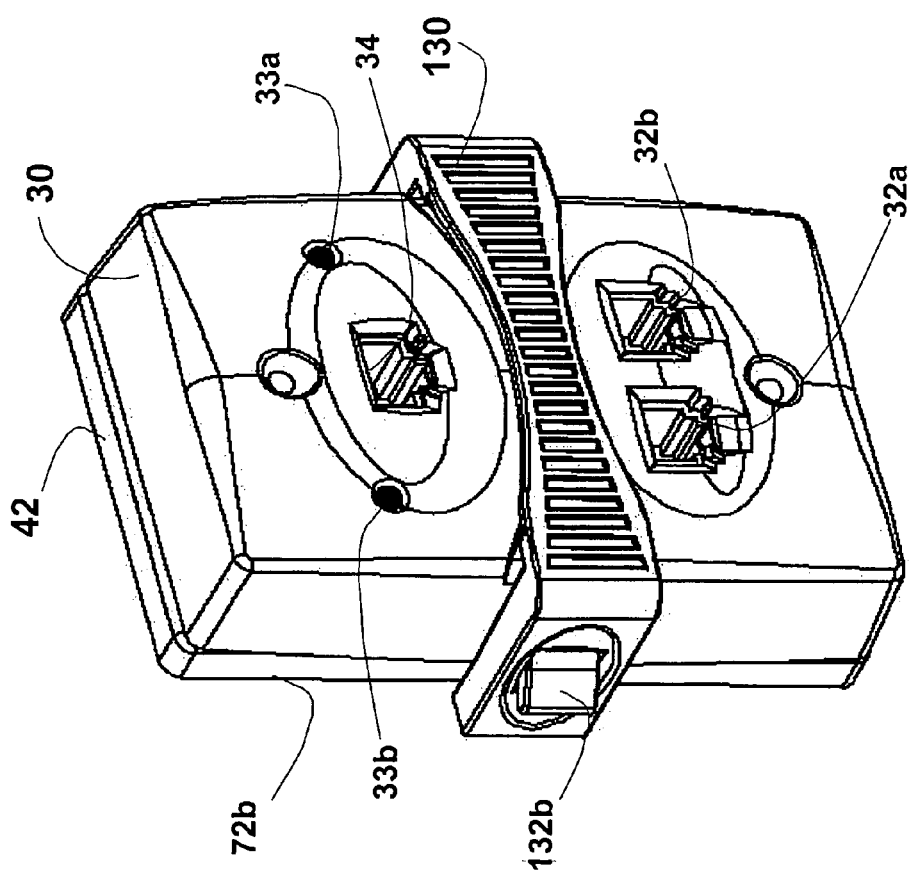
FIG. 13b show schematically a front view of an exemplary telephone module according to the present invention.
Figure 13C:
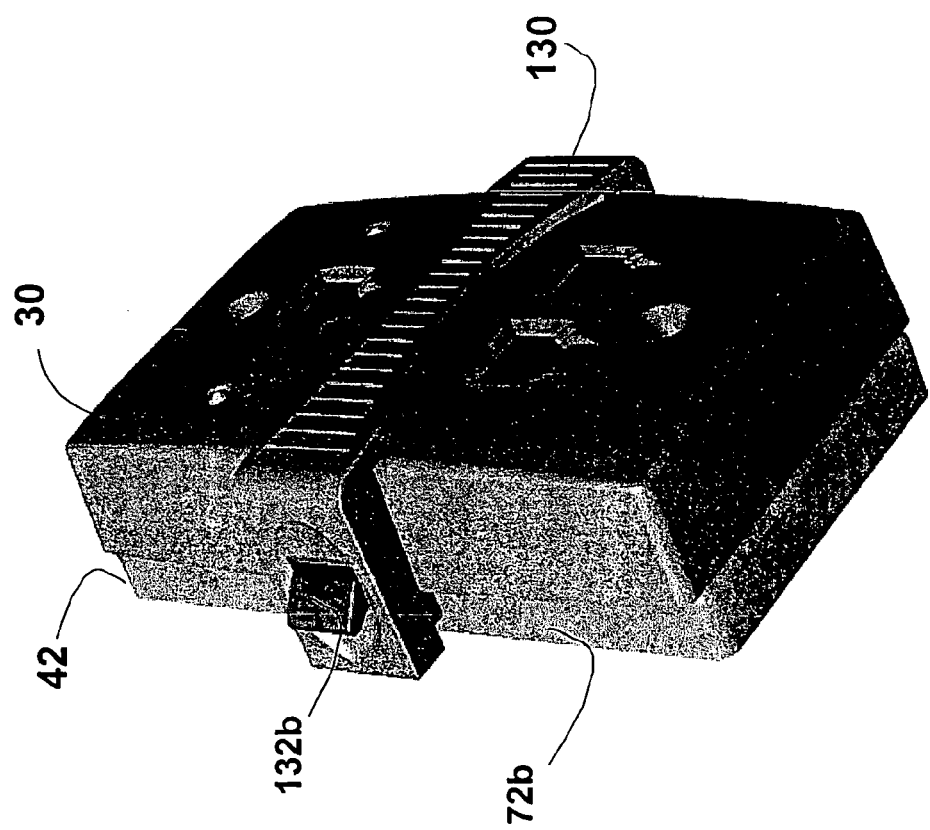
FIG. 13c shows pictorially a front view of an exemplary telephone module according to the present invention.

FIG. 13a shows a similar band 130 whose abutments 121a and 121b are articulated to respective levers 131a and 131b. A module 30 attached to an outlet 42 using the band 130 is illustrated in FIG. 13b and in FIG. 13c. The levers 131a and 131b may be used to latch and secure the surfaces 121a and 121b in place, or alternatively may be used for releasing their pressure, thus enabling easy and quick separation of the module 30 from the outlet 42.

While the invention has been described with regard to a limited number of attachment techniques such as surface attachment, side clamping, snap locking and strap securing, it will be appreciated that the invention applies equally to other methods and means supporting mechanical attachment and electrical connection of a module to an outlet. Furthermore, it will be appreciated that any combination of the above methods or any combination of any one described method with another method falls within the scope of the present invention.

Fastening Screws

Figure 14A:
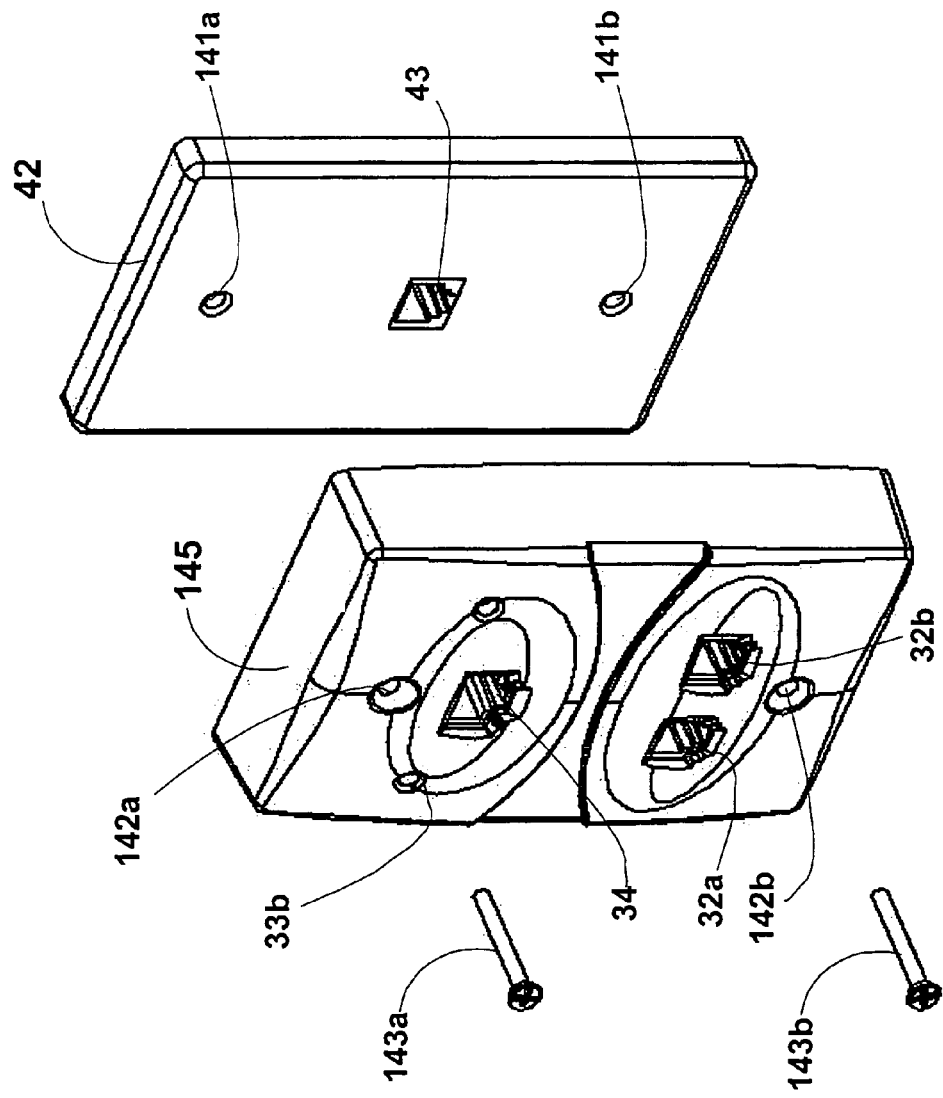
FIGS. 14a and 14b show schematically a front view of an exemplary telephone module according to the present invention.

Common existing outlets are comprised of two parts: a plastic faceplate mounted at the front of the outlet, and the outlet body which is secured to the wall. In most cases, the faceplate is fastened to the outlet body by one or two screws. In one or more embodiments, screws are used for securing the module to the outlet. If desired, the same screws may be used for securing the faceplate to the outlet body. A faceplate 42 of an outlet with screws removed is shown in FIG. 14a, illustrating threaded apertures 141a and 141b. The Figure also shows a module 145, having two thru-holes 142a and 142b. Screws 143a and 143b are inserted through the respective thru-holes to the module 145 so as to threadably engage the threaded apertures 141a and 141b in the outlet 42 thereby securing the module 145 to the outlet body. The screws 143 are longer than the ones used just for securing the outlet faceplate alone.

Figure 14B:
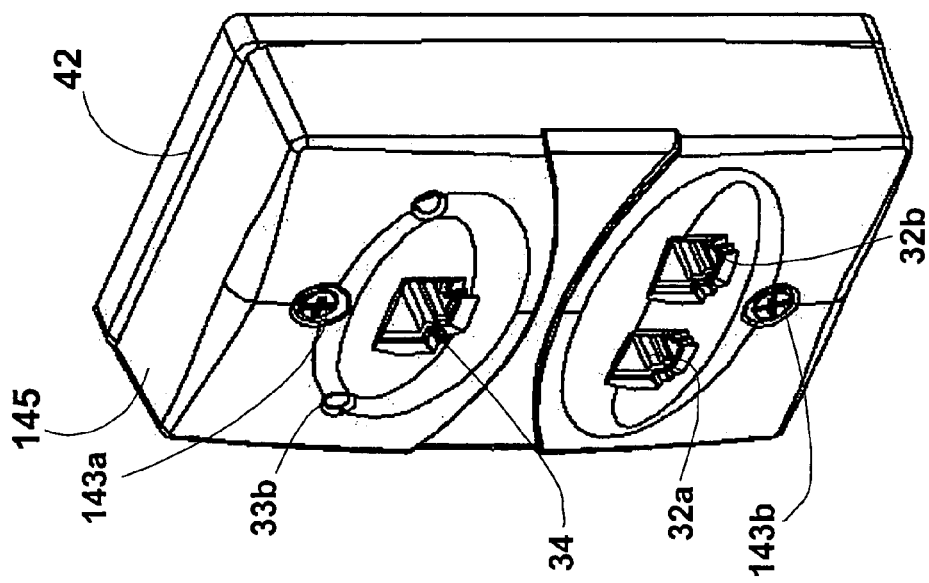

Upon tightening the screws 143 the module 145 is mechanically attached to the outlet 42 as shown in FIG. 14*b*. Unscrewing the screws 143 allows the separation of the module 145 from the outlet 42. It should be noted that in this embodiment, faceplate 42 of the outlet may be eliminated upon attaching the module to the outlet.

Adapters.

The invention has been described above with respect to the case wherein the module directly mounts on the existing outlet, without using any intermediary device (except adhesives). However, in many cases it may be beneficial to use a discrete mechanical adapter between the outlet and the module. When using such mechanical adapter, the adapter is to be attached to both the existing outlet and to the module. One advantage of using such adapter is the capability of mounting the same module to various outlet configurations, using different adapters for each outlet type. Another advantage involves the capability to easily exchange modules types, while obviating the need to replace the mechanical adapter.

In the configuration of using a mechanical adapter, two mechanical attachments are involved. One is the attachment of the adapter to the existing outlet, and the other involves attaching the module to the mechanical adapter. The above mechanical attachments are of course in addition to the need for the electrical connection of the module to the outlet. According to the invention, the two attachments, namely the outlet/adapter and the adapter/module are fully decoupled and independent. For example, each attachment may be permanent or removable. Furthermore, in some applications the outlet/adapter attachment will be executed first, while other applications may call for the adapter/module attachment to be performed first.

Each or both of the outlet/adapter and adapter/module attachments may use any of the above described attachment methods, such as side clamping, surface attachment, snap locking and strap/band securing, or any other attachment methods and means. For the sake of simplicity, an example describing only adapter/module attachments will now be described.

Latch/Snap-Fit Adapter

Figure 15A:
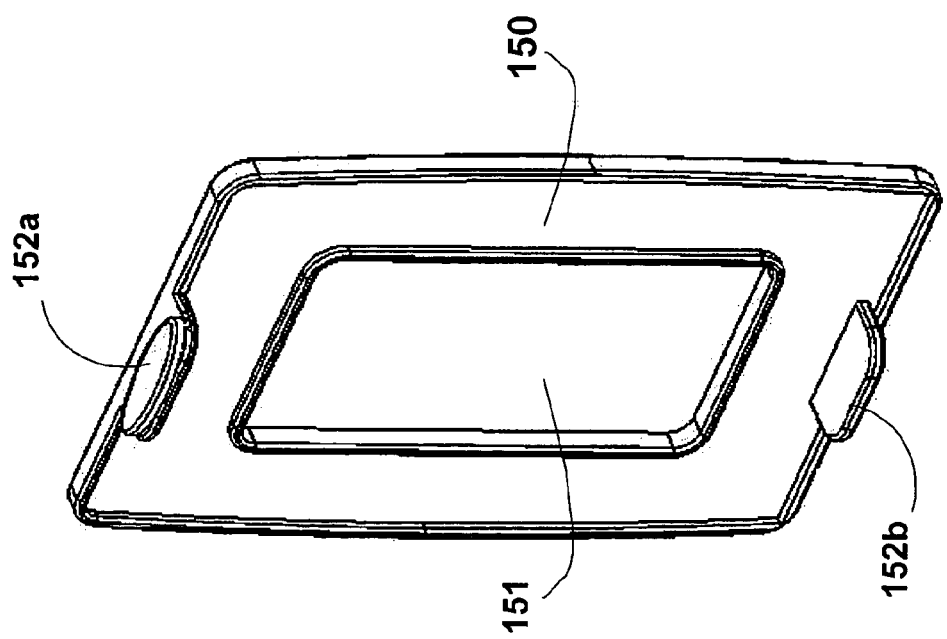
FIG. 15a shows schematically an adapter for use with a module according to the present invention.
Figure 15B:
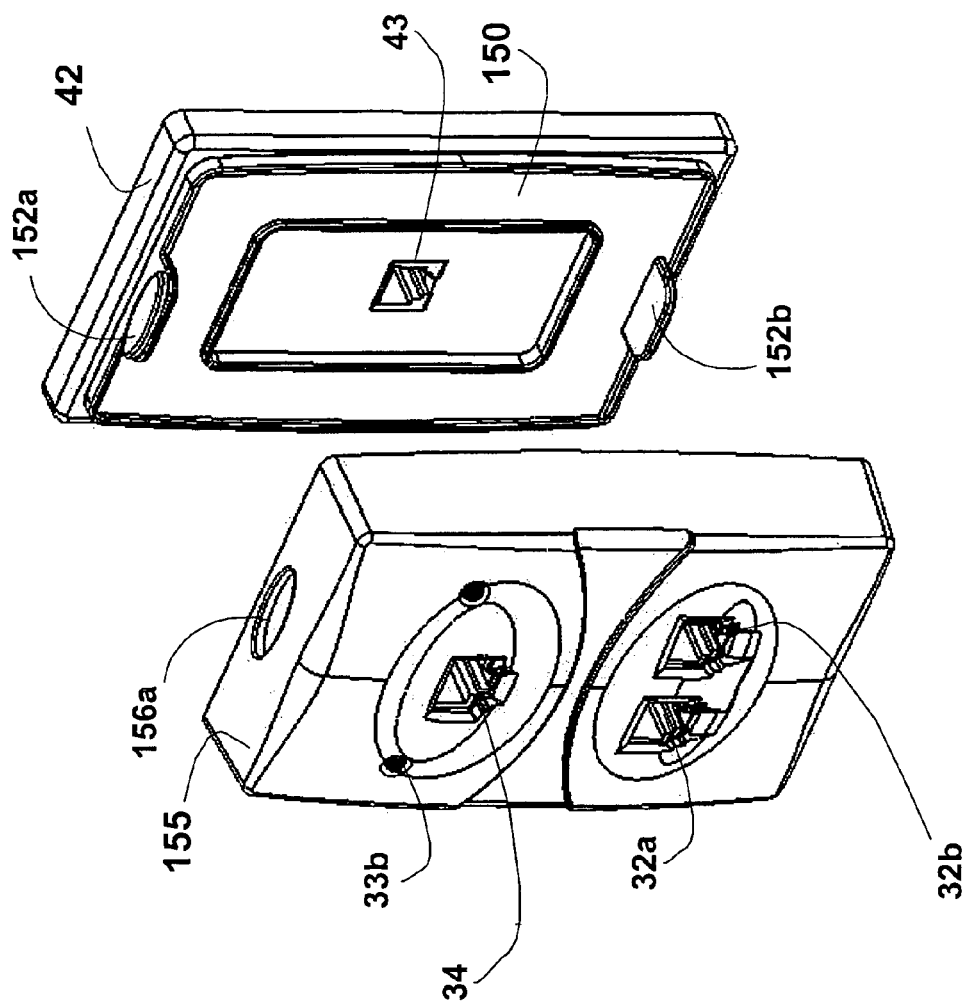
FIGS. 15b and 15c show schematically a front view of an exemplary telephone module according to the present invention.
Figure 15C:
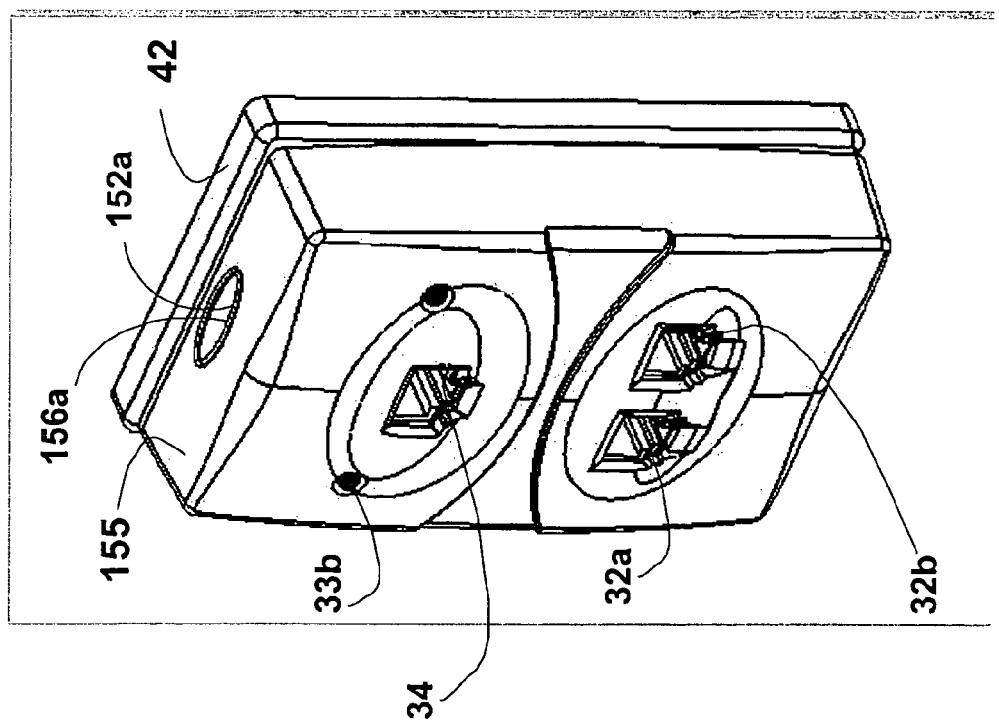

An exemplary latch/snap-fit adapter 150 according to the present invention is illustrated in FIG. 15*a*. In this example, the mechanical adapter 150 is attached to the outlet using surface attaching, such as adhesives. An opening 151 in the adapter 150 allows access to the existing outlet jack. Two snap-fit connectors are provided each comprising a flexible tab having a respective outwardly projecting lug 152*a* and 152*b* on outermost faces thereof for attaching to the snap-on module. The adapter 150 is first attached (e.g. glued) to the existing outlet 42 as shown in FIG. 15*b*. The adapter 150 is used in conjunction with module 155 shown in FIG. 15*b*. The module 155 has apertures, of which only one 156*a* is shown, in opposite surfaces and being dimensioned for engaging corresponding ones of the lugs 152*a* and 152*b* whereby the module 155 is snap-fitted on to the outlet 42 as shown in FIG. 15*c*.

Figure 15D:
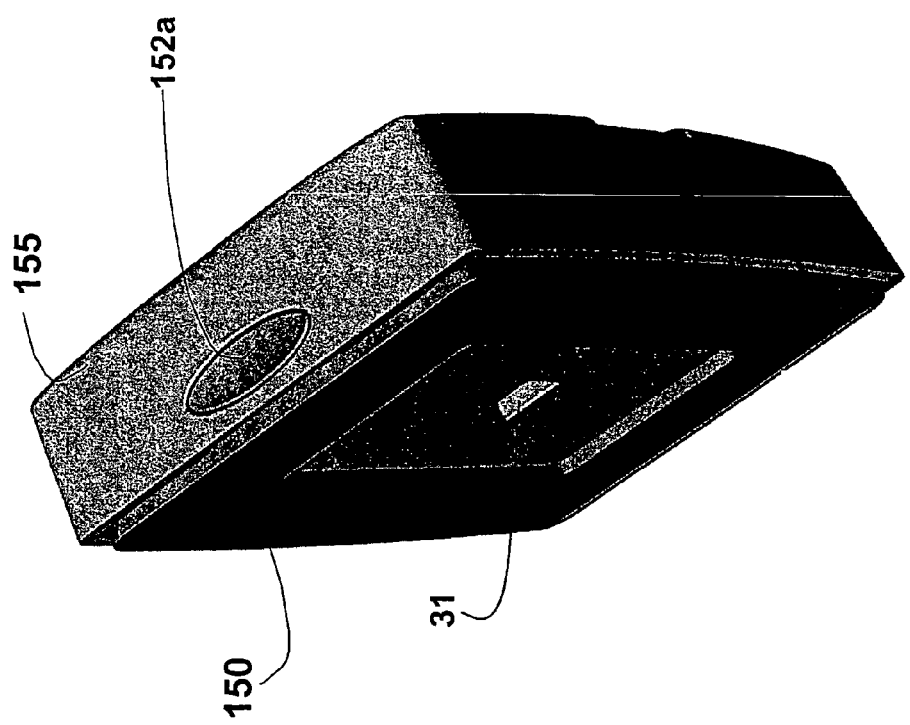
FIG. 15d shows pictorially a view of an exemplary telephone module according to the present invention.
Figure 16A:
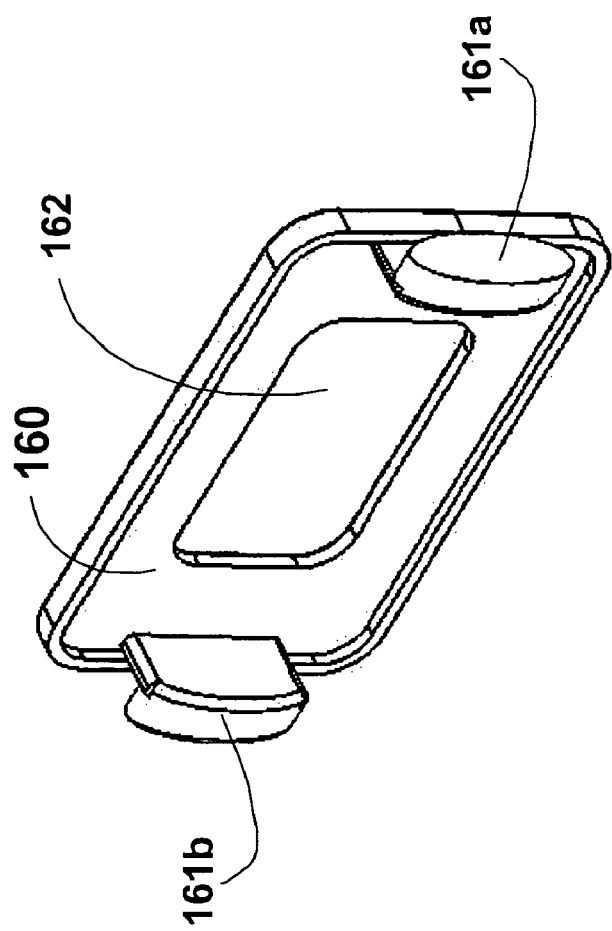
FIG. 16a shows schematically an adapter for use with a module according to the present invention.
Figure 16B:
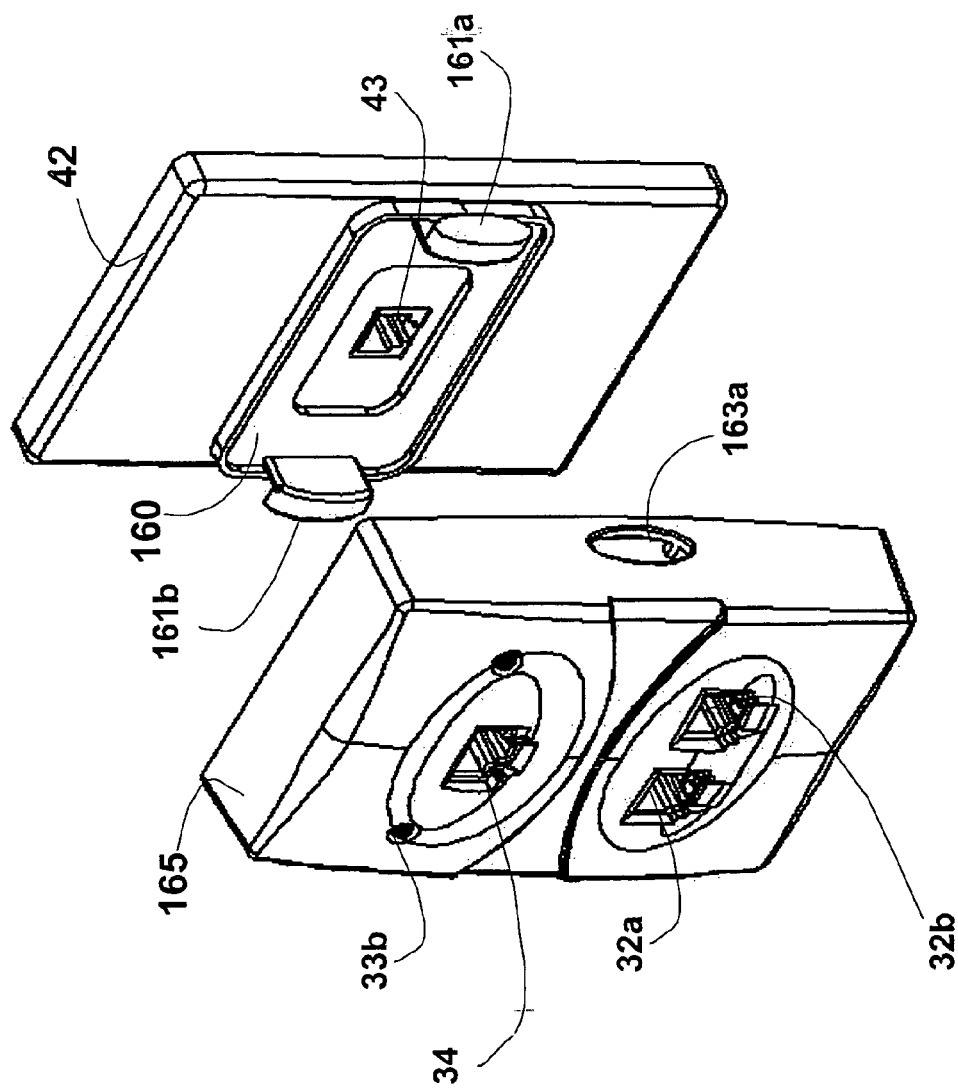
FIGS. 16b and 16c show schematically a front view of an exemplary telephone module according to the present invention.
Figure 16C:
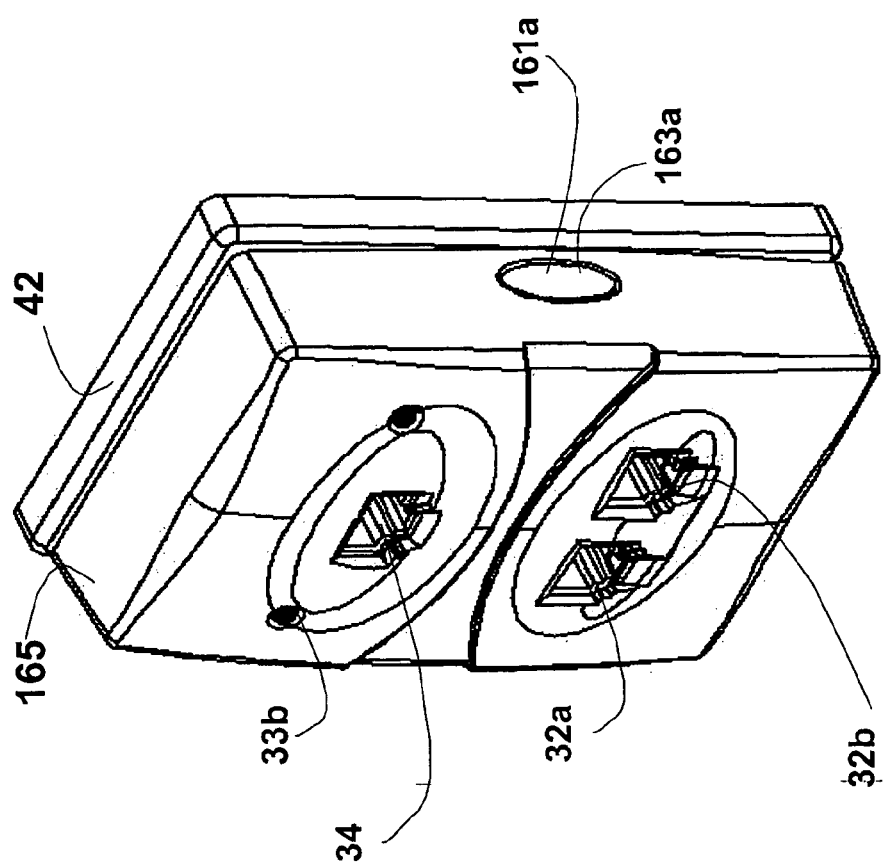
Figure 16D:
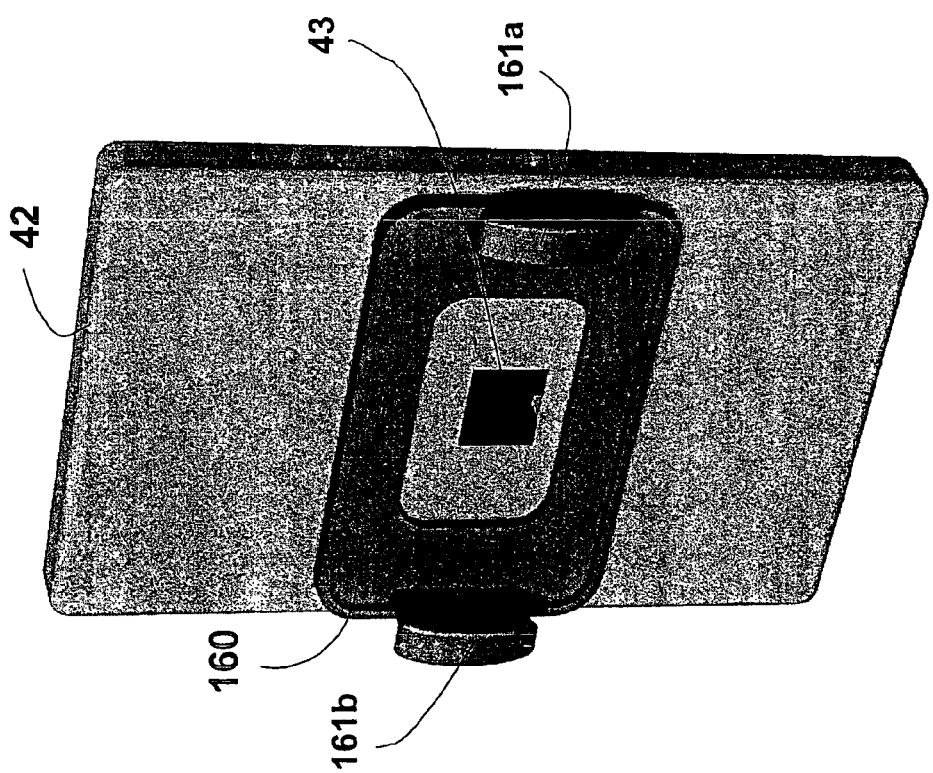
FIG. 16d shows pictorially an adapter and an outlet for use with a module according to the present invention.

While the above attachment is described regarding first attaching the adapter 150 to the outlet 42, in a similar way the first action may be attaching the adapter 150 to the module 155 as shown in FIG. 15*d*. In such case, the combined module 155/adapter 150 is then attached (e.g. glued) to the existing outlet 42.

It is apparent that such module 155/adapter 150 attachment may be permanent or separable. In the latter case, pushing or depressing the lugs 152 will release the module 155 from the combined outlet 42/adapter 150 assembly.

While the above configuration has been illustrated showing vertically located slots, it will be apparent that horizontal snap-fit connectors may equally well be used, as are shown in the adapter 160 depicted in FIGS. 16*a* to 16*d*.

Figure 17A:
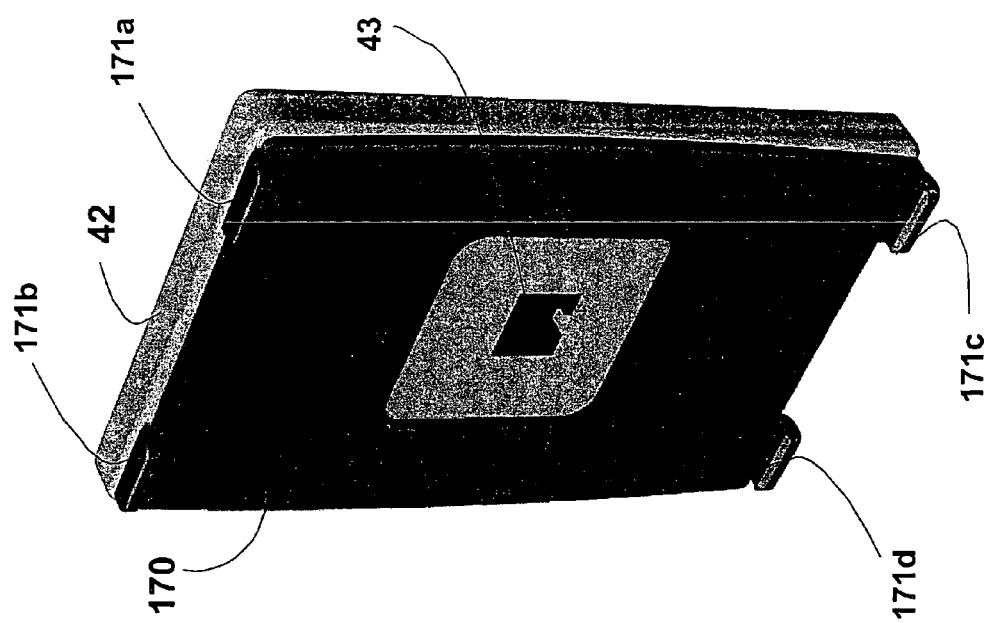
FIG. 17a shows pictorially an adapter and an outlet for use with a module according to the present invention.
Figure 17B:
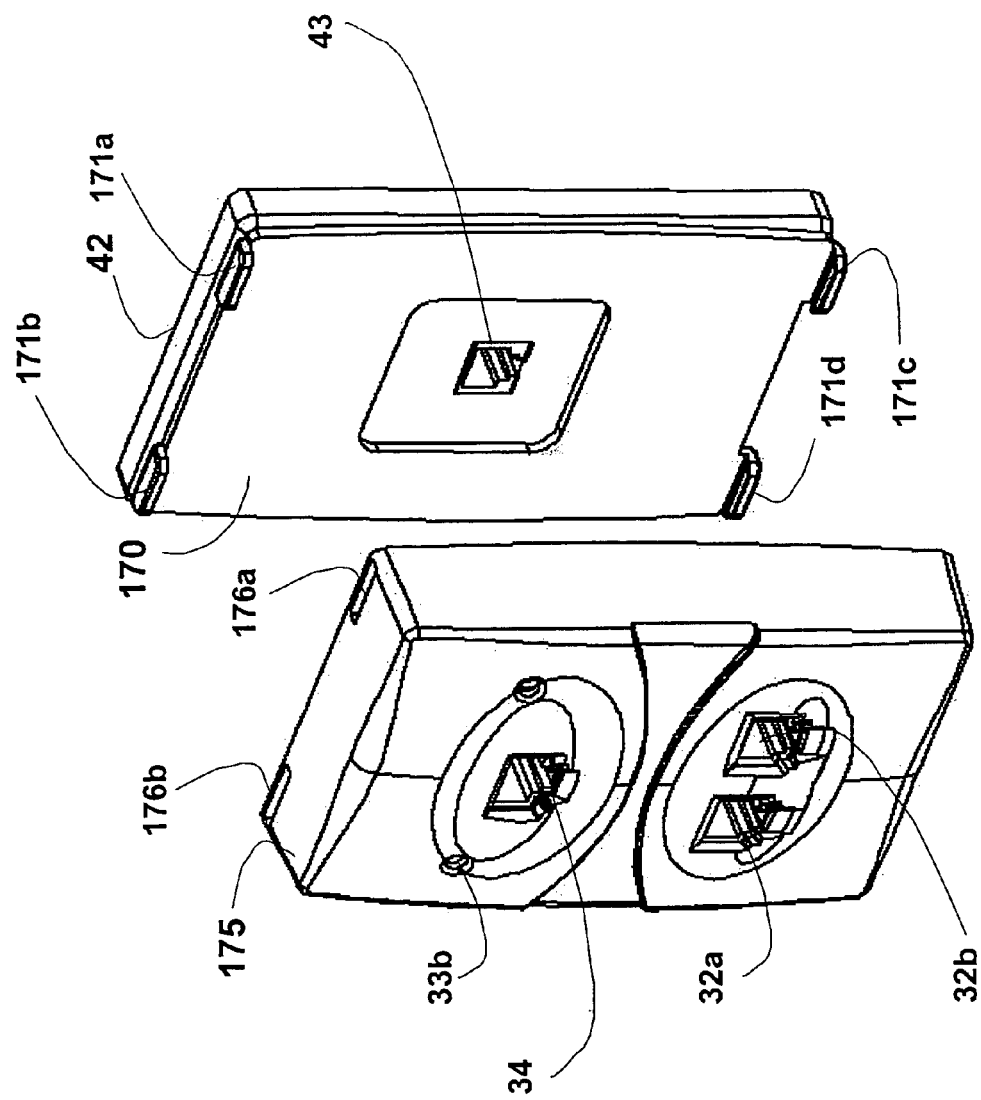
FIGS. 17b and 17c show schematically a front view of an exemplary telephone module according to the present invention.
Figure 17C:
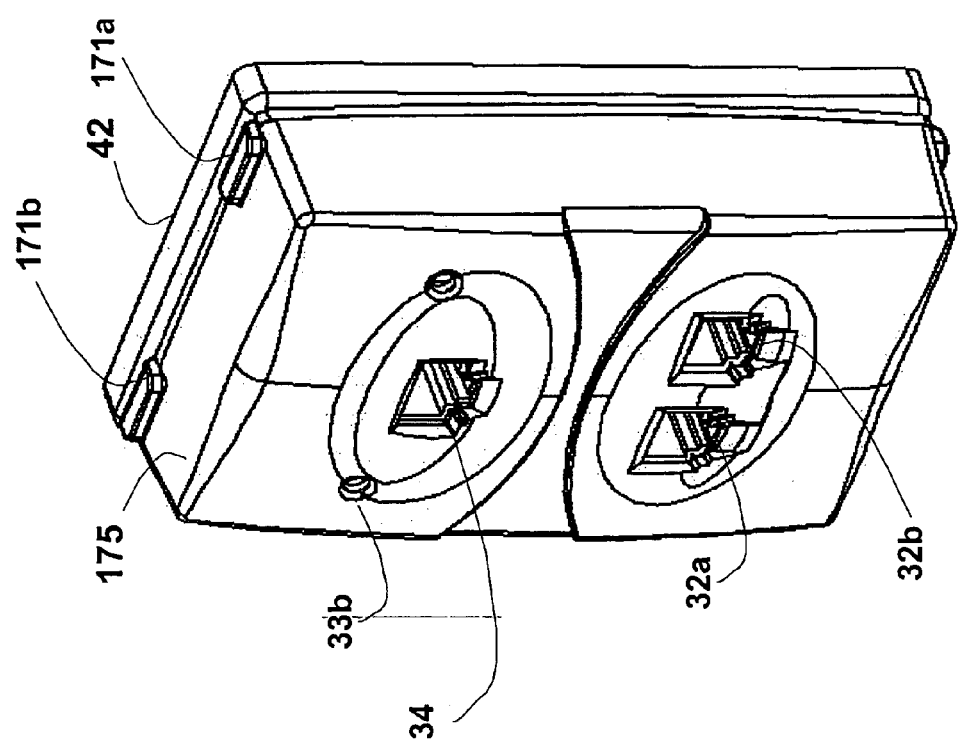
Figure 17D:
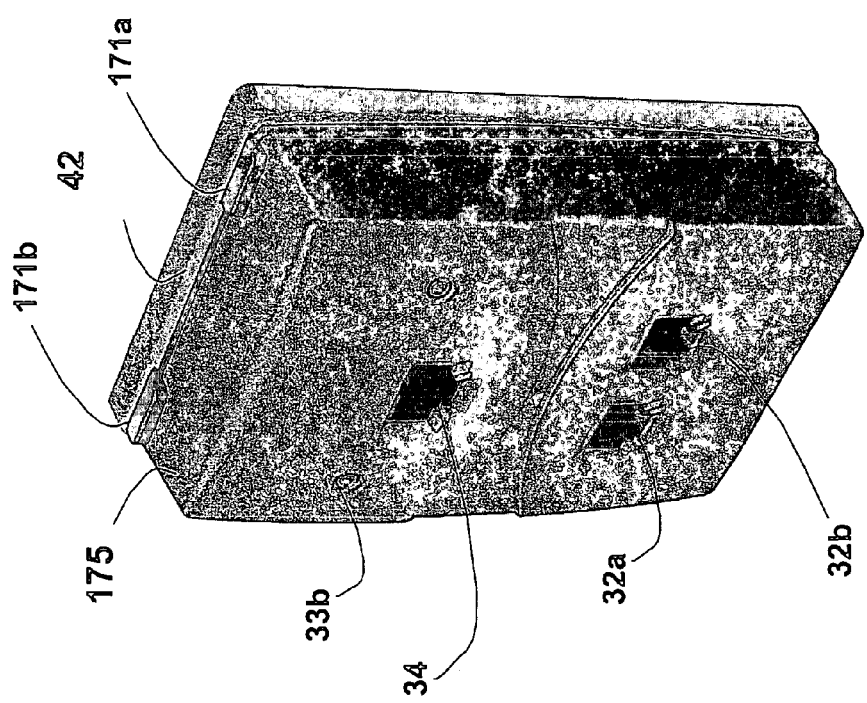
FIG. 17d shows pictorially a front view of an exemplary telephone module according to the present invention.

While adapters 150 and 160 above have been described as each having two support attachment points, it will be appreciated that this is not intended to be limiting and more than two connectors may be used. Thus, FIG. 17*a* shows an exemplary adapter 170 supporting four snap-fit connectors 171*a*, 171*b*, 171*c* and 171*d*, attached to an outlet 42. Two snap-fit connectors 171*a* and 171*b* are located on the upper surface and two snap-fit connectors 171*c* and 171*d* are located on the lower surface, thereby providing four supporting points in total. A module 175 shown in FIG. 17*b* comprises respective apertures of which only two 176*a* and 176*b* are shown, for engaging the snap-fit connectors in the adapter, resulting in a combined module 175/adapter 170/outlet 42 as shown in exploded view in FIG. 17*b*, and pictorially in FIGS. 17*c* and 17*d*. In one or more embodiments according to the present invention, two of the snap-fit connectors (e.g. the two lower ones 171*c* and 171*d*) may be used as axis and guiding means, aiding the locking of the other pair 171*a* and 171*b*.

Bayonet (Rotating) Latch.

Figure 18A:
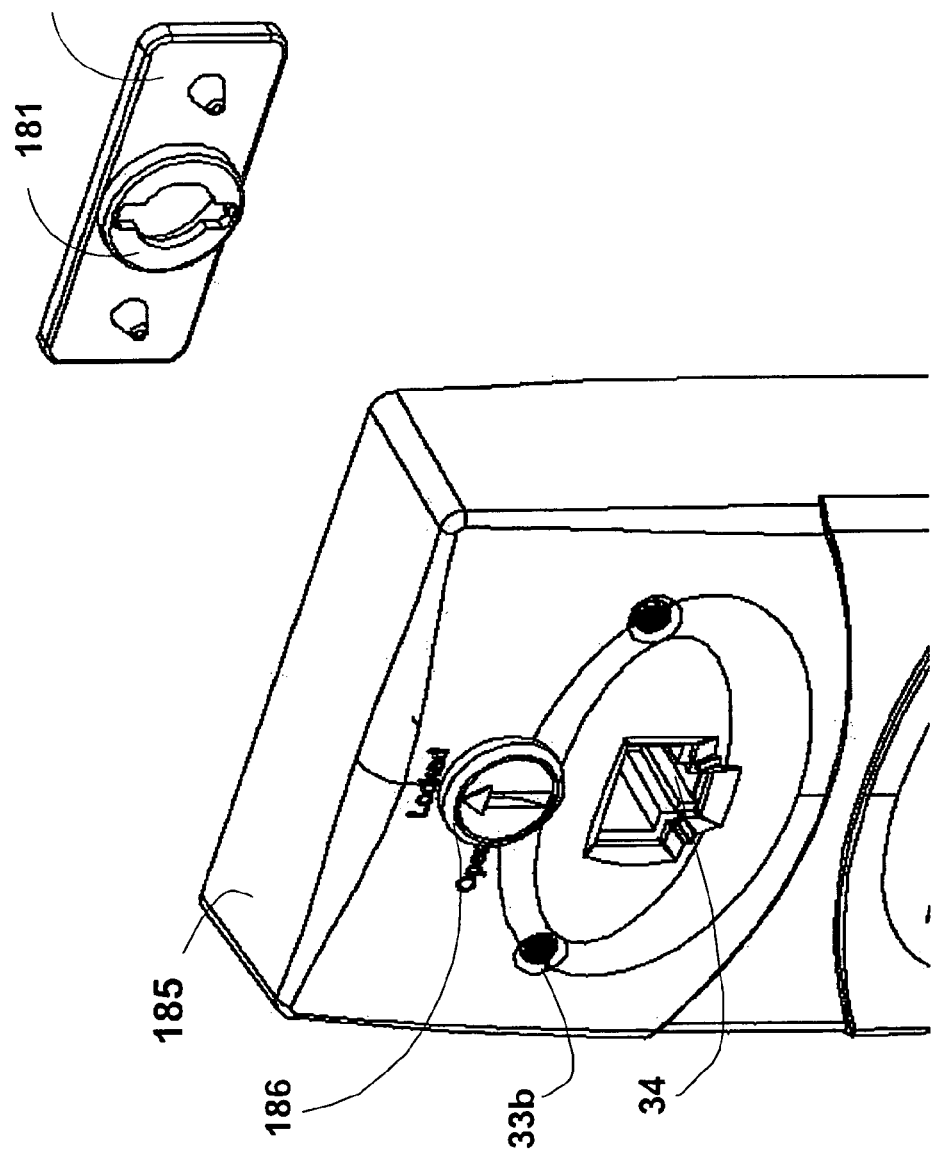
FIG. 18a shows schematically a front view of an adapter and of an exemplary telephone module according to the present invention.
Figure 18B:
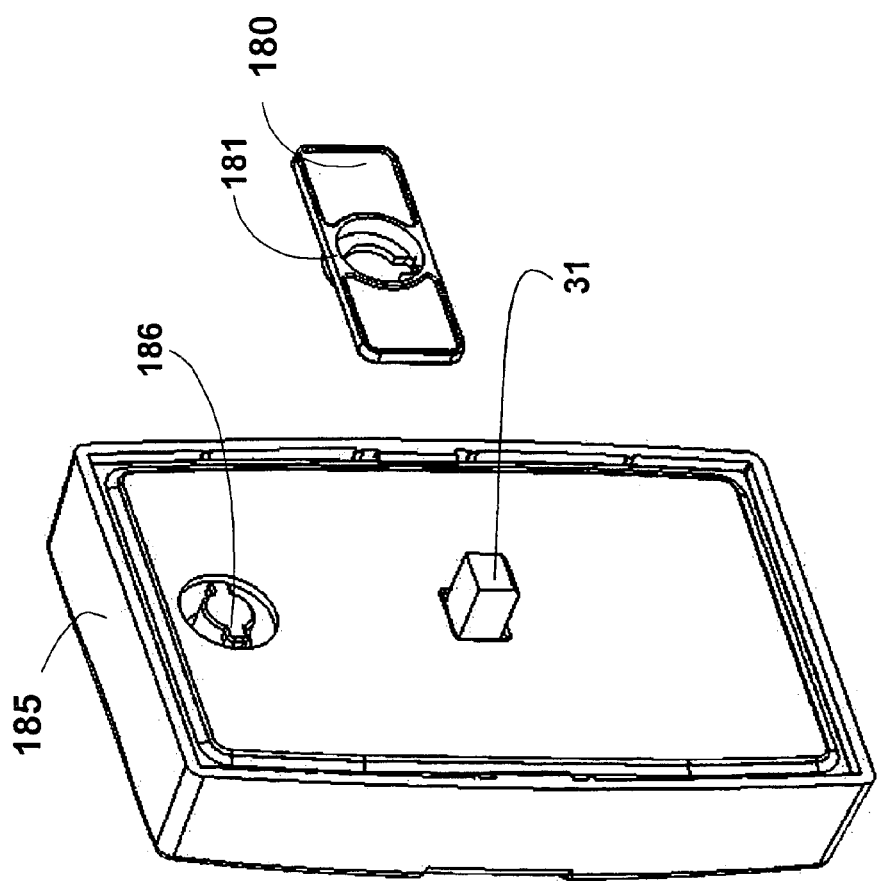
FIG. 18b shows schematically a rear view of an adapter and of an exemplary telephone module according to the present invention.
Figure 18C:
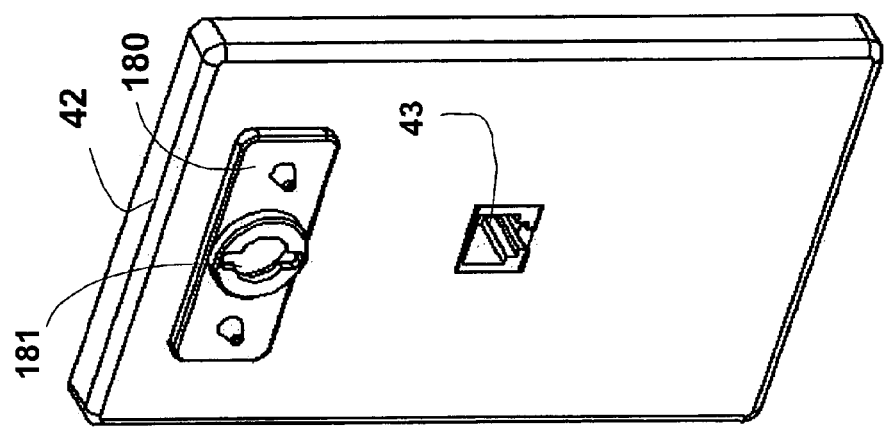
FIG. 18c shows schematically an adapter and an outlet for use with a module according to the present invention.
Figure 18D:
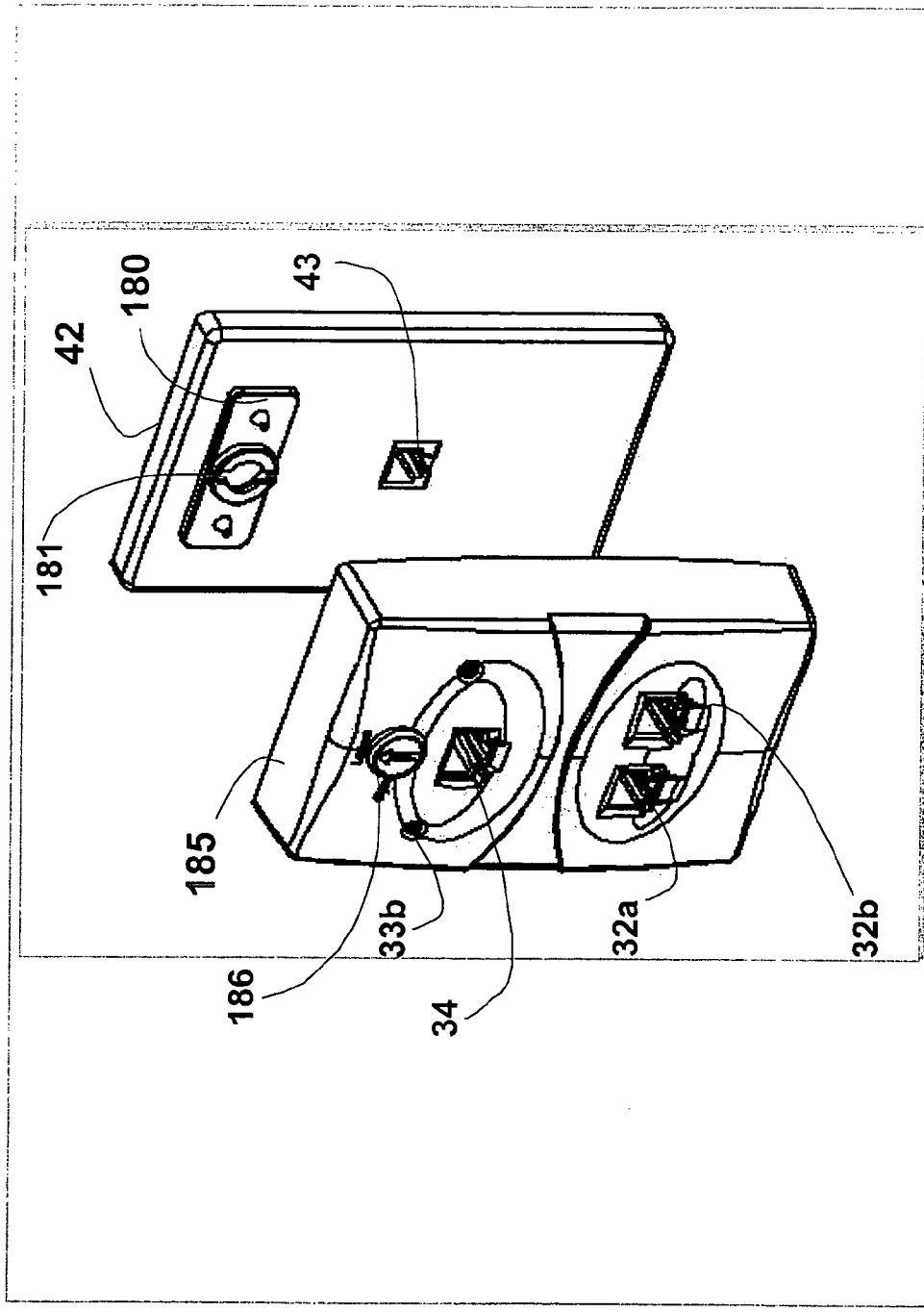
FIGS. 18d and 18e show schematically a front view of an exemplary telephone module according to the present invention.
Figure 18E:
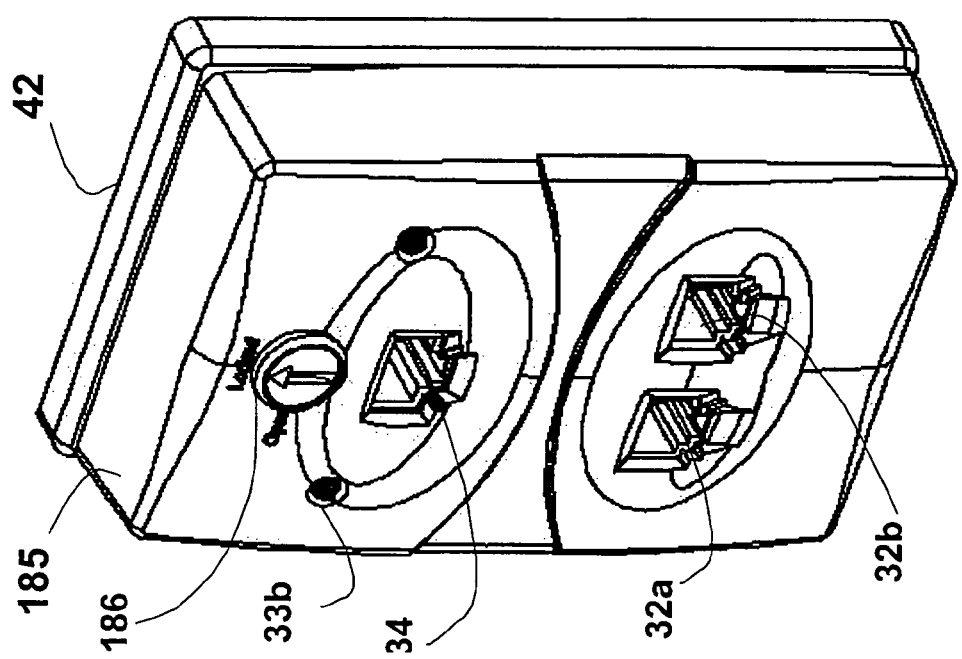
Figure 18F:
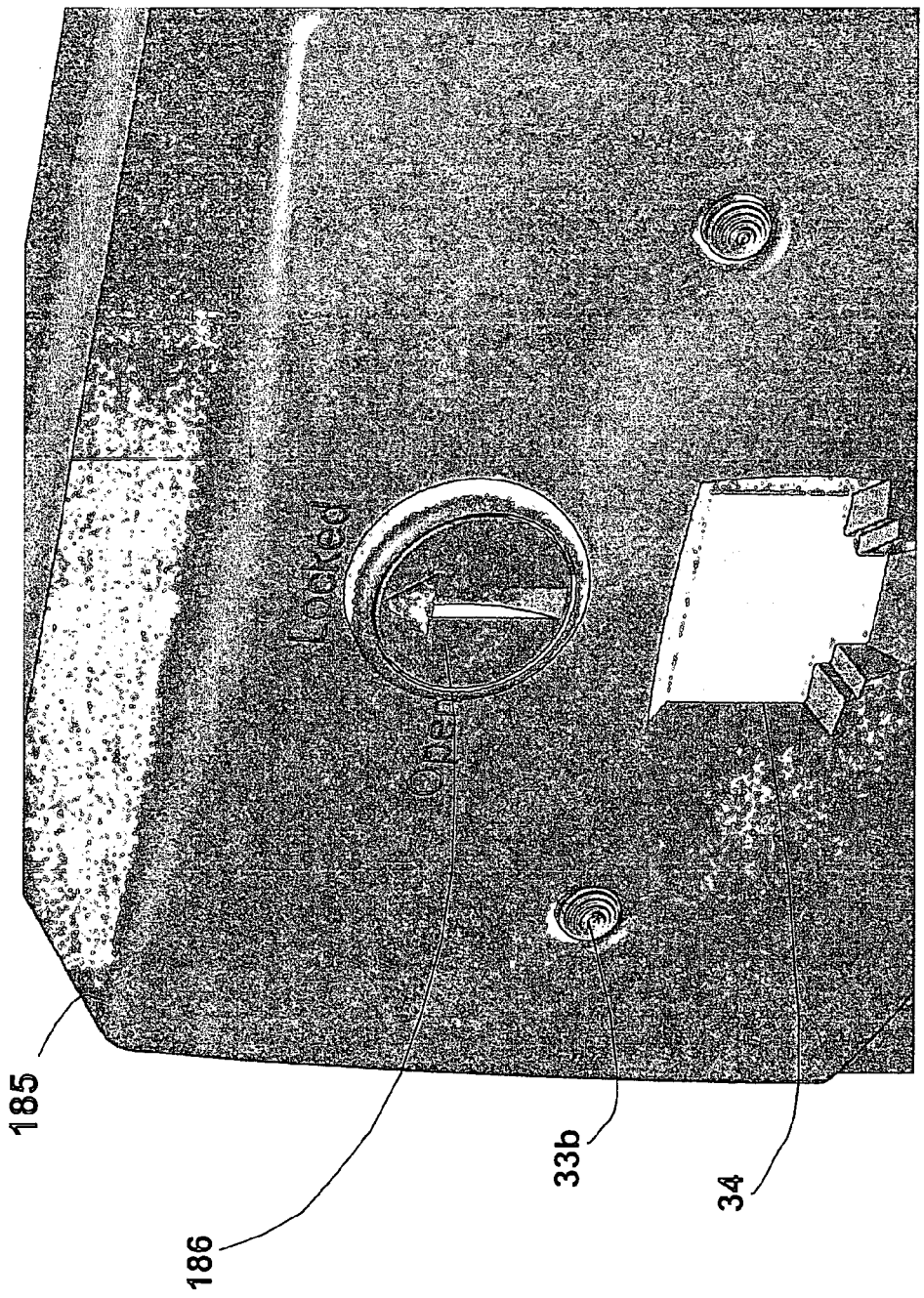
FIG. 18f shows pictorially part of a front view of an exemplary telephone module according to the present invention.
Figure 18G:
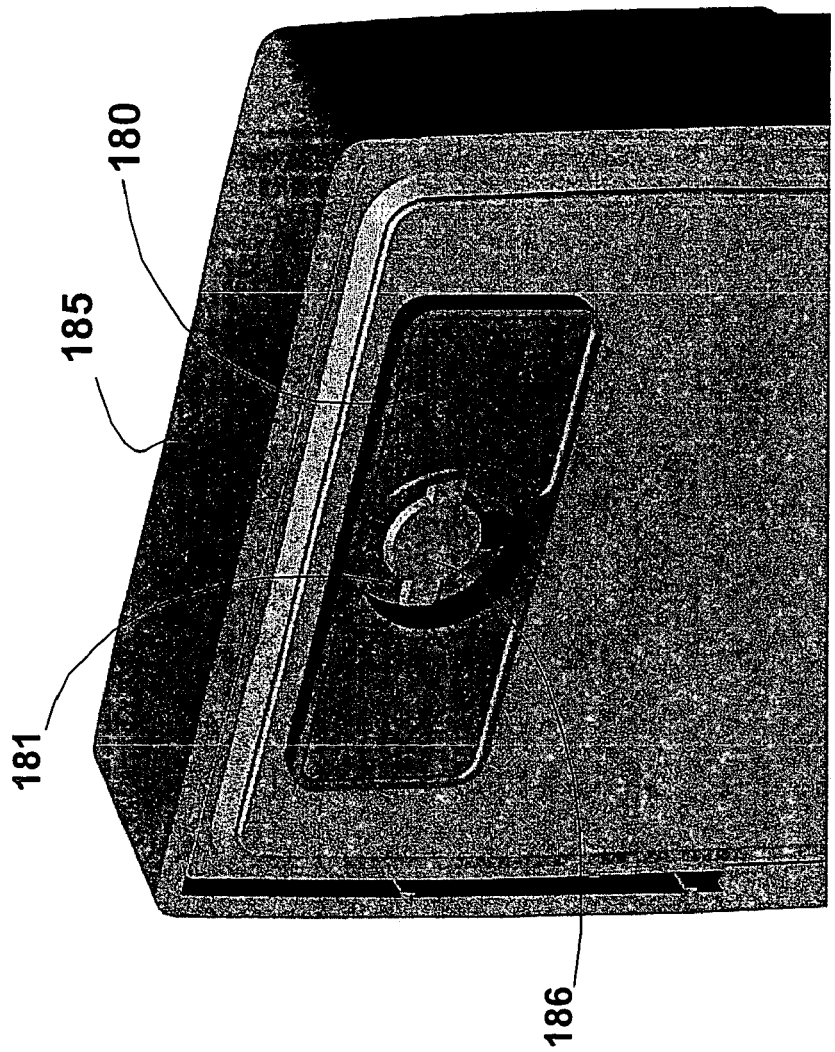
FIG. 18g shows pictorially part of a rear view of an exemplary telephone module according to the present invention.

In one or more embodiments according to the present invention, a rotating latch mechanism is used, as shown in FIG. 18*a*. The figure illustrates an adapter 180 comprising a receptacle/socket 181. The adapter 180 is releasably secured to a module 185 using a bayonet latch comprising a rotating plug 186 having two positions, namely 'Open' and 'Locked' for bayonet fitting to the socket 181. As shown in FIG. 18*b*, in the '"Open" position the rotating plug 186 can freely move in and out of the receptacle/socket 181. The adapter 180 is shown in FIG. 18*c* attached to outlet 42. Module 185 spaced from outlet 42 prior to mounting is shown in FIG. 18*d*. Upon attaching the module 185 to the combined outlet 42/adapter 180 assembly, the rotating plug 186 is inserted into socket 181 and twisted from the front (as shown in FIGS. 18*c* and 18*f*) to the 'Locked' position using a screwdriver, a coin or the like, thereby bayonet locking of the plug 186 to receptacle 181, and attaching the module 185 to outlet 42. The locked configuration is shown in FIG. 18*g*. Rotation the plug 186 back to the 'Open' position will release the module 186 from the adapter 180/outlet 42 assembly. While a single plug/receptacle pair has been described, it will be appreciated that two or more such bayonet latches may be used, resulting in added stability and security.

Magnetic Adapter.

Figure 19A:
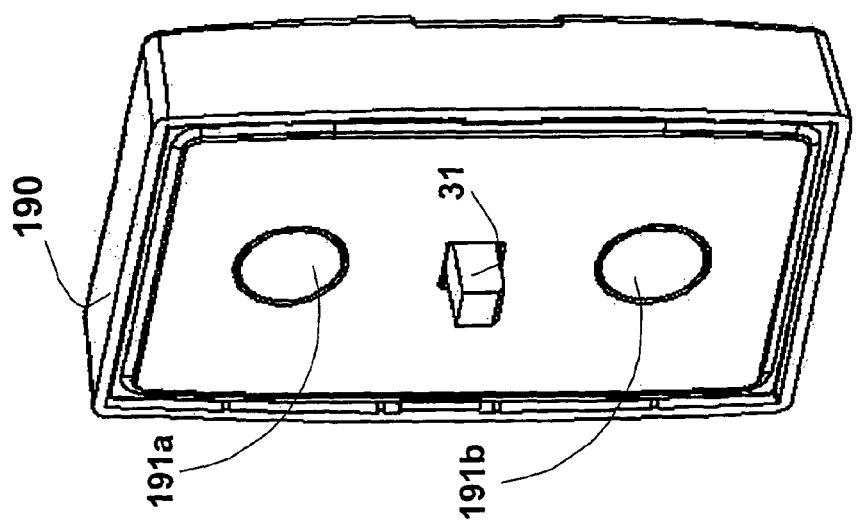
FIG. 19a shows schematically a rear view of an exemplary telephone module according to the present invention.
Figure 19B:
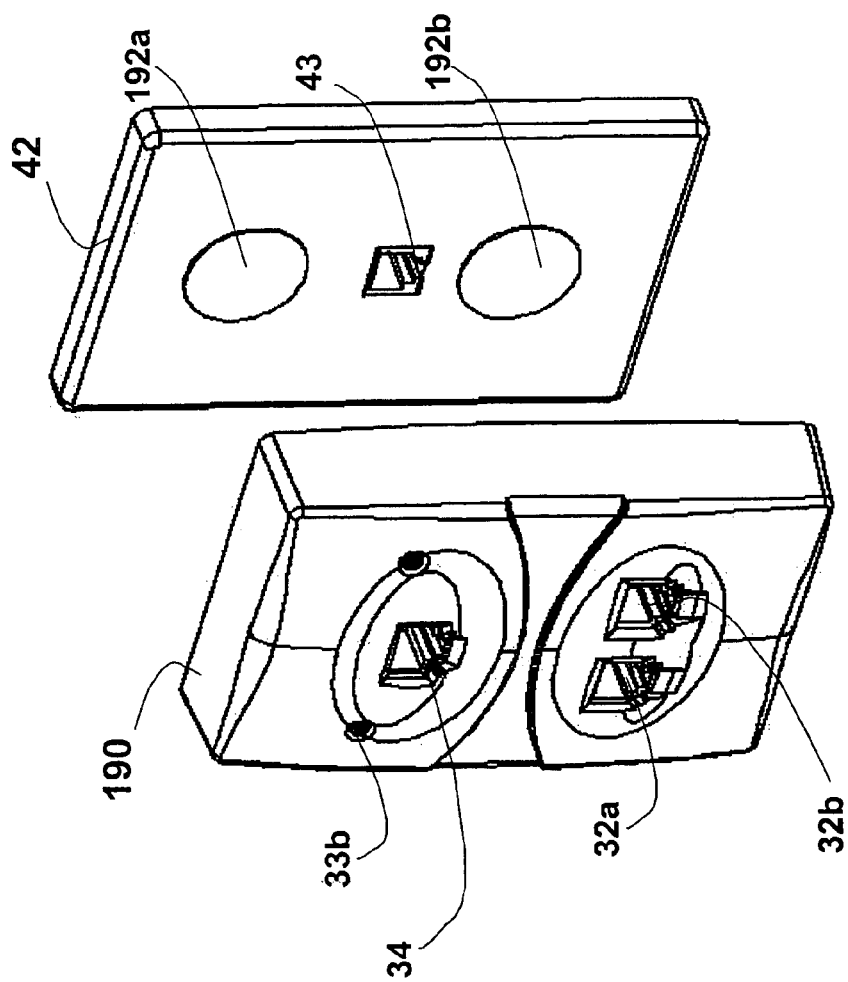
FIG. 19b shows schematically a front view of an exemplary telephone module according to the present invention.

While the invention has been described with regard to using mechanical structures, forces, moments and mechanisms, it will be appreciated that the invention equally applies to any other attaching techniques such as using magnetic forces. An example of such embodiment is shown in FIG. 19*a*. The module 190 comprises two magnets 191*a* and 191*b*. As illustrated in FIG. 19*b*, magnetic or magnetizable metal discs 192*a* and 192*b*, serving as the adapter, are attached (e.g. glued) to the outlet 42, in registration with the respective module 190 surfaces 191. The magnets/discs 191*a* and 191*b* are magnetically attached to the respective metal discs 192*a* and 192*b*, thus attaching the module 190 to the outlet 42. It will be appreciated that both 191 and 192 may be magnetic bodies having opposite polarities. Similarly, the module 190 may comprises metal discs 192 for mating with magnetic surfaces 191 on the outlet 42.

While the invention has been described with regard to mechanical adapters being a discrete and stand alone device, it will be appreciated that the invention applies equally to the cases wherein the adapter is an integral with the outlet, or to the cases wherein the adapter is an integral with the module.

Home Network Based Module.

Figure 20:
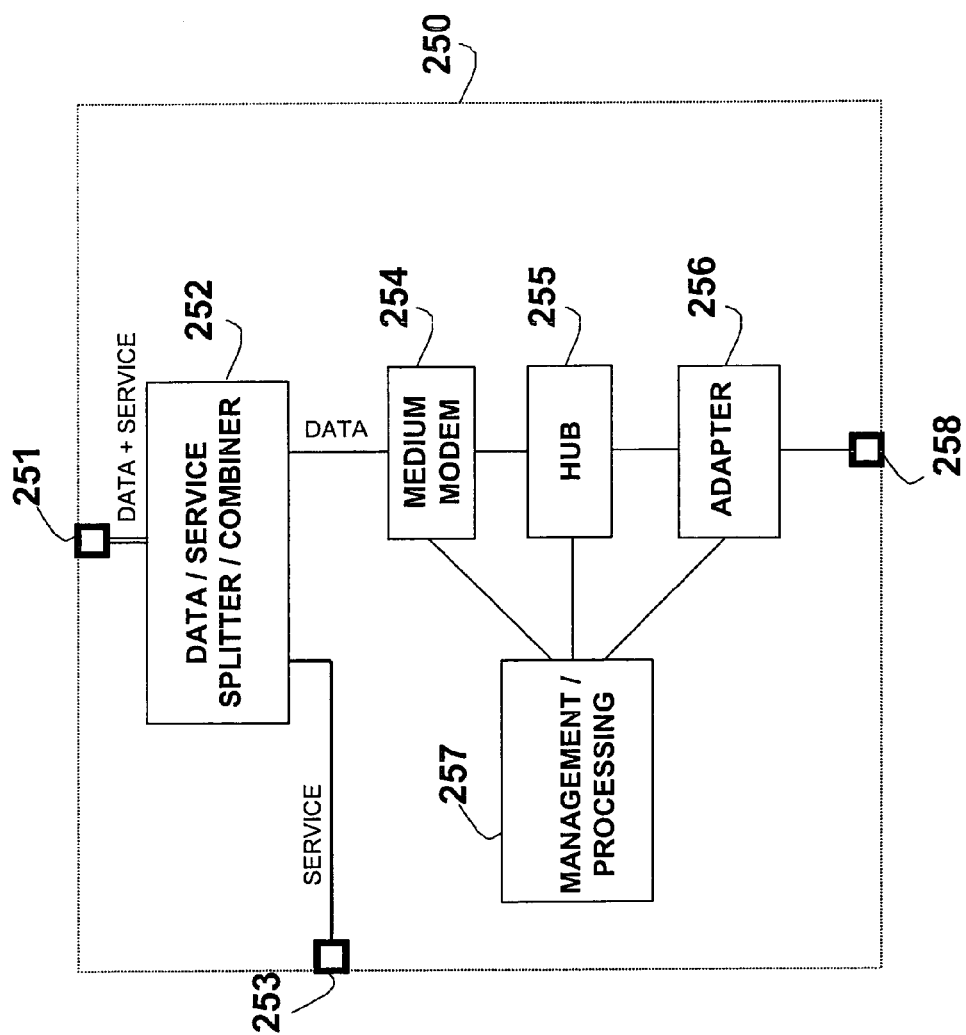
FIG. 20 shows a functional block diagram of an exemplary module according to the present invention.

A general functional schematic block diagram of a module 250 typically used in home network environment is shown in FIG. 20. The module 250 facilitates a data network over in-house wiring simultaneously with the basic service, which the wiring was originally installed to support. Non-limiting examples are a telephone outlet connected to the telephone wiring to support telephone service, a power outlet connected to the power wiring to support AC power distribution and a CATV outlet connected to the CATV cabling to support CATV distribution. The module connects to the outlet via a connector 251. Since in most cases the module 250 is required to retain the basic service (being telephony, AC power or CATV) added to data networking functionality, the module 250 embeds a service connector 253 used to provide the original service. A data/service splitter/combiner 252 is used to separate (and combine) the basic service signal carried over the wiring from the data signal. For example, in the case wherein the data and the service each use signals of a different frequency spectrum over the wiring (FDM-Frequency Division Multiplexing), the splitter/combiner 252 will use a first filter to isolate the service signal spectrum and to couple it to service connector 253 as well as a second filter to isolate the data signal spectrum and to feed it to a medium modem 254. Similarly, the service and data signals are combined by the splitter/combiner 252 and fed to the wiring via connector 251. In some implementations, the technology enables a direct connection of the medium modem 254 and the service connector 253, thus obviating the need for the data/service splitter/combiner 252, and both the medium modem 254 and the service connector 253 are directly connected to the wiring connector 251. Medium modem 254 functions to transmit and receive data over the wiring. In the case of a power outlet, the medium modem 254 enables carrying data over the powerlines. Similarly, the medium modem 254 enables carrying data over the telephone wiring in the case of telephone outlet and over the CATV cables in the case of CATV outlet. In most cases, the modem 254, working together with the splitter/combiner 252, is optimized neither to interfere with the basic service signal carried over the wiring nor to be interfered by it.

The module 250 provides access to the data carried over the in-house wiring via a module integrated interface, comprising data connector 258 and interface adapter 256. Interface adapter 256 functions to include all circuitry required in order to support the required interface when connected to the data network, while the actual physical connection uses data connector 258, representing data connector 34 described above. In general, any serial or parallel data interface may be used. However, in most cases, the data interface supported as well as the connector 258 will adhere to a common standard data interface. Examples of such digital data interfaces are IEEE802.3 10/100/1000BaseT (commonly using RJ-45 connector type 34 shown above), USB (Universal Serial Bus), IEEE1284, EIA/TIA-232, IEEE1394 as well as others. Furthermore, the interface supported by the module 250 through connector 258 may also be of analog type rather than the digital type described. Some examples describing outlet built-in interfaces are:

1. Analog video interface. The outlet may be used to input analog video, output analog video or both. It should be noted that this video is to be distinguished from the CATV video signal carries as basic service, but rather involves a video signal carried in digital form as part of the data network formed. An outlet supporting an analog video interface is described in WO 03/039150 entitled 'Outlet with analog signal adapter, a method for use thereof and a network using said outlet' assigned to the present assignee. In such an outlet, the interface adapter 256 comprises Analog to Digital (A/D) or Digital to Analog (D/A) converters as appropriate.

2. Analog voice (audio) interface. The outlet may be used to input analog voice, output analog voice or both. It should be noted that this voice is to be distinguished from the telephony signal carried as basic service, but rather involves a voice signal carried in digital form as part of the data network formed. In such an outlet, the interface adapter 256 comprises Analog to Digital (A/D) or Digital to Analog (D/A) converters as appropriate.

3. Telephone interface. The outlet may be used to connect to a telephone device. It should be noted that this telephone signal is to be distinguished from the telephone signal carried as basic service, but rather involves a telephone signal carried in digital form as part of the data network formed. An outlet supporting telephone interface is described in WO 03/005691 entitled 'Telephone outlet with packet telephony adapter, and a network using same' assigned to the present assignee. In such an outlet, the interface adapter 256 comprises Analog to Digital (A/D) or Digital to Analog (D/A) converters as appropriate.

In the basic scenario, interface adapter 256 can be directly connected to the medium modem 254, allowing signal flow from a unit connected to the outlet via connector 258 and interface adapter 256 to the wiring via the wiring connector 251 through the medium modem 254 and the splitter/combiner 252. In such cases, hub 255 and management 257 are not required.

In a managed data network environment, it would be beneficial to include part or all of the network management functionalities into the module 250. For example, addressing means may be integrated into the outlet in order to allow the outlet to be remotely referenced. In yet another example, QoS (Quality of Service) tools are embedded into the outlet for measuring the service. Outlet integrated network management functionalities may comprise or support:

1. Performance management. Measure and track network variables such as throughput, response time and line utilization.
2. Configuration management. Monitor and change configuration information to track the affects of software and hardware elements.
3. Accounting management. Measure utilization so that use of network resources can be tracked and regulated.
4. Fault management. Detect, log and notify users of problems relating to the network running effectively.
5. Security management. Control access to network resources.

The network management functionalities are supported by the optional management/processing unit 257. Management functionalities may also include local-on outlet-visual indicators, such as indicators 33a and 33b described above. The management/processing unit 257 is coupled to all relevant functions in the outlet such as medium modem 254, hub 255 and interface adapter 256.

An optional multi-port unit (hub) 255, identical to hub 11 described above, may be used in order to mediate the multiple data streams in the outlet. Basically, the hub 255 mediates between the data stream associated with the external data device connected via connector 258 and interface adapter 256 and the network formed over the wiring via medium modem 254.

Figure 21:
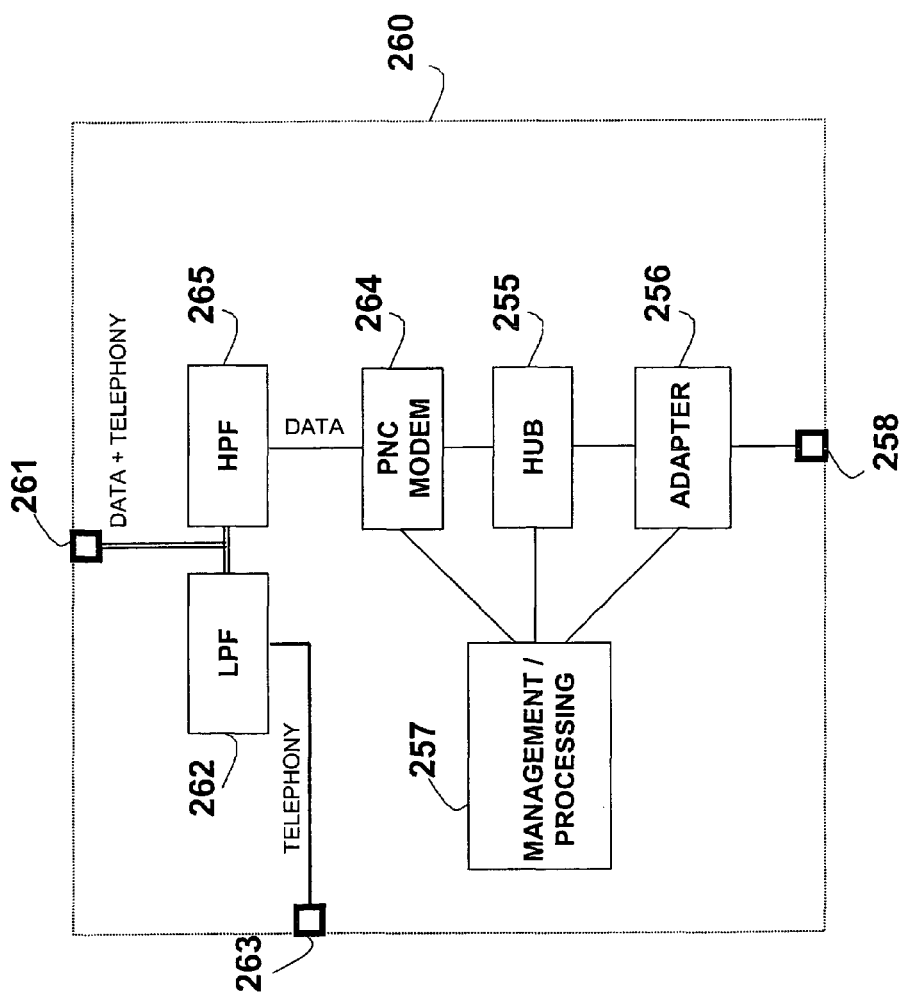
FIG. 21 shows a functional block diagram of an exemplary telephone module according to the present invention.

A telephone module 260, representing for example module 30 above, is shown in FIG. 21 as a non-limiting example of module 250. The module 260 is based on HomePNA technology known in the art for carrying data over active telephone wiring. Connector 261, associated with connector 251 of module 250, is used to connect to the in-house telephone wiring. Such connector 261 represents the connector 31 described above. Splitter/combiner 252 of general module 250 are implemented by a set of Low Pass Filter (LPF) 262 and High Pass Filter (HPF) 265. Similarly, the medium modem 254 of general module 250 is implemented by PNC (phonelines carrier) modem 264. Connector 263 is a standard telephone connector (e.g. RJ-11 in North America) representing general service connector 253 of general module 250. Such connector 263 represents the connector 32a described above.

Figure 22:
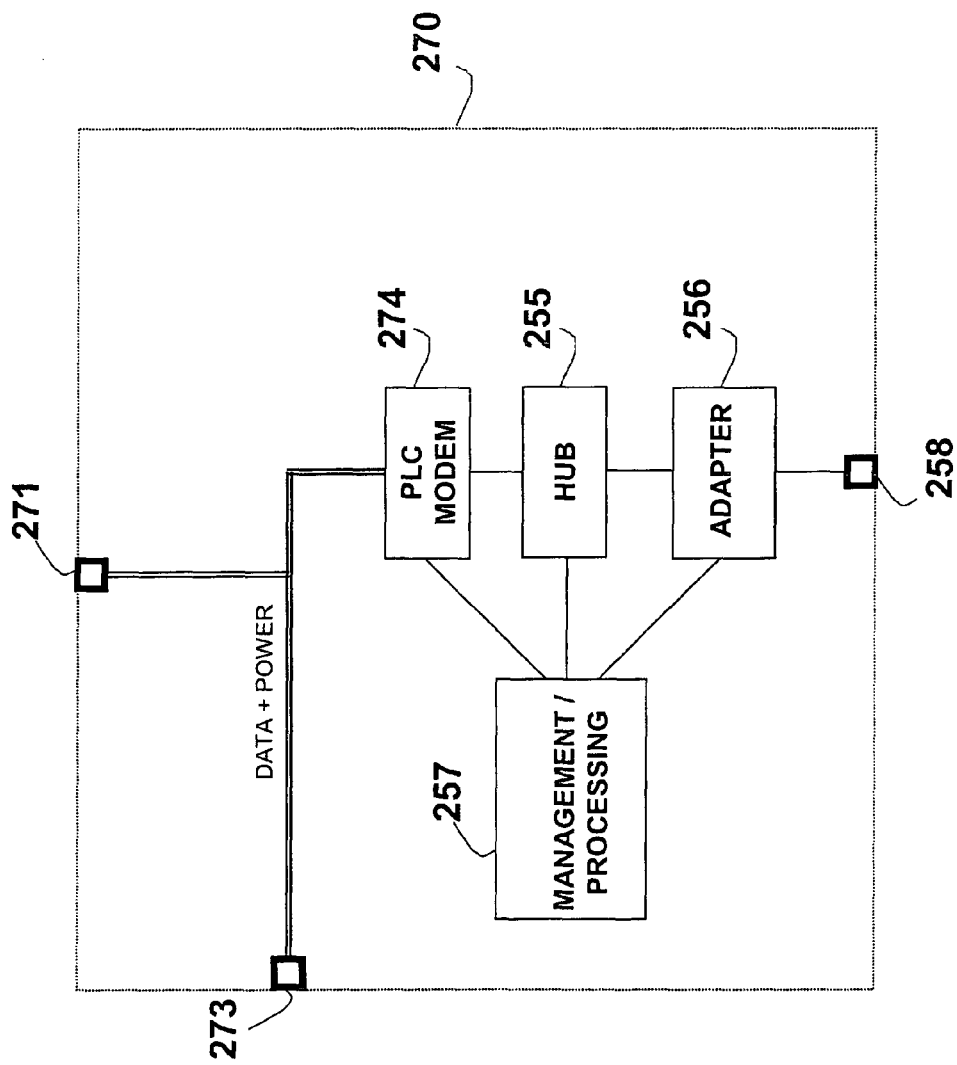
FIG. 22 shows a functional block diagram of an exemplary power module according to the present invention.

Similarly, an example of a powerline module 270, representing for example module 100 above, is shown in FIG. 22. The module comprises power connector 273 retaining the original AC power device, wiring connector 271 to connect to the AC power wiring via power outlet such as 102, and PLC modem 274. Such connector 273 represents connector 101 described above. In this example, no separation is required between the wiring, the PLC modem 274 and the power connection 273, hence splitter/combiner 252 of the general module 250 is not required. Some PLC modem 274 implementations may still require such separation device.

Figure 23:
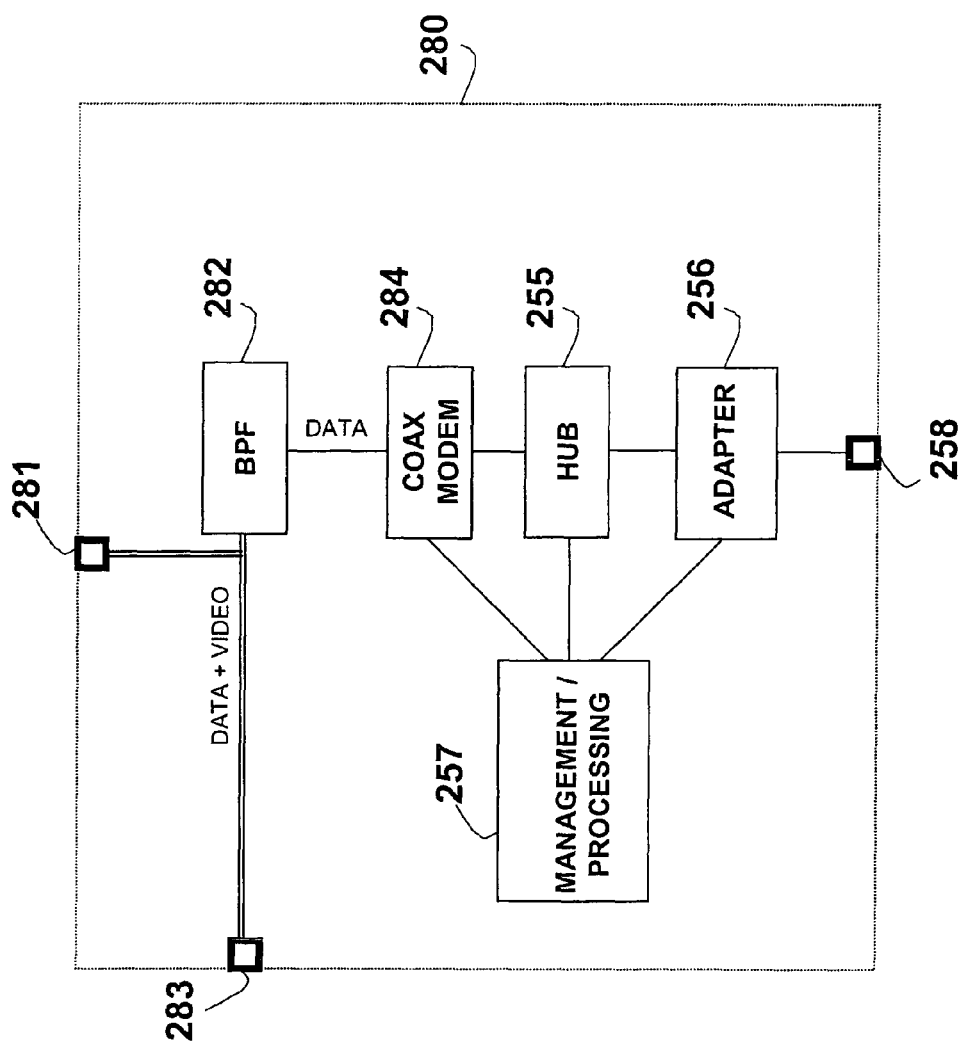
FIG. 23 shows a functional block diagram of an exemplary CATV module according to the present invention.

Another example of the general module 250 is the CATV module 280, representing for example module 90 above, shown in FIG. 23. Connector 281 provides the connection to the coaxial cable, and the CATV service is retained via RF connector 283. Such connector 283 represents connector 91 described above. A coax modem 284 is used as the medium modem. In most cases the data network uses one of the video channels carried over the coaxial cable, the splitter/combiner 252 is replaced by Band Pass Filter (BPF) 282, and the connector 283 is directly connected to the wiring connector 281. Such connector 281 represents the connector 94 described above.

LAN Environment.

While the invention has been described with regard to networks formed over wiring used for utility services (e.g. telephone, CATV and power), it will be appreciated that the invention can be equally applied to outlets used in networks using dedicated wiring. In such a scenario, the basic service is a single data network interface. However, it may be required to provide additional interfaces to an outlet, beyond the basic service of single data connectivity interface. For example, it may be used to provide multiple data interfaces wherein the wiring supports such single data connection. An example for such an outlet is the Network Jack™ product family manufactured by 3Com™ of Santa-Clara, Calif., U.S.A. In addition, such outlets are described in U.S. Pat. No. 6,108,331 to Thompson entitled 'Single Medium Wiring Scheme for Multiple Signal Distribution in Building and Access Port Therefor' as well as U.S. patent application US 2003/0112965 Published Jun. 19, 2003 to McNamara et al. entitled 'Active Wall Outlet'.

Figure 24:
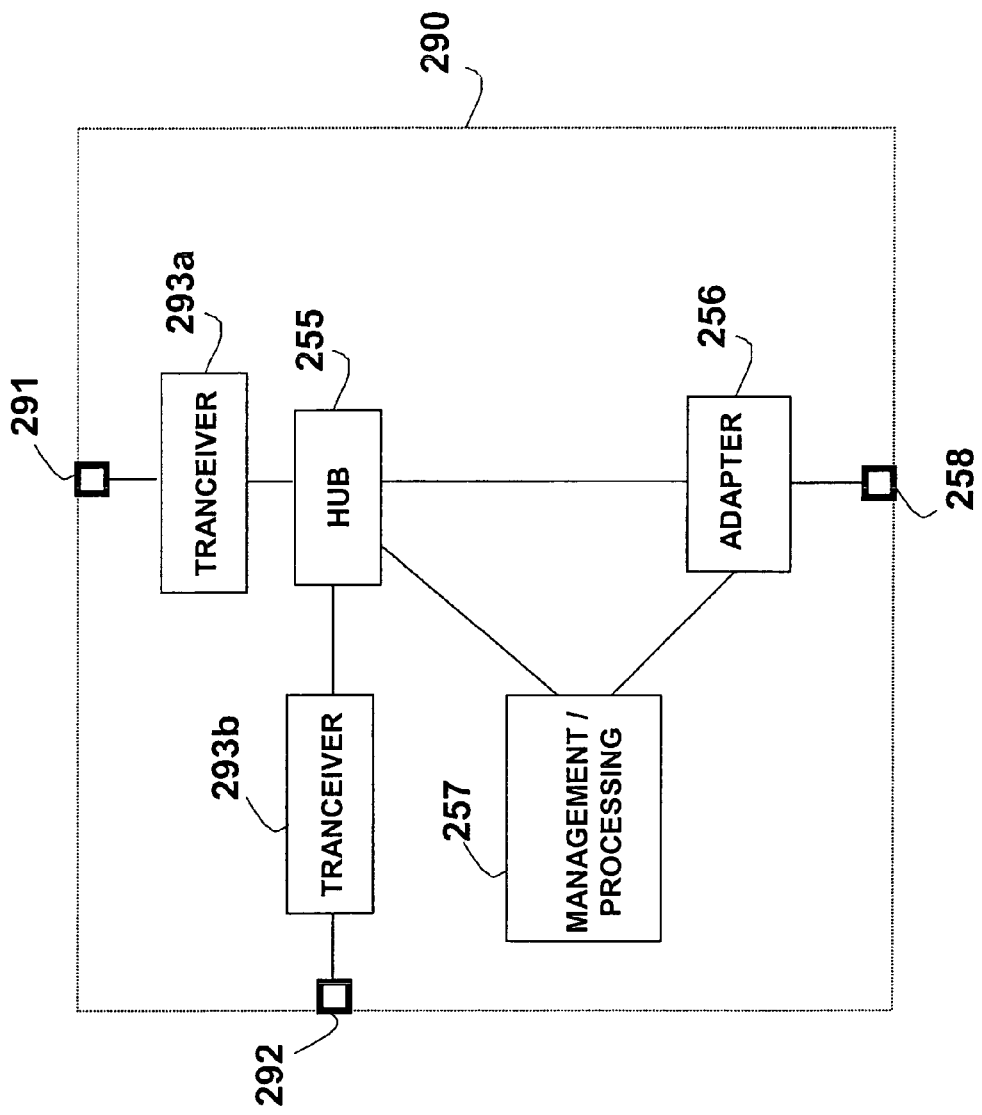
FIG. 24 shows a functional block diagram of an exemplary LAN module according to the present invention.

A non-limiting functional block diagram of such a module 290 is shown in FIG. 24. While the general structure is similar to general module 250, some adaptations are required to the specific application. The data/service splitter/combiner 252 is not required since only a single type of signal is carried over the wiring. A simple transceiver 293 is used to transmit and receive signals over the network wiring. Transceiver 293a is used to interface the wiring via connector 291. The 'basic service' of data port is provided via data connector 292, using transceiver 293b. Both transceivers, as well as adapter 256 (connected to interface connector 258) all share the data via hub 255. The outlet may be managed by management/processing function 257.

Other Functionalities.

While the invention has been described with regard to active (power consuming) components (e.g. modem) used to provide access to the data signal carried over the wiring, it will be appreciated that the invention equally applies to a module using only passive components for providing such coupling. An example of such implementation is described with regard to a passive outlet is disclosed in WO 02/25920 to Binder entitled 'Telephone communication system and method over local area network wiring'. Such outlets are available as part of the etherSPLIT™ system from QLynk Communication Inc. of College Station, Tex. USA.

Figure 25:
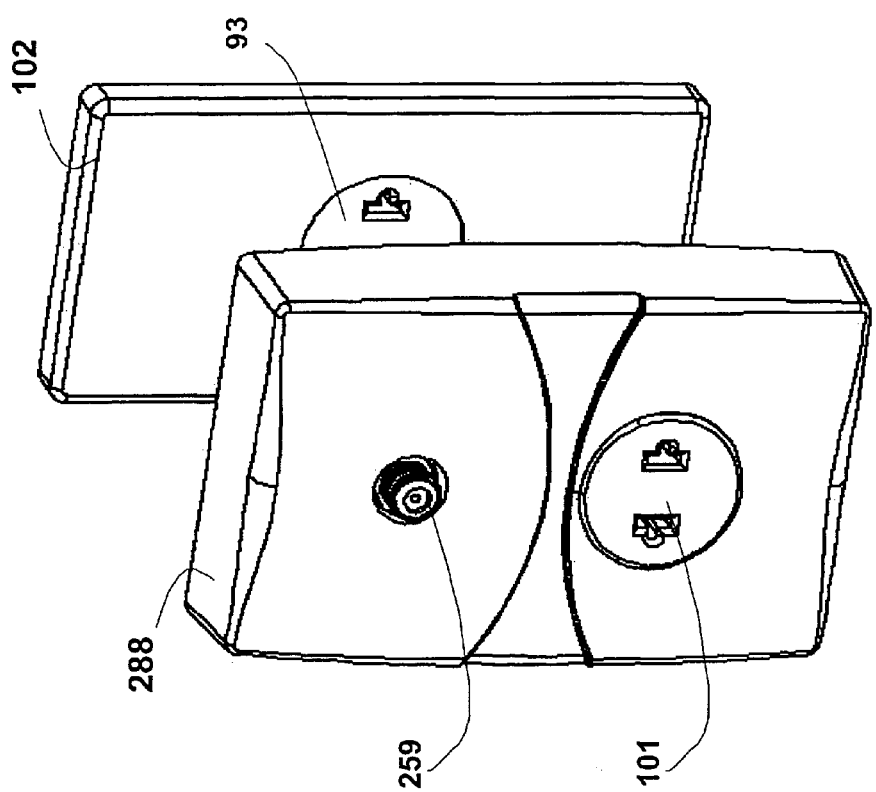
FIG. 25 shows schematically a front view of an exemplary power module according to the present invention.
Figure 26:
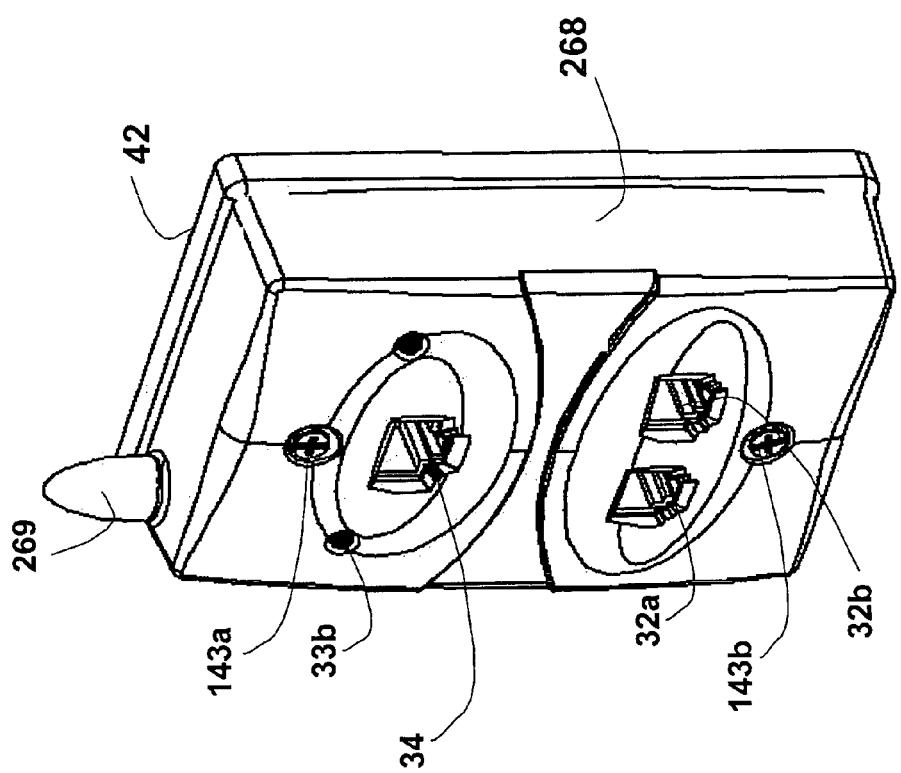
FIG. 26 shows schematically a front view of an exemplary telephone module according to the present invention.

While the invention has been described with regard to digital interfaces, it will be appreciated that the invention equally applies to a module wherein the adapter 256 converts to analog signal interface, such as audio or video, as well as analog sensor or analog actuator. Active outlets comprising a built-in analog converter are described for example in WO 03/039150 to Binder published May 8, 2003 and entitled 'Outlet with Analog Signal Adapter, a Method for Use Thereof and a Network Using Said Outlet'. An illustration of an exemplary module 288 with video interface is shown in FIG. 25, based on module 100 described above. Data connector 34 comprised in module 100 of FIG. 10a is substituted with video connector (F-Type, BNC or similar) 259 shown in FIG. 25. The relevant adapter 256 will include analog to digital (or digital to analog or both) functions. It should be noted that connector 259 is part of the module 288 and relates to video (or any analog signal) carried in digital form over the network, and should be distinguished from connector 91 of module 90 of FIG. 9, wherein the video is the basic service and thus carried in analog form over the network While the invention has been described with regard to wired and connector-based module 288, it will be appreciated that the invention equally applies to an outlet wherein a data unit uses non-wired interface, such as audio, light (e.g. infrared) and radio frequency (commonly referred to as wireless). Such outlet is described in WO 01/80543 published Oct. 25, 2001 to Binder, entitled 'Network Combining Wired and Non-Wired Segments'. In such a case, the connector 258 will be replaced substituted with a non-wired transceiver, such as a light emitter/receiver or antenna for RF. Alternatively, the non-wired interface is provided in addition to the wired interface. A pictorial view of the latter is module 268 with wireless interface is shown in FIG. 26, based on module 145 shown in FIG. 14b above. In addition to the data connector 34 in module 145 of FIG. 14b, an antenna 269 is shown in FIG. 26, as an example to non-wired interface.

While the invention has been described with regard to outlets having a single network interface (e.g. single connector 258), it will be appreciated that the invention equally applies to the case wherein multiple network interfaces are supported. Furthermore, a mix of interface types may be employed, such as wired digital, wired analog and non-wired interfaces all in the same outlet. Similarly, while the invention has been described with regard to outlets having single basic service connection, such as telephone connector 263, power connector 273, CATV connector 283 or data network connector 292, it will be appreciated that the invention equally applies to the case wherein multiple such connections are provided.

While the invention has been described with regard to outlets and networks based on conductive media such as wires and cables, it will be appreciated that the invention equally applies to the case wherein the network medium is non-conductive, such as fiber-optical cabling. In such a case, transceiver 293*a* of module 290 should be substituted by a fiber optic transceiver, and similarly wiring connector 291 should be replaced by a fiber optic connector. Active outlets supporting data interfaces and based on fiber optic cabling are described in U.S. patent application US 2002/0146207 published Oct. 10, 2002 to Chu, entitled 'Fiber Converter Faceplate Outlet', as well as in U.S. Pat. No. 6,108,331 to Thompson entitled 'Single Medium Wiring Scheme for Multiple Signal Distribution in Building and Access Port Therefor'. As such, the term 'wiring' in this application should be interpreted to include networks based on non-conductive medium such as fiber-optics cabling.

Module Powering.

In one or more of the embodiments according to the present invention, the module includes active components (such as medium modem 254), and as such needs to be powered. Three non-limiting powering schemes are now described including local feeding, power over wiring and via the interface module.

Local Feeding.

Figure 27:
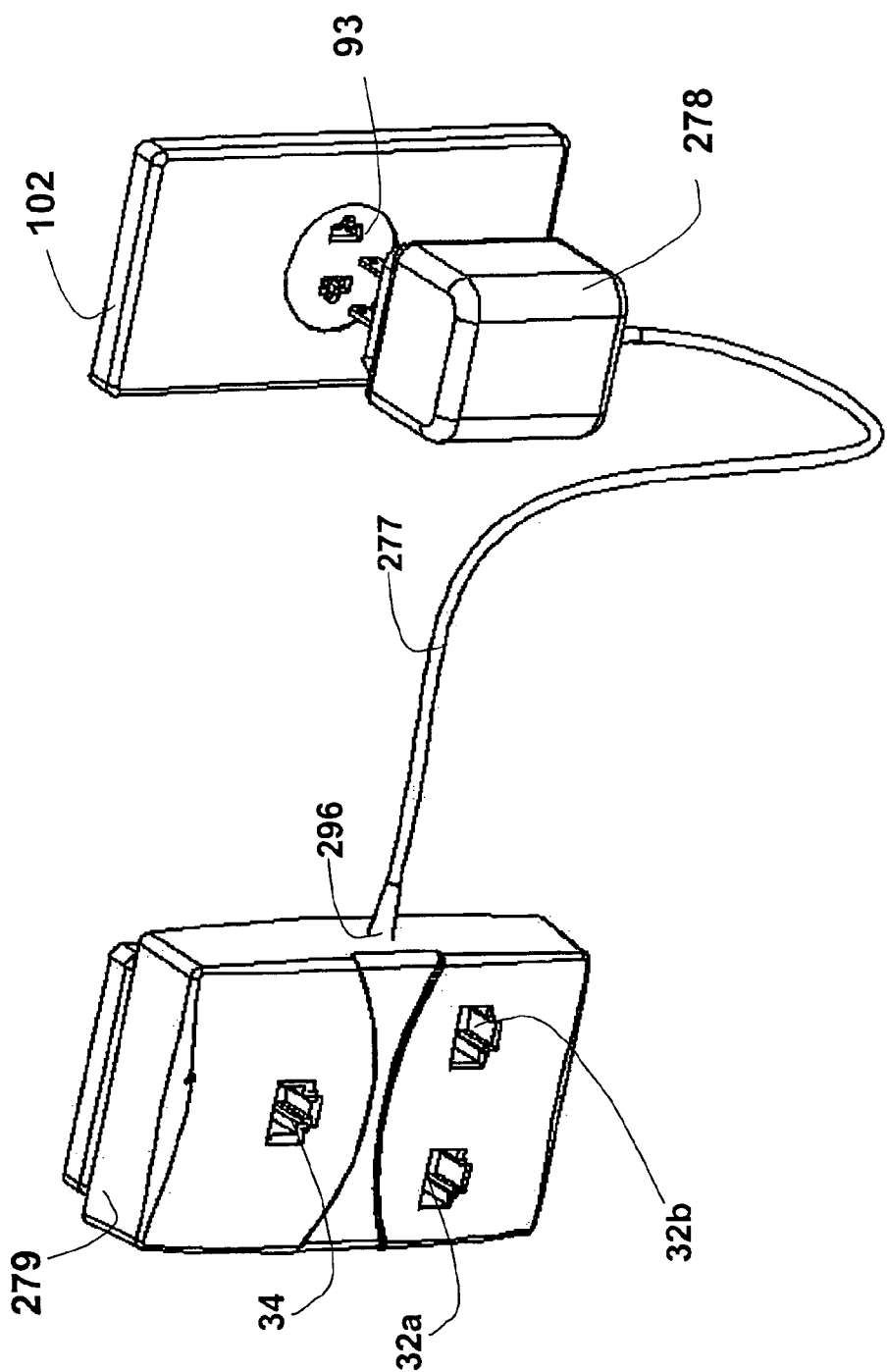
FIG. 27 shows schematically a front view of an exemplary telephone module according to the present invention.

In this implementation the module is connected to an external power source for feeding its active components. A pictorial view of such an approach is shown in FIG. 27, illustrating a module 279 according to any of the above embodiments. A common small AC/DC converter 278 is used (connectable to power socket 93 in distinct power outlet 102), connected to the module via plug 296.

Figure 28:
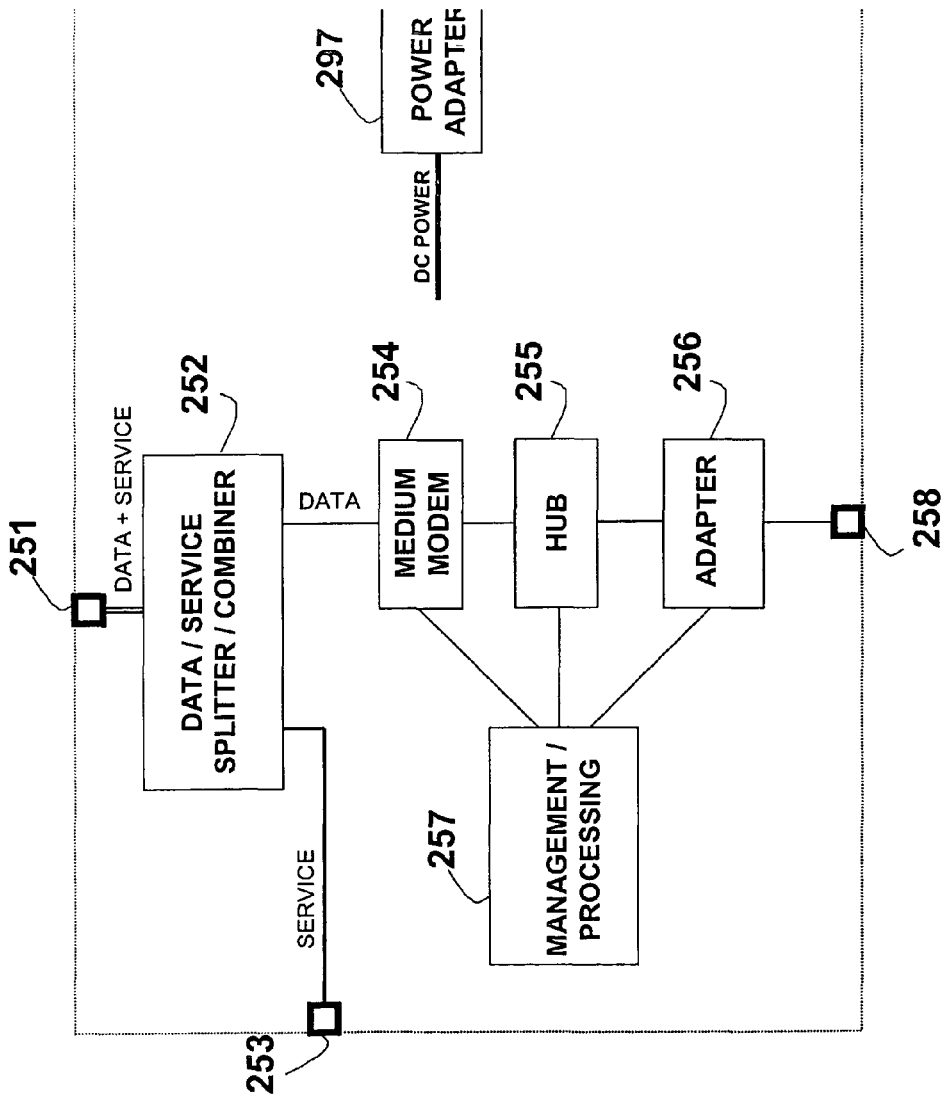
FIG. 28 shows a functional block diagram of an exemplary module according to the present invention.

A power adapter may be used in the module, for adapting the external power to the internal needs. Such adapter may include voltage conversion (such as DC to DC converter) in order to adapt to specific voltages required, protection circuits (such as fuse or current limiting), regulation and noise filtration, as well as other functionality as known in the art. In addition, such an adapter may comprise the functionality of an external AC/DC converter 278, allowing the module to be directly connected to the mains obviating the need for external converter 278. Schematic block diagram of such a module 295, comprising such power adapter function 297 is shown schematically in FIG. 28. The power adapter is fed from an external source via connector 296, and outputs the required DC power to all power-fed components in the module.

Power Over Wiring.

In one or more embodiments according to the present invention, the module is fed by power carried over the wiring and via the outlet to which the module is connected. The power may be carried over separated conductors. In this case, the same wiring connector 251 may be used to connect to the power carrying conductors using separated pins. Alternatively, additional power dedicated connector may be used.

Figure 29:
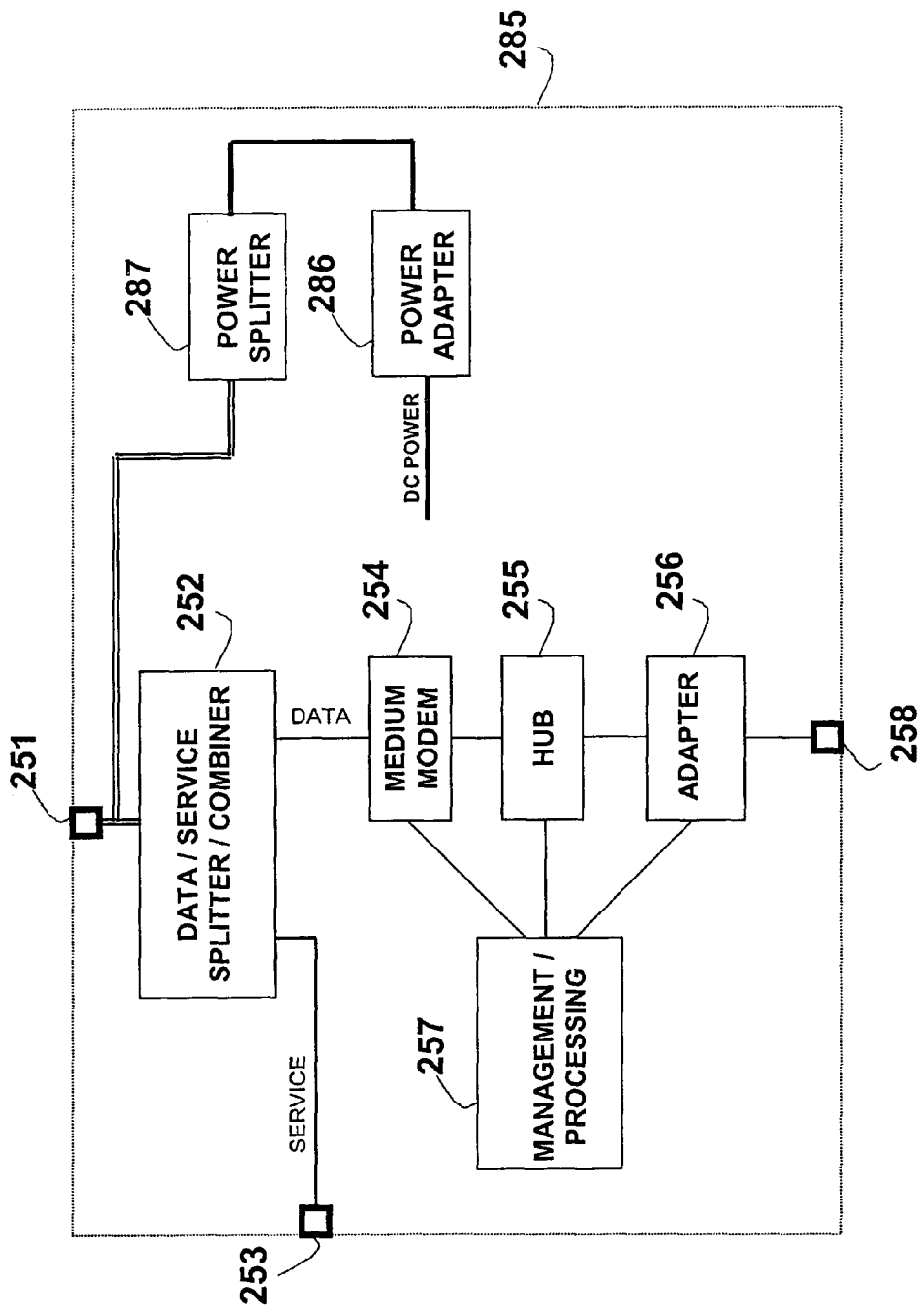
FIG. 29 shows a functional block diagram of an exemplary module according to the present invention.

In one or more preferred embodiments, the power is carried simultaneously over the wiring carrying the data network signals and/or the basic service signal. Such a module 285 is shown schematically in FIG. 29. The power splitter function 287 serves to extract the power carried over the wiring, and feed it to the power adapter 286, rather than the adapter 297 being externally fed. In most cases, the power splitter 287 operation should not interfere with the data and basic services also carried over the same wiring (e.g. loading effects and impedance matching).

The implementation of such a mechanism is trivial wherein the basic service is AC power as described above with respect to module 270 shown in FIG. 22. The power splitter 287 comprises a simple filter and the power adapter 286 comprises a standard AC/DC converter (similar to the external unit 278 described above).

Recent techniques developed allow for carrying simultaneously power and basic service (and data) over the same wiring infrastructure. U.S. patent publication 20020003873 to Rabenko et al. entitled: 'System and method for providing power over a home phone line network' teaches carrying AC power over telephone wiring carrying both telephony and data, by using a part of the spectrum not used by the other signals. Similarly, a recent technique known as Power over Ethernet (PoE) (a.k.a. Power over LAN) and standardized under IEEE802.3af, also explained in U.S. Pat. No. 6,473,609 to Lehr et al. entitled 'Structure Cabling System', describes a method to carry power over LAN wiring, using the phantom mechanism. The above technologies, as well as others, may be used to provide power to any of the modules described above. The power splitter 287 is adapted in accordance with the way power is carried. For example, in the case of using different spectrum for the power signal, a filter should be used. In the case of phantom type of feeding, two transformers are required as known in the art.

Powering Via Connected Appliance.

As explained above, several data interface standards also carry power over the interface. For example, in the case where the module is connected to USB host unit, the USB interface may feed the module.

While the invention has been described with regard to a single power source, it will be appreciated that the invention equally applies to the case wherein multiple power sources are used either for redundancy or load sharing.

Non-Networking Functionalities.

While the invention has been described with regard to adding networking related functionality to an existing outlet, it will be appreciated that the invention equally applies to any other functionality to be added to an existing outlet by mechanically attaching and electrically connecting thereto. In one or more embodiments, the added functionality involves functions commonly offered as part of outlets.

One example may be added connections. Some outlets provide a single jack, while others provide multiple connections. A module according to the present invention may provide additional connections to a single-connection existing outlet.

Such non-networking related functionalities may be provided alone, or added to the above networking related functionalities. In the latter case, a module comprises both functionalities into a single enclosure.

AC Power Module.

Figure 30A:
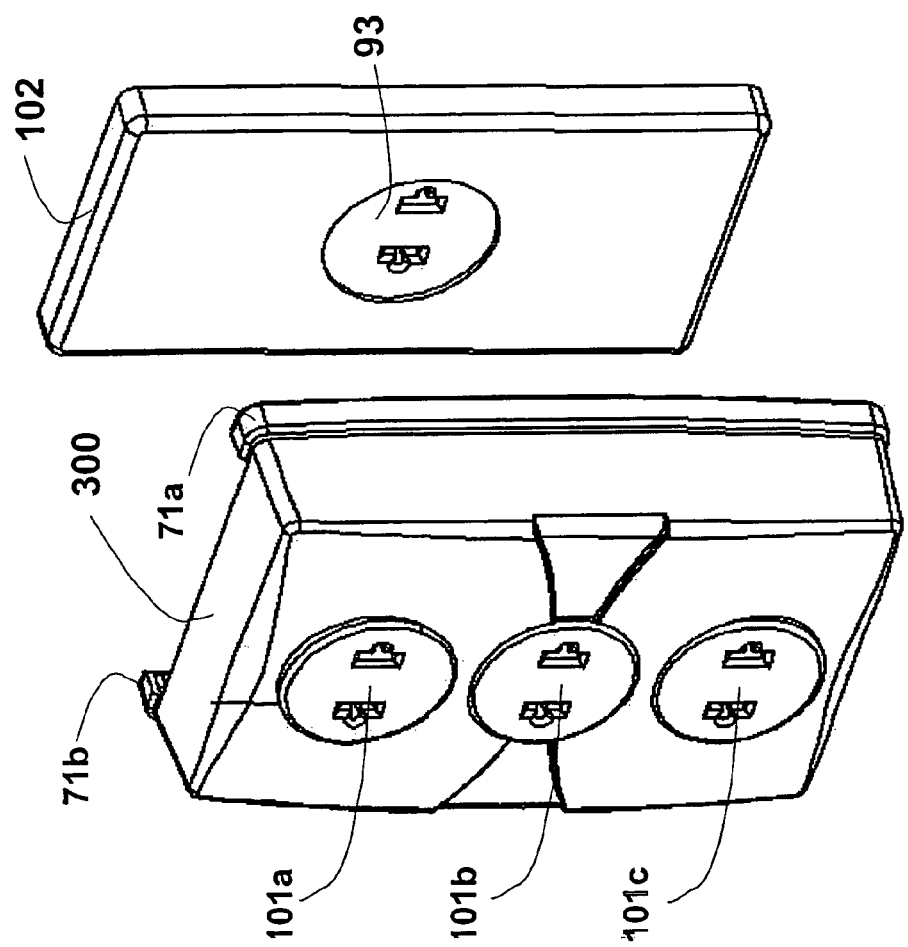
FIG. 30a shows schematically a front view of an exemplary power module according to the present invention.

An exemplary module 300 according to the invention is shown in FIG. 30*a*, connectable to a power outlet 102 comprising single power socket 93. The module 300 is mechanically attached to the outlet 93 using side clamping elements 71 as described above, and provides three power sockets 101*a*, 101*b* and 101*c*, each electrically connected directly to the socket 93. It will be appreciated that any other number of sockets may also be provided. Furthermore, the module may be used to convert from one type of socket to another (such as from US type to European type). In the latter case, the module may comprise the transformer required for voltage adaptation (e.g. from 110 VAC to 240 VAC).

Figure 30B:
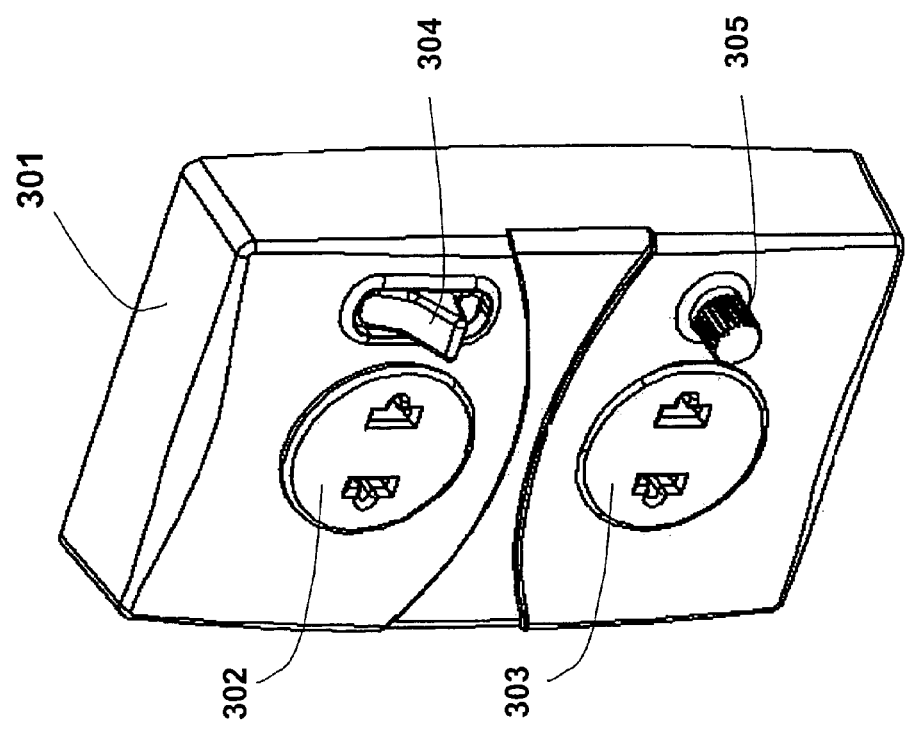
FIG. 30b shows schematically a front view of an exemplary power module according to the present invention.

Some power outlets are available offering built-in switched power sockets. Other outlets are known to comprise a built-in dimmer for lighting applications. Similarly, such functionalities may be added to an existing outlet by means of a module according to the present invention. Module 301 shown in FIG. 30b provides switch 304, connected in series to socket 302 to switch its power. Additionally, dimmer button 305 is shown, controlling in-module dimmer circuitry, to work in conjunction with socket 303. It will be appreciated that, if desired, only one of the additional functionalities (i.e. switching and dimming) need be provided. Likewise, more than two additional functionalities may be provided where space permits.

Other non-limiting examples of functionalities which may be available in power outlets and may be embedded in modules in order to allow adding such functionalities to existing outlets (in addition to switching and dimming) are:

Fuses, and other safety means.
Lightning protection, and any other protection means for protecting the connected appliance.
Visual indicators.
Grounding means such as side wiring.
Fan speed control.
TEST and RESET buttons for testing and resetting fuses.
Electronic timer switching.
Sensors, such as infrared occupancy sensors.
Filters (e.g. for noise filtering).
Security related sensors (e.g. heat, flood).
Telephone Module.

Figure 31:
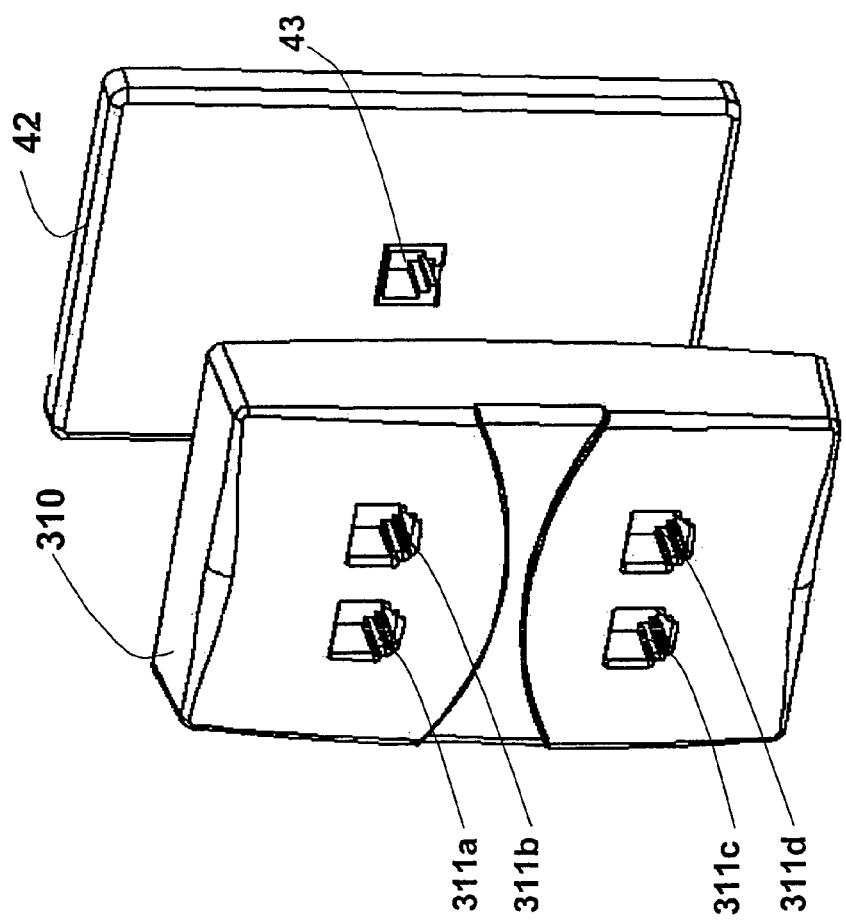
FIG. 31 shows schematically a front view of an exemplary telephone module according to the present invention.

An exemplary module 310 according to the invention is shown in FIG. 31, connectable to a telephone outlet 42 comprising single telephone jack 43. The module 310 is mechanically attached to the outlet 93 using any of the described above methods, and provides four telephone jacks 311a, 311b, 311c and 311d. Each such jack may be connected directly to the jack 43, allowing four telephone devices to be connected to the same telephone line. Alternatively, in the case wherein jack 43 supports two or more telephone connections (using different pins), the telephone jacks 311 may connect to different telephone lines (e.g. jacks 311a and 311b to line 1 and jacks 311c and 311d to line 2). Such a module is described in U.S. Pat. No. 6,366,671 to Beavers, entitled 'Multiple outlet telephone jack'.

Some telephone outlets are available offering built-in micro-filters, known in the art for use in conjunction with ADSL and HomePNA. Similarly, such micro-filters may be added to an existing outlet by means of a module according to the present invention. Other non-limiting examples of functionalities which may be available in telephone outlets and may be embedded in modules in order to allow adding such functionalities to existing outlets (in addition to switching and dimming) are:

Lightning protection, and any other protection means for protecting the connected telephone device.
Visual indicators.
Sensors, such as infrared occupancy sensors.
Fuses, and other safety means.
Filters (e.g. for noise filtering).

While the non-networking functionalities have been exampled above with regard to power and telephone outlets, it will be appreciated that the invention equally applies to any type of outlet, including LAN and CATV outlets. In the latter case, a RF splitter may be used within a module for providing multiple CATV connections.

Integrated Appliances.

While the invention has been described with regard to adding available outlet functionality to an existing outlet, it will be appreciated that the invention equally applies to any other functionality to be added to an existing outlet by mechanically attaching and electrically coupling thereto. In particular, the functionality of a device or an appliance which is commonly connected to an outlet can now be integrated, in part or in full, into the module. In such configuration, the need to connect via cables the appliances to the outlet is obviated. In addition to the improved aesthetics, excess exposed cables are inconvenient and dangerous. A few integration examples are described herein.

Figure 32A:
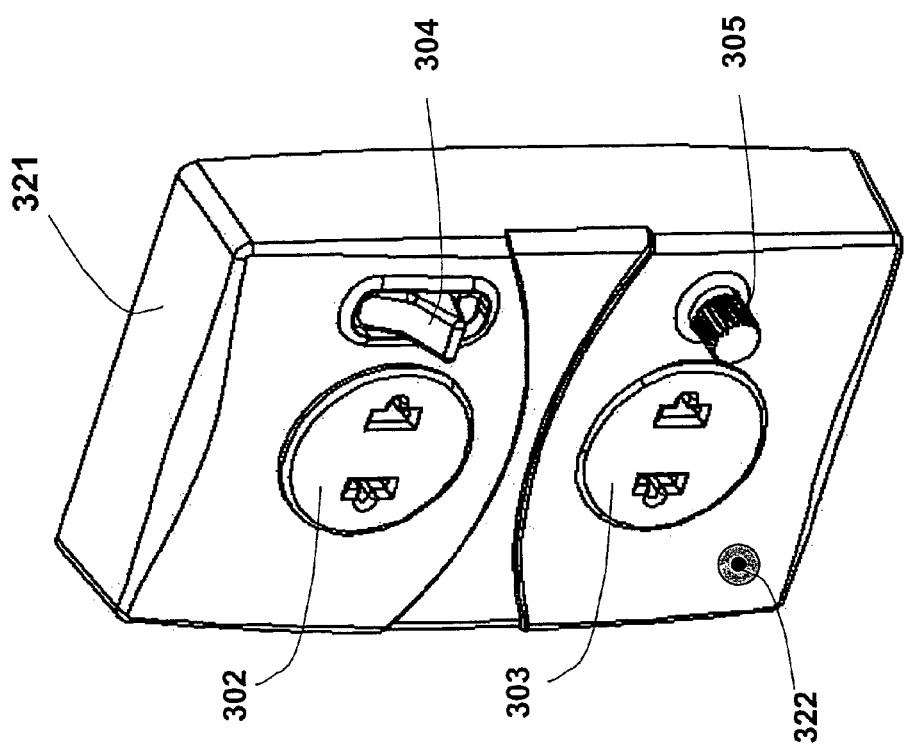
FIG. 32a shows schematically a front view of an exemplary power module according to the present invention.

Small AC/DC converters such as device 278 described above are known as means to connect appliances to AC power. Such converter 278 may be directly attached to a power outlet or connected thereto via a power cord. In one or more embodiments of the invention, such a converter 278 is integrated into a module. The converter may be integrated as a sole functionality of the module or added to other functionalities. The latter is demonstrated by a module 321 illustrated in FIG. 32a, based on module 301 described above. In addition to switching and dimming functions, the module 321 further comprises a converter 278, allowing devices to be connected thereto by DC connector 322. Such an outlet with built in AC/DC converter is described in Canadian Patent Application 2,420,515 to Eckel et al. entitled 'Cordless telephone outlet device'.

Figure 32B:
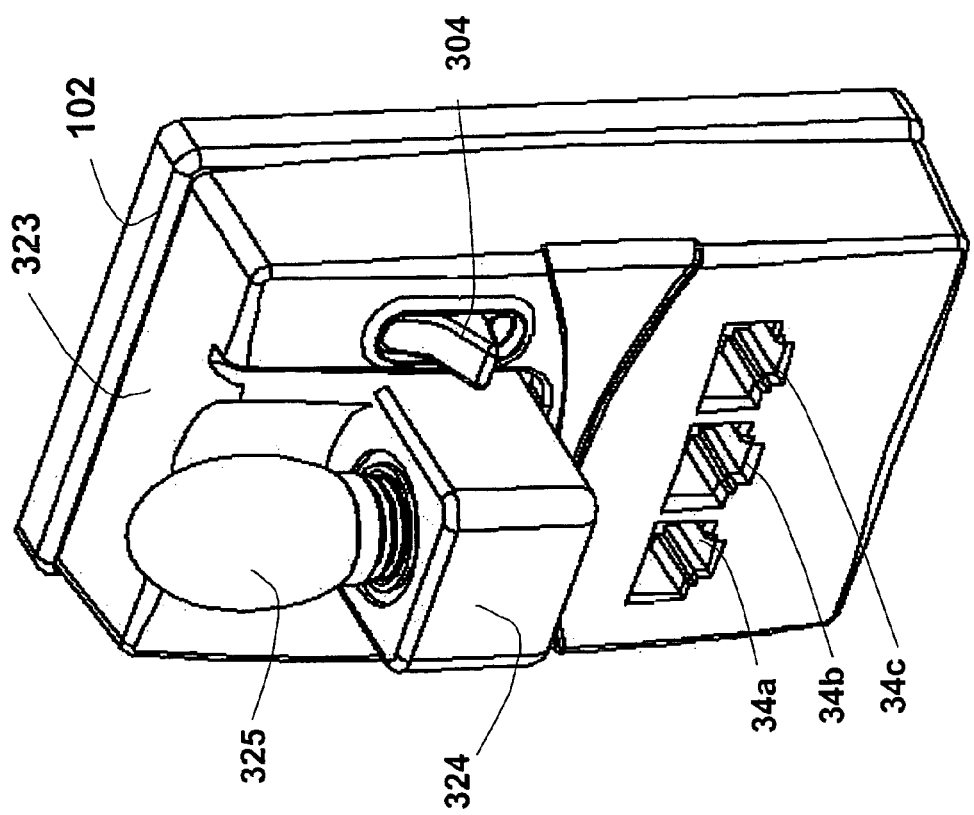
FIG. 32b shows schematically a front view of an exemplary power module according to the present invention.
Figure 32C:
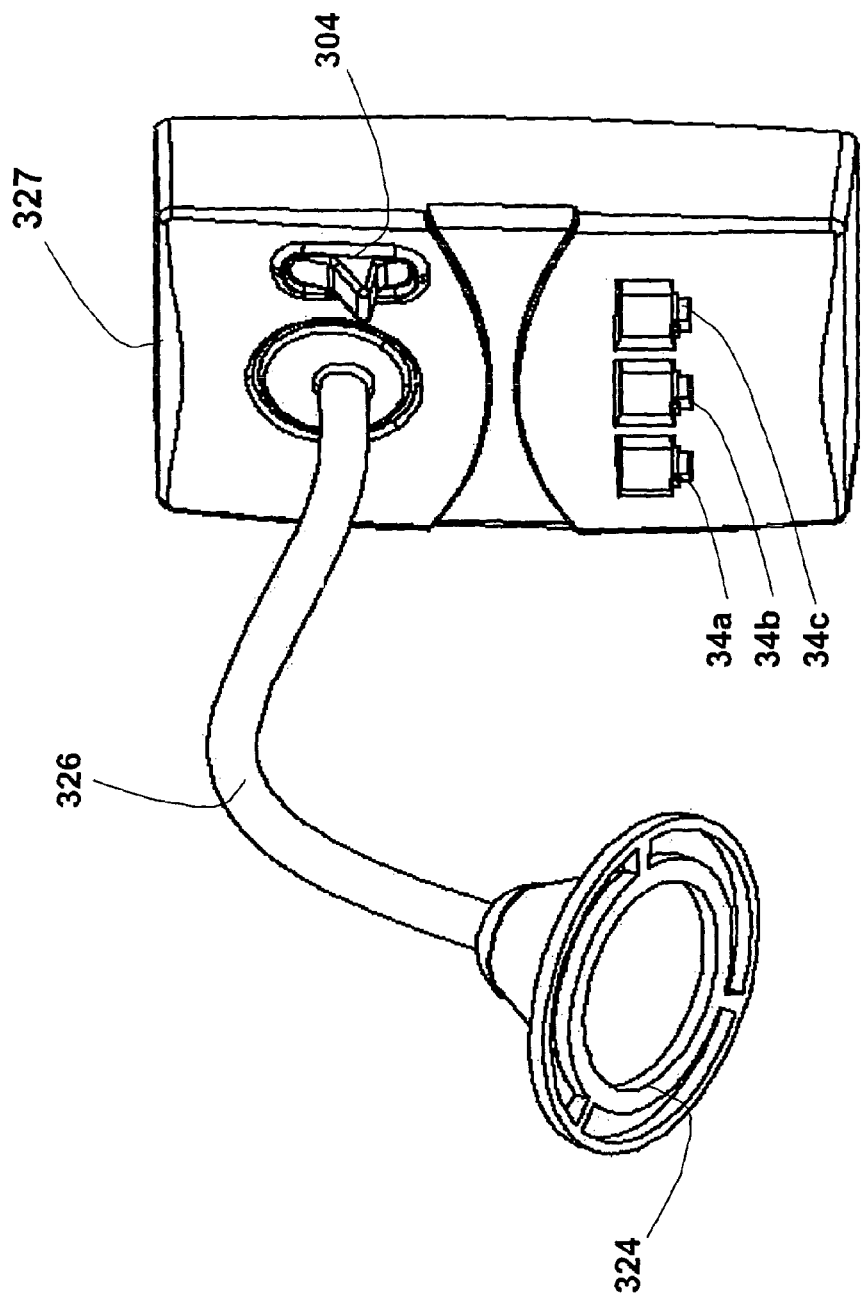
FIG. 32c shows schematically a front view of an exemplary power module according to the present invention.

Power module 323 attached to a power outlet 102 is shown in FIG. 32b. Similar to outlet 100 described above, module 323 provides three data connections 34a, 34b and 34c. The module 323 further includes a power switch 304 as described above with regards to module 321, and may include a switch 304 controlled power socket 302. In another embodiment, the module 323 provides a night light function integrating a switch 304 controlled lamp house 324 and lamp 325 connected thereto. Add-on night light devices are known as add-on stand alone housings. As shown in FIG. 32b, the full night light functionality, including a switch, lamp and lamp house, are fully integrated into the module 323. While the lamp housing 324 is shown in FIG. 32b as rigidly attached to the module, flexible mechanical attachment may also be used, as shown with regards to the exemplary module 327 shown in FIG. 32c. In this configuration, the lamp house 324 is attached to the module body be means of flexible holder 326. A power outlet with built in lighting function is disclosed in U.S. Pat. No. 5,473,517 to Blackman, entitled 'Emergency Safety Light'.

Figure 33A:
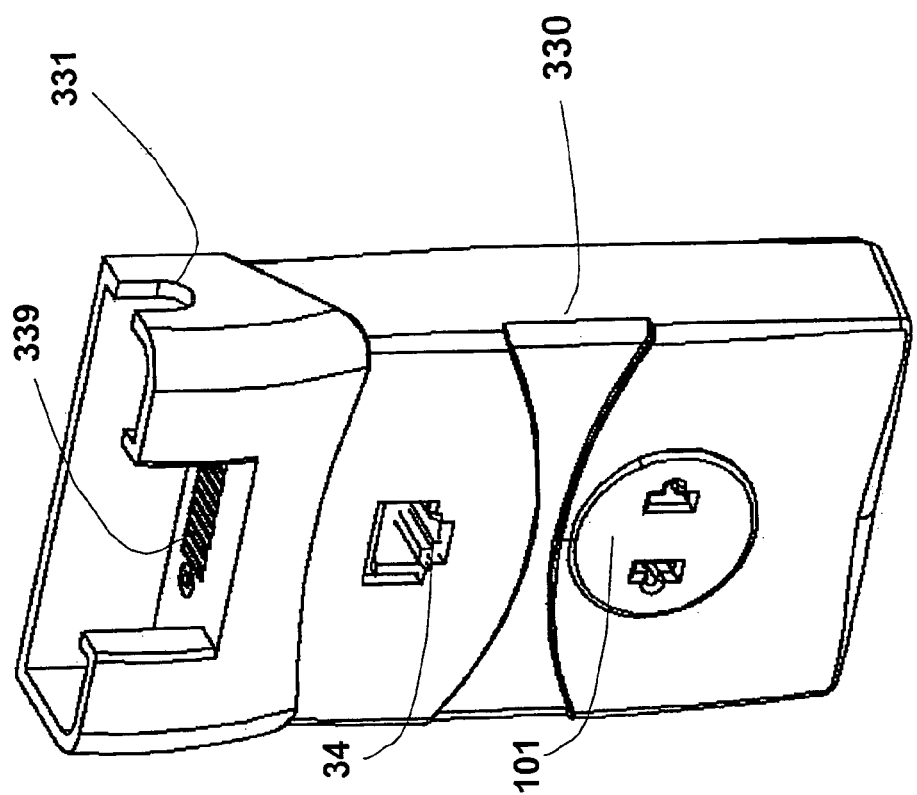
FIG. 33a shows schematically a front view of an exemplary power module according to the present invention.
Figure 33B:
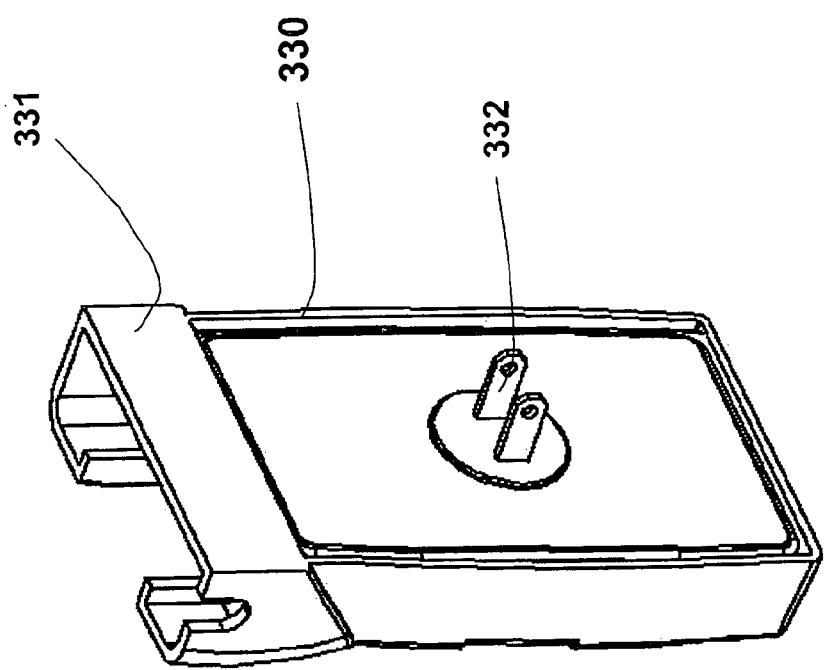
FIG. 33b shows schematically a rear view of an exemplary power module according to the present invention.
Figure 33C:
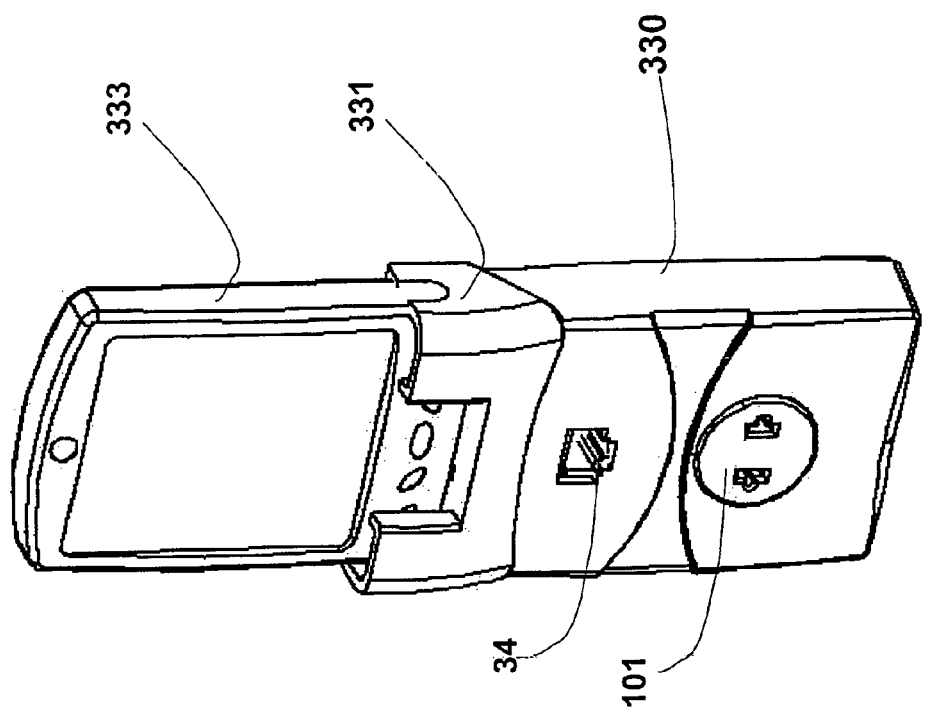
FIG. 33c shows schematically a front view of an exemplary power module with a PDA according to the present invention.
Figure 33D:
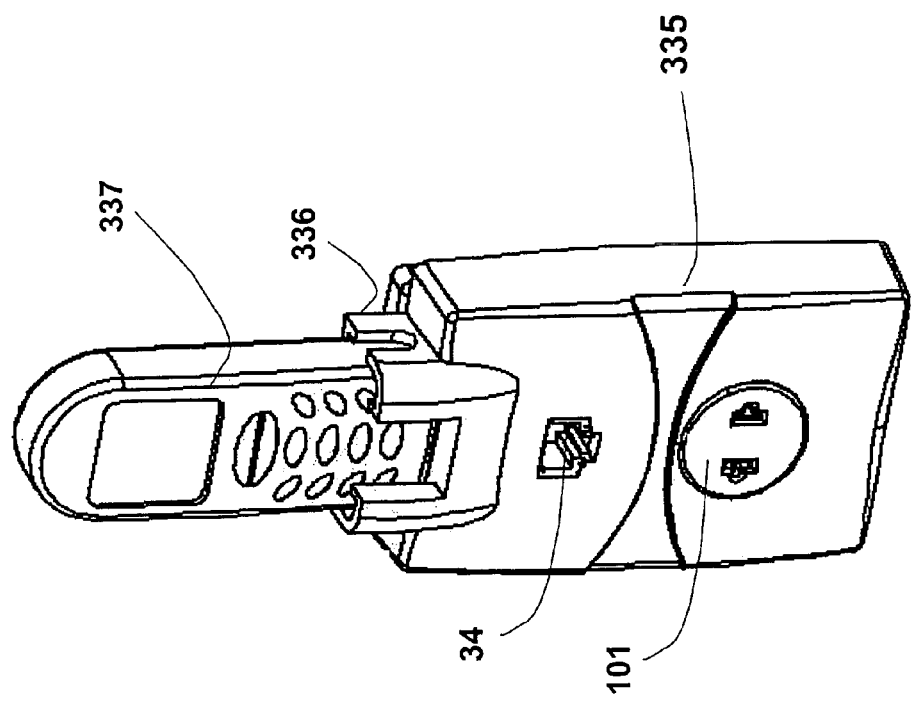
FIG. 33d shows schematically a front view of an exemplary power module with a cellular phone according to the present invention.

Another example of a device connected to a power outlet is a charger, such as PDA (Personal Digital Assistant) or cellular phone chargers. Such chargers commonly comprise a charging circuit and a mechanical base for the charged device. In one or more embodiments according to the present invention, such charger functionality is integrated into the module. A front view of such a module 330, based on module 100 described above, is shown in FIG. 33a, and a rear view is shown in FIG. 33b. Added to the functions of module 100, module 330 comprises PDA charger functionality. In addition to the built-in charger the module 330 further comprises a receptacle 331 and connector 339, for providing electrical connectivity and mechanical seating to the charged PDA. The module 330 connects electrically to an AC power outlet via the two prongs forming the AC plug 332, and is attached thereto by any of the described above methods. A PDA 333 in a charged position (assuming the module 330 is attached to an AC power outlet) is shown in FIG. 33c. While described above with regard to PDAs, it will be appreciated that any mobile device may substitute the PDA, such as receptacle 336 and cellular telephone 337 shown in conjunction with the respective module 335 in FIG. 33d.

While modules 330 and 335 above are described as supporting only power functionalities, it will be appreciated that data networking may also be added. For example, in the case wherein the AC power wiring also carries data signals (as described above), powered (or charged) devices (such as PDA 333 or cellular telephone 337) may also access this data network signal, acting as active nodes in the network. In such case, the module comprises part or all of the data functionality described above.

Figure 33E:
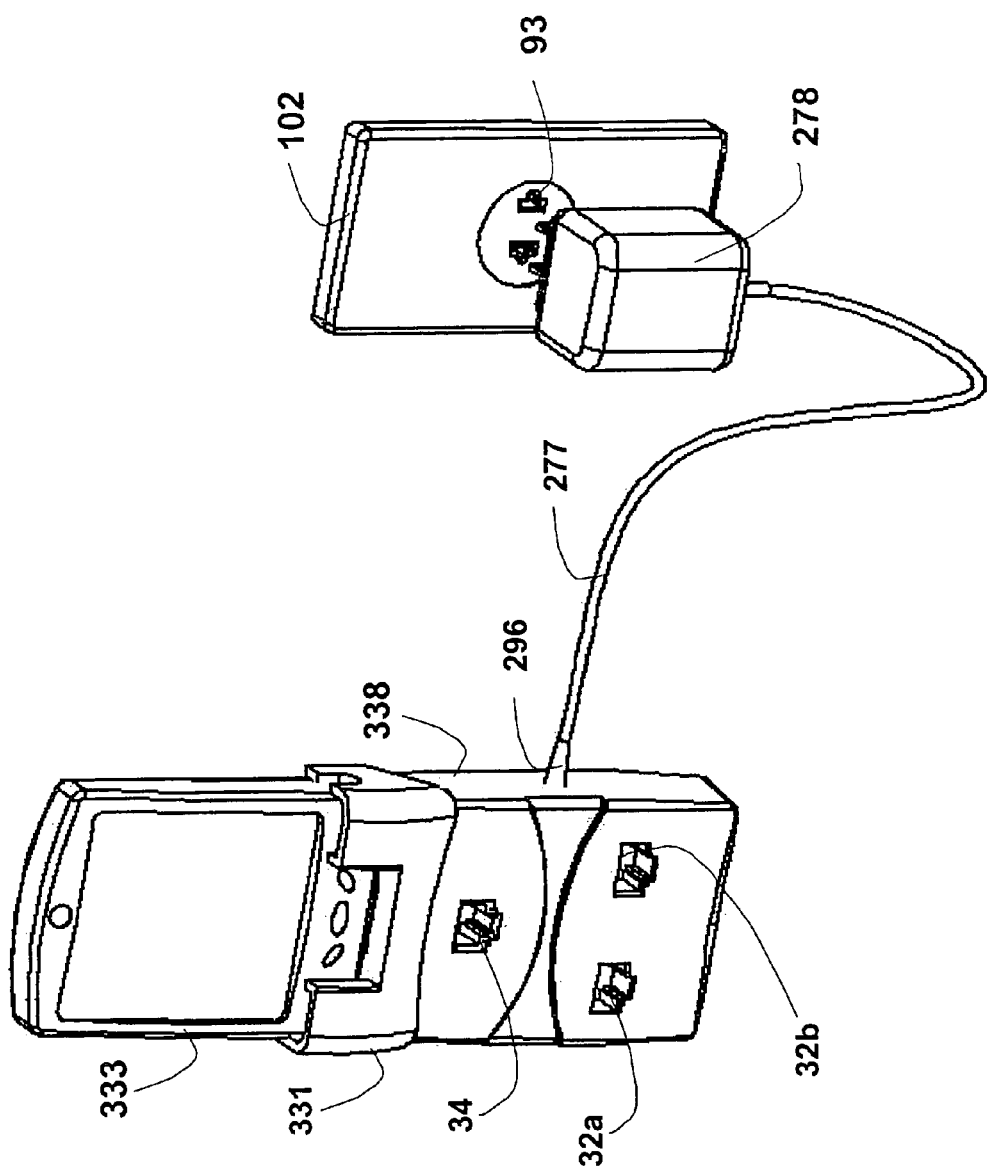
FIG. 33e shows schematically a front view of an exemplary telephone module with a PDA according to the present invention.

While modules 321, 330 and 335 are described above with regard to power modules providing power to devices/appliances connected/attached thereto, it will be appreciated that such power feeding functionalities may be included in other outlets (e.g. telephone, CATV and LAN outlets). The module may be powered by any one of the described above module powering methods (or combination thereof). One such exemplary telephone module 338, based on telephone outlet 279 described above, is shown in FIG. 33e. The module 338 is locally fed for powering its circuits, as well as charging the PDA 333 via a mechanical receptacle 331.

While the modules are described above primarily for supporting power functionalities, it will be appreciated that data networking may be the primary or sole functionality supported. In such case, the device connected (e.g. PDA 333 or cellular phone 337) is coupled to the data signal carried over the wiring, acting as a node in the data network. The module comprises part or all of the data functionality described above, but in addition (or instead) to the data connector (e.g. connector 34) connects to the respective device. Furthermore, in addition to the example of PDA 333 and cellular telephone 337, it will be appreciated that any other device may be supported for powering, data or both. Non-limiting examples are handheld or mobile devices such as digital camera, digital music player, digital video player and web pads.

While the modules 330, 335 and 338 are described above as providing a docking function for holding either a PDA 333 or a cellular phone 337, it will be appreciated that any other such mechanical base, docking unit or mechanical attachment means may be used. In the general case, the module according to one or more embodiments according to the present invention provides a mechanical means (e.g. receptacle 331) for mechanically attaching devices thereto (e.g. PDA 333 and cellular phone 337). The mechanical attachment may use gravity to hold the appliance to the module, or alternatively use (solely or in addition to gravity) a latching mechanism to secure such attachment. Such mechanical means (to be distinguished from the mechanical means used for attaching the module, to the outlet) may also support electrical connection (as shown for the base 331 above, also providing power connection). In other embodiments, the electrical connection uses a connector provided by the module. A clear advantage of such approach is the ability to hang appliances and devices on the wall, rather than occupying a commonly loaded desk space.

It should be noted that U.S. Pat. No. 6,518,724 to Janik entitled 'Wall switch device and power outlet device' discloses a power wall switch comprising a cradle for PDA or cellular telephone, as well as built-in wireless functionality. However, the cradle functionality described by Janik is part of the outlet and is not provided as an add-on module. Furthermore, Janik describes only a power outlet and in particular a wall switch, and is silent about other types of outlets such as telephone, CATV and LAN outlets.

Integrated Telephone Appliances.

While the invention has been described with regard to integrating power consuming devices to a power module, it will be appreciated that the invention equally applies to integrating telephone-outlet connected devices to telephone modules. Examples of such devices or appliances which commonly connects to a telephone outlets are:
  Answering machines.
  XDSL modem, including ADSL modem.
  Dial-up modem.
  Telephone set.
  Cordless telephone, such as cordless telephone base unit.
  Telemarketing avoiding devices.
  Caller-ID units.
Any one or more of the above functionalities may be integrated into an outlet. Furthermore, the outlet may provide mechanical means for attaching any of the devices thereto.

Integrated CATV Appliances

While the invention has been described with regard to integrating power or telephone consuming devices to respective power or telephone modules, it will be appreciated that the invention equally applies to integrating CATV-outlet connected devices to CATV modules. Examples of such devices or appliances which commonly connects to a CATV outlets are:
  Cable modem (e.g. DOCSIS based)
  Set Top Box.
  VCR.
  DVD.
  Television sets.
  DVR (Digital video recorder).
  DRM (Digital Right Management) related devices.
  Non-Technical Applications.

While the modules above are described with regard to technical functionalities, it will be appreciated that the invention may be implemented for non-technical applications such as improved aesthetics. In such applications, the module may be limited to the provision of a decorative design and not necessarily include electrical or mechanical functionality. Such a design may be suited to the householder's taste, and may for example be used to harmonize with other parts of the room. For example, a module according to the present invention may have a unique color, texture or decoration. Most available outlet faceplates are offered in a very limited number of colors and shapes, and such a module allows for a specific color, shape, texture, decoration or any other ornamental feature. Furthermore, in the case wherein there is a need to change the color, for example in the case of painting the walls, such change can be easily done with the module, obviating the need to replace part or all the existing outlet and obviating the need to interfere with the utility wiring.

Figure 34A:
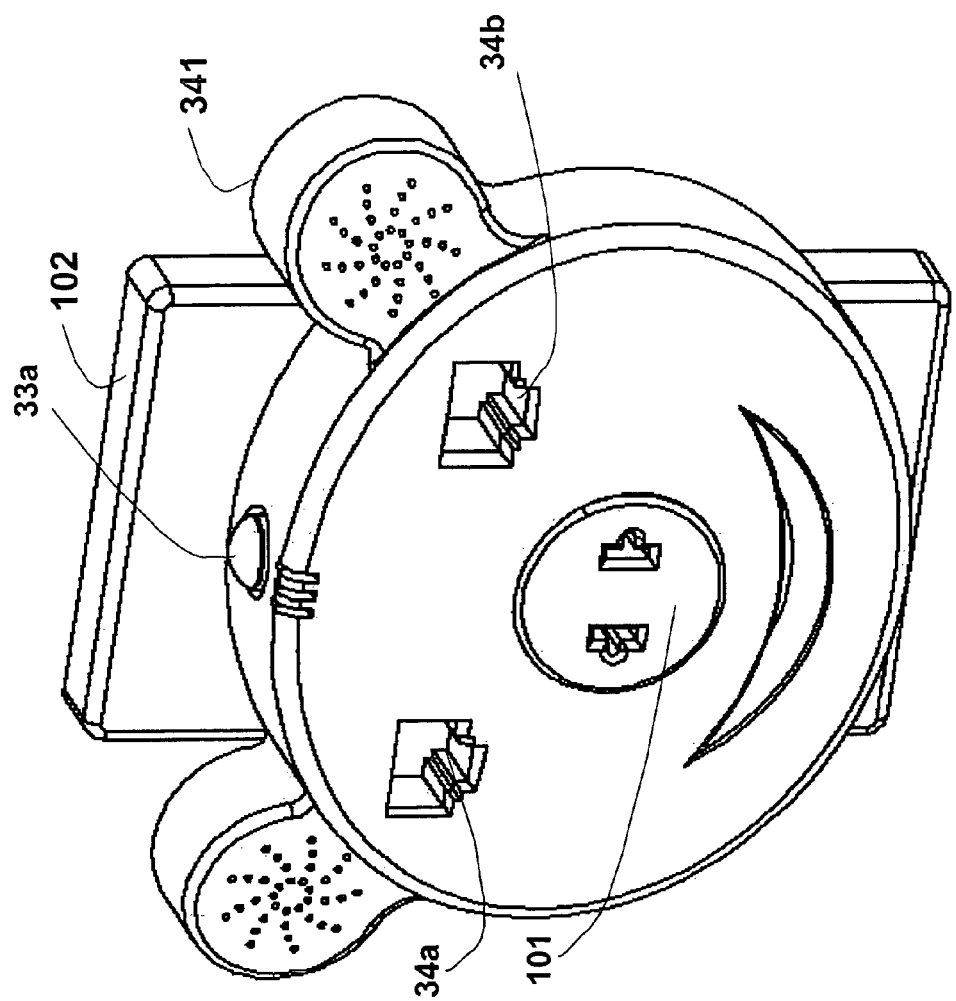
FIG. 34a shows schematically a front view of an exemplary artistically shaped power module according to the present invention.
Figure 34B:
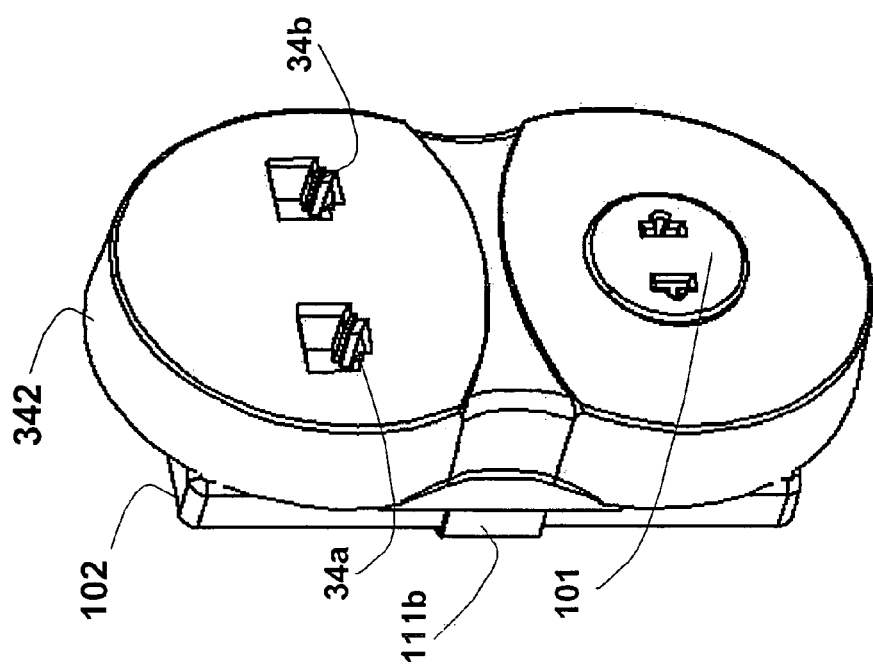
FIG. 34b shows schematically a front view of an exemplary artistically shaped power module according to the present invention.

In addition to decoration (e.g. color), the module may be shaped in an artistic manner. Examples of module shapes, structures and other ornamental designs are shown in FIGS. 34a and 34b. Both figures illustrate power modules based on power module 100 described above, with the distinction of providing two data communication ports 34a and 34b, rather than the single data connector 34 comprised in power module 100. A power module 341 is shown in FIG. 34a attached to a power outlet 102, and providing a power socket 101 and a visual indicator 33a. The module 341 is shaped as a 'teddy-bear' face. Such structure, as well as any other animal theme shapes may fit into a child's room. Other themes may also be employed, such as a sports personality or musician, musical instrument and so on. Another artistic aspect is shown as oval shaped power module 342 in FIG. 34b. The module 342 is shown as using snap locking attachment method based on tabs 111a (not shown) and 111b as described above.

Status Indicators.

The module may comprise visual indicators 33a and 33b as described above for allowing the user to easily observe the module status. Such indicators may be LEDs (Light Emitting Diode) known in the art. The visual indicators may be used to indicate the following module status.

Figure 35:
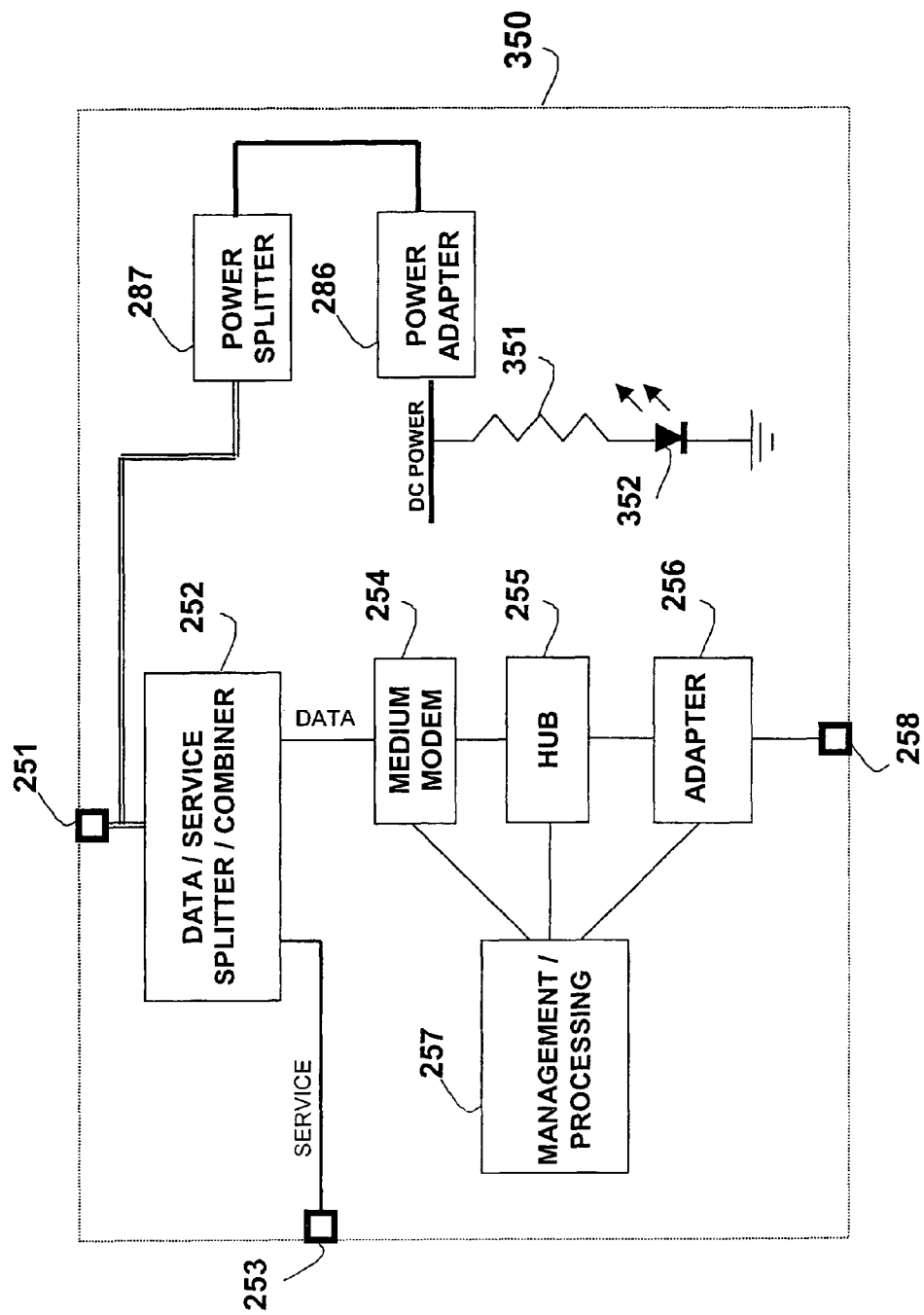
FIG. 35 shows a functional block diagram of an exemplary module according to the present invention.

Power. The visual indicator may be used to indicate the existence of power in the module to power its internal active circuits. Various techniques have been described above for powering a module. Regardless of the power source to the module (as described above), such indication will ensure that indeed power reaches the module. Such indication is commonly marked as 'POWER' or 'ON'. The indicator can be coupled directly to the power signal feeding the module or alternatively coupled to the power supply output. In the latter case, the indicator is used to indicate both the power signal availability and the proper operation of the internal power supply. The latter case is demonstrated in FIG. 35. The module 350 shown is based on module 285 described above. The module 350 comprises a LED 352 connected in series to a resistor 351, required for current limiting. The LED 352 may serve in this configuration as indicator 33a, for example. The LED 352 is connected to the output of power adapter 286, hence the illumination of LED 352 indicates the proper operation of both the power adapter 286 and the power splitter 287, as well as the existence of power feeding to the module 350.

Proper operation. A visual indicator may also be used to indicate the proper operation of part or all of the electronic circuits integrated within the module. The electronic circuits within the module may support self-test or any other built-in diagnostics means, wherein the test results will be signaled by a visual indicator.

Communication status. In the case wherein the module comprises communication functionality, the module may indicate the availability and the status of the communication. In general, two communication links may be involved. One communication link refers to the availability of a data communication signal over the service wiring so as to indicate that modem 254 receives a valid communication signal. For example, in the case wherein two modules are installed in a home to allow communication between them, both will indicate the existence of a network over the service wiring. The other communication link involves the communication between a data unit connected to the module and the module. Such communication link may be established upon connecting an appropriate operative data unit to connector 258 (or 34) of the module. Such status indication can be based on a 'Link Pulse' mechanism commonly used in Ethernet IEEE802.3 10/100BaseT based networks.

In addition to indicating the existence of operative data network, it is useful to have information about the performance of such a communication link. For example, the data rate (either effective or nominal) may be an important network parameter. In to this case, the visual indicator will provide information about the network performance. Common 10/100BaseT Ethernet networks commonly employs two indicators to signal if the system works in the 10 Mb/s or 100 Mb/s modes. Any other visual indicators providing quantified information may be used, such as 'bar graph', number, multiple intensity levels and the like.

Service monitoring. The module may comprise a service monitoring means. In such a case, the visual indicator signals the availability and the status of a service signal. In the case of power module, the availability of AC power (either 110 or 220VAC) will be sensed and indicated. In the case or telephone module, the indicator may reflect the existing or a telephone signal, the existing of 'OFF HOOK' state, ringing state and the like. Similarly, in the case of CATV module, the existence of the CATV signal may be indicated.

The above various states may be each represented by a single dedicated single-state indicator. However, in order to reduce complexity, known techniques are commonly used in order to combine signals. Such techniques may use different colors (of the same indicator), different intensity levels, variable duty-cycle and so forth. While visual indicators have been described, other indicating methods may be used such as audible tones (as stand alone or combined with visual).

General.

While the invention has been described with regard to the configuration wherein the existing outlet is a simple passive wiring-only device and the added functionality resides in full in the module, it will be appreciated that the invention equally applies to other embodiments wherein the added functionality is split between the outlet and the module.

While the invention has been described with regard to various functionalities integrated into the module, it will be appreciated that the invention equally applies to other embodiments wherein such functionalities are integrated solely, jointly or combined with other functionalities not described above.

While the invention has been described with regard to the configuration wherein the existing outlet is a simple passive wiring-only device and the added functionality resides in full in the module, it will be appreciated that the invention equally applies to other embodiments wherein the added functionality is fully embedded in an outlet.

While the invention has been described with regard to add-on modules having all the components required for added functionality, it will be appreciated that the invention equally applies to the cases wherein the functionality is divided between the outlet and the adapter, each comprising part of the required components. Furthermore, in some configurations more than one module may be required. In such a case, the modules can be stacked or organized in various configurations, wherein each module may be mechanical and electrically attached either to the outlet or to other module or both. Any combination of an outlet and add-on module may be considered as a new outlet, into which new module may be added according to any embodiment of the present invention.

While the invention has been described with regard to existing outlets, it will be appreciated that the invention equally applies to the cases wherein the outlet is also upgraded, such as substituting the outlet with a new one having part or all of the improved features.

Those of skill in the art will understand that the various illustrative logical blocks, modules and circuits described in connection with the embodiments disclosed herein may be implemented in any number of way including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A module for configuring a local area network in a building, the network including a service outlet and a service wiring, the wiring simultaneously carrying service and data signals, the module comprising:
    a wiring connector for electrically connecting said module to the service wiring via the service outlet;
    a high pass filter coupled to said wiring connector and having a data signal port operative to pass only the data signal;
    a modem coupled to said data signal port for data signal communication with the service wiring;
    a data interface connector coupled to said modem for connecting to a data unit; and
    a mechanical attachment spaced apart from the wiring connector for mechanically attaching to the service outlet.

2. The module according to claim 1, further comprising a service connector coupled to said wiring connector and operative for connecting a service unit to the service signal.

3. The module according to claim 1, wherein the service is one out of telephony, AC power and CATV.

4. The module according to claim 1, wherein the mechanical attachment is operative to attach to the outlet front surface.

5. The module according to claim 1, wherein the mechanical attachment is operative to attach to side surfaces of the outlet.

6. The module according to claim 1, wherein the mechanical attachment includes a tab operative to be inserted between the outlet and the wall.

7. The module according to claim 1, wherein the mechanical attachment includes one or more screws operative to be screwed to the outlet.

8. The module according to claim 1, wherein the mechanical attachment includes a band operative to be strapped to the outlet.

9. The module according to claim 1, wherein the mechanical attachment is operative to attach the module to the outlet permanently.

10. The module according to claim 1, wherein the mechanical attachment is operative to attach the module to the outlet releasably.

11. The module according to claim 1, wherein the mechanical attachment uses one out of magnet, suction, adhesives, pressure and "hook and loop" fasteners.

12. The module according to claim 1, further comprising a connector for connecting to a local power supply for powering said modem.

13. The module according to claim 1, wherein the wiring carry a power signal, and the module further comprising a coupling unit for coupling to the power signal for powering said modem.

14. The module according to claim 1, further comprising a coupling unit for coupling to a data unit for supplying power for powering said modem.

15. The module according to claim 1, wherein said mechanical attachment is detachable by a user from the service outlet.

16. The module according to claim 15, wherein said mechanical attachment is accessible to the user to allow the user to detach said mechanical attachment from the service outlet.

17. The module according to claim 1, wherein the service wiring is one of AC power wiring and CATV wiring and said wiring connector is one of a power wiring connector and a CATV wiring connector.

18. A kit comprising: a module for configuring a local area network in a building, the network including a service outlet and a service wiring, the wiring being connected for simultaneously carrying service and data signals; and an adapter, said module comprising:
    a wiring connector for electrically connecting said module to the service wiring via the service outlet;
    a high pass filter coupled to said wiring connector and having a data signal port operative to pass only the data signal;
    a modem coupled to said data signal port for data signal communication with the service wiring; and
    a data interface connector coupled to said modem for connecting to a data unit, and
said adapter comprising:
    a first mechanical attachment attachable to the service outlet; and
    a second mechanical attachment to which said module is attachable for securing said module to the service outlet.

19. The kit of claim 18, wherein said second mechanical attachment comprises at least two snap-fit connectors engageable with said module.

* * * * *